United States Patent [19]

Woolley et al.

[11] Patent Number: 5,774,876

[45] Date of Patent: Jun. 30, 1998

[54] MANAGING ASSETS WITH ACTIVE ELECTRONIC TAGS

[75] Inventors: Louis A. Woolley, Clinton; Charles F. Ferrara, Sauquoit; Ian Greasley, Camden; James H. Weimar, Minoa, all of N.Y.

[73] Assignee: Par Government Systems Corporation, New Hartford, N.Y.

[21] Appl. No.: 671,491

[22] Filed: Jun. 26, 1996

[51] Int. Cl.$^6$ .................................................. G06F 17/60

[52] U.S. Cl. ........................... 705/28; 235/385; 340/568; 340/572; 340/825.54; 364/478.01; 364/478.02; 364/478.03; 364/478.13

[58] Field of Search .................................. 235/375, 385; 340/539, 568, 572.8, 825.54; 342/42; 364/400, 478.01, 478.02, 478.03, 478.13, 478.14, 550; 395/228; 705/28

[56] References Cited

U.S. PATENT DOCUMENTS

| | | | |
|---|---|---|---|
| 3,426,326 | 2/1969 | Goldstein | 340/825.54 X |
| 4,688,244 | 8/1987 | Flannon et al. | 379/58 |
| 4,750,197 | 6/1988 | Denekamp et al. | 379/58 |
| 4,918,425 | 4/1990 | Greenberg et al. | 340/539 |
| 5,030,807 | 7/1991 | Landt et al. | 235/375 |
| 5,113,344 | 5/1992 | Kellogg et al. | 364/424.04 |
| 5,151,684 | 9/1992 | Johnsen | 340/572 |
| 5,153,583 | 10/1992 | Murdoch | 340/825.54 |
| 5,223,844 | 6/1993 | Mansell et al. | 342/357 |
| 5,347,274 | 9/1994 | Hassett | 340/988 |
| 5,469,363 | 11/1995 | Saliga | 364/478.13 |
| 5,517,194 | 5/1996 | Carroll et al. | 340/825.54 X |
| 5,521,602 | 5/1996 | Carroll et al. | 340/825.54 X |
| 5,528,232 | 6/1996 | Verma et al. | 340/825.54 |
| 5,546,540 | 8/1996 | White | 395/200.1 |

OTHER PUBLICATIONS

"Rafio tracking/ID & security system", Savi Technology, Commercial Carrier Journal, p. 122, Aug. 1995.

The Savi Asset Management System™, Savi Technology, Inc., Palo Alto, CA, No date.

TransitMaster™An Integrated, GPS–Based Information Management System for Transit, Rockwell International, Cedar Rapids, IA, Aug. 1995.

"TMS Wins Vehicle Location Contract for Des Moines Metro", Earth Observation Magazine, p. 12, Oct. 1995.

"Will TI make a Bundle on 'Smart' packages?", Business Week, p. 112, Nov. 27, 1995.

Varon, E., "Smart Cards Tech may keep drivers truckin'" No source or date.

ProfitMAX™ Highlights, Integrated Cargo Management Systems, Inc., 3 pages, No date.

"Auto–Trac Provides the Information You Need", Auto–Trac, Dallas, TX, 4 pages, No date.

3M Fleet Management System Pinpoints Bus Activity, 3M, 2 pages, No date.

Okabe et al., "Spatial Tesselations Concepts and Applications of Voronoi Diagrams", chapters 1–4, pp. 1–10, 65–121, 209–271. No date.

*Primary Examiner*—Edward R. Cosimano
*Attorney, Agent, or Firm*—Fish & Richardson P.C.

[57] ABSTRACT

An object in a storage area or moving vehicle is monitored by attaching an electronic tag to the object. An electronic device detects the presence of the object by communicating with the tag while the object is in storage or is being moved by the vehicle. The tags may also determine the location of an attached object and may reroute the object if it deviates from a given shipping schedule. A group of objects is monitored by two electronic tags, each attached to an object in the group. Each tag has circuitry for communicating information relating to an object in the group to a second tag. Each tag also includes a memory connected to the circuitry that is capable of storing the information, and a controller connected to the memory and the circuitry.

60 Claims, 59 Drawing Sheets

MANAGING ASSETS WITH ACTIVE ELECTRONIC TAGS

BACKGROUND OF THE INVENTION

This invention relates to managing assets equipped with active electronic tags.

Asset management systems attempt to monitor the existence, location and status of items being transported or stored. The systems include two main types: barrier systems and continuous systems.

Barrier systems determine whether an asset is located within a cell delimited by a set of stationary interrogators. The interrogators detect the asset as it crosses a boundary of the cell, but are incapable of determining a position of the asset within the cell.

Typical barrier systems fix a bar code to each asset, and use bar code readers as interrogators. Examples include systems used by car factories and mail carriers, such as Federal Express and United Parcel Service.

Another type of barrier system attaches a transponder to each asset and uses radio transceivers as interrogators. The transponders are passive, that is, they respond when activated by an interrogator but are incapable of initiating communications or other functions. An example includes a railroad system developed by AMTECH, in which each railroad car on a train is equipped with a transponder. Interrogators include transceivers that are placed along a railway.

Continuous systems determine the position of an asset anywhere within a monitoring area. An example, implemented by LOJACK, equips cars with an active transponder. The transponder is active because it initiates its own functions, for example, it monitors a particular hailing frequency. If the car is stolen, LOJACK uses special transmitters to establish communication with the transponder at the hailing frequency. Receivers provided to police cars analyze the communications to locate the car.

SUMMARY OF THE INVENTION

In general, in one aspect, the invention features a method for monitoring an object in a moving vehicle by attaching an electronic tag to the object. An electronic device detects the presence of the object by communicating with the tag while the object is being moved by the vehicle.

Preferred embodiments of this aspect of the invention include the following features.

The absence of the object is reported to a user or a computer accessible to the user when the device is unable to communicate with the tag. The absence may be reported periodically to either an owner of the object or a possessor of the object.

A location of the object is determined by establishing communications between the tag and a sensor storing location information. The location of the object is compared to a planned route, and any discrepancy between the location and the planned route is reported to the user. The discrepancy may be reported through a computer. The user determines a new route for the object and notifies the elective device of the new route. The user may determine the new route using a computer.

The object may be disposed in a container to which is attached an electronic tag. Communication is established between the tag on the object and the tag on the container. The tag on the object communicates with the electronic device through the tag on the container. The container may also be placed in a second container to which is attached an electronic tag. The tag on the first container communicates with the tag on the second container.

Each tag stores a unique identification for the object, a description of the object, the object's shipper and destination and a signature of each possessor of the object. The signatures stored by the tag are forwarded to the electronic device when the tag reaches the limit of its memory capacity or when the object to which the tag is attached reaches the end of its monitoring period. The signatures are then deleted from the tag memory.

In general, in another aspect, the invention features a system for monitoring and affecting actions on behalf of a group of objects. A first electronic tag attached to an object includes circuitry for communicating with a second electronics tag, the circuitry communicating at least information pertaining to an object in the group. The first tag also includes a memory connected to the circuitry and capable of storing the information. The second electronic tag attached to another object includes circuitry for communicating with the first tag and a memory connected in an analogous manner.

Preferred embodiments of this aspect of the invention include the following features.

The first and second tags each include a controller connected to the memory and the communication circuitry. The information communicated between the tags includes a distance between the tags. The first tag has a time measuring device connected to the controller, the device measuring a time duration required for a signal to travel between the first tag and the second tag. The device in the first tag includes a clocked counter which has a first count corresponding to the time of transmission of the signal and which subsequently has a second count corresponding to the time of recognition that the signal has been received. The device uses the product of the clock period and the difference between the counts to determine the time duration.

The second tag may also include a delay circuit connected between the circuitry and the controller, the delay circuit causing the second tag to delay returning the signal to the first tag by a given time period. The memory in the first tag includes a program causing the controller to execute a function when the controller reads the memory, the function causing the controller to determine the distance based on the time duration.

The second tag includes a second counter connected to the controller in the second tag. The counter in the first tag has a mechanism for adjusting a frequency of the first-mentioned counter, the mechanism being coupled to the controller in the first tag. The program in the first tag causes the controller to employ the mechanism to offset the frequency of the first-mentioned counter from a frequency of the counter in the second tag based on the frequency of the counter in the second tag.

The program in the memory of the first tag also causes the controller to enable the circuitry in the first tag to transmit a number of symbols at an intersymbol period such that a number of clock cycles of the first tag during a transmission and receipt of the symbols is substantially equal to a number of clock cycles of the clock of the second tag within an offset (n), where n and the number of symbols have no common factors other than one.

The first tag further includes a power source coupled to the controller and supplying power to the circuitry in the first tag. The program in the memory of the first tag causes the controller to adjust the power supplied to the controller to that minimal level which allows communication between the circuitry in the first tag and the circuitry in the second tag.

The system also includes a set of tags neighboring the first tag and including the second tag. A program in the memory of the first tag causes the controller to identify the set of tags by enabling the circuitry in the first tag to establish communications with each tag in the set. The controller determines the distance between each pair of tags in the set and the relative locations of each tag in the set based on the distances. The controller then selects a particular tag located on the periphery of the set for communicating outside the set.

In some embodiments, the information communicated between the tags includes a distance of the first tag from three different tags in the set and the absolute locations of the three different tags. The absolute locations may be derived from a sensor communicating its location to one of the three different tags. A program in the memory of the first tag causes the controller to determine the absolute position of the first tag from the information. The controller also minimizes an error in the absolute position of the first tag.

A program in the memory of the first tag also causes the controller to enable the circuitry in the first tag to communicate information with each tag in the set and analyze the information from the circuitry to determine the presence of a new tag in the set. The controller then causes the circuitry to communicate with the new tag to obtain a distance between the first tag and the new tag and a location of the new tag. The controller refines the absolute position of the first tag based on the location of the new tag and the distance between the first tag and the new tag.

In some embodiments, the information communicated by the tags includes the distance of the first tag from the second tag at a number of different times, and the absolute locations of the second tag at each of the times. A program in the memory of the first tag causes the controller to determine the absolute position of the first tag from the information.

A program in the memory of the first tag causes the controller to select tags in the set as relay tags, the circuitry in the relay tags being designated to route messages between a pair of tags in the set. The relay tags provide communications between each pair of tags in the set with a minimum number of communication links. The controller performs a Delaunay triangulation to determine a topology of the tags in the set and selects the relay tags based on the topology.

In some embodiments, the system includes a user-operated device for communicating with the circuitry in the first tag. The information communicated between tags includes an identity of a tag in the set capable of long range communication and a change in an identity of a tag in the set. The program in the memory of the first tag configures the controller to enable the circuitry in the first tag to notify the device of the change in the identity of a tag in the set.

A program in the memory of the first tag also causes the controller to divide the set of tags into subsets when a number of tags in the set increases above a threshold value. The memory in the first tag further stores an identification code for the first tag, and the program causes the controller to truncate the code and employ the circuitry in the first tag to communicate the truncated code to a second tag within a subset to minimize energy consumption.

The information communicated between tags may also include an identification of a tag belonging to a different set. A program in the memory of the first tag causes the controller to merge the first-mentioned set with the different set when a number of tags in the first-mentioned set falls below a selected threshold value.

The system may also include a time sensor which communicates a time to the circuitry in the second tag. The controller enables the circuitry in the first tag to communicate with the second tag to obtain the time, and sets the counter in the first tag using the communicated time.

A sensor may also communicate location information to the first tag, and the memory in the second tag may store a transportation route for the object attached to the first tag. The controller employs the circuitry in the first tag to query the second tag regarding the transportation route and to query the sensor regarding the tag's location. The controller then derives a present time from the counter in the first tag, determines an expected position of the object at the present time based on the route and an actual position of the object based on the location. The tag then decides whether the actual position deviates from the expected position. The controller notifies the user-operated device of a deviation from the expected position by causing the circuitry to communicate with the device.

The user-operated device includes a processor connected to a device communication circuitry. A device memory is coupled to the processor and includes a program configuring the processor to perform a called-for function when the processor reads the device memory. The function can cause the processor to determine a new route for the object attached to the first tag based on the deviation, and causes the processor to employ the device communication circuitry to communicate the new route to the first tag. The processor also employs the device communication circuitry to receive communications indicating a change in the route from at least one of the following: a second device, a tag and a system operator.

In some embodiments, the first tag has a detector connected to the controller. The detector notifies the controller when the first tag is detached from the object to which it had been attached. The controller enables the circuitry in the first tag to notify the user-operated device in response to notification from the detector that the first tag is detached from the object.

The circuitry in the first tag includes ports for infrared, radio frequency and acoustic communications. The port for radio frequency communications includes circuitry for communicating over a number of channels. A program in the memory causes the controller to select one channel for RF communication over the port and to code the information with an encryption code before enabling the tag's circuitry to communicate the information to the second tag.

The first tag can also include a power source connected to the controller and a timer connected to both the power source and controller. The controller loads a time period in the timer, and the timer causes the power from the power source to be removed from the controller and restored after the time period elapses.

A detector connected to the controller and the power source provides a detection signal to the controller indicating whether the power source has deteriorated beyond a threshold level. Another detector connected to the controller provides a detection signal to the controller indicating whether the tag has been tampered with. This detector includes a transmitter, a receiver, and an optical fiber connecting an output of the transmitter to an input of the receiver. The transmitter forwards a signal over the optical fiber to the input of the receiver. The receiver notifies the controller if the signal does not arrive at the input of the receiver.

The system may also include a sensor detecting the condition of an object and communicating the condition to the circuitry in the first tag. The circuitry in the first tag subsequently communicates the condition to the second tag. The memory in the first tag includes a stored set of thresholds values related to the condition, each threshold being associated with a time. A program in the memory configures the controller to compare the condition to the threshold corresponding to a given time and to employ the circuitry to report a deviation from the threshold to the second tag. Similarly, the stored thresholds may be associated with a location of the first tag.

The sensor may be an analog sensor, such as a temperature sensor or a fuel level sensor for a vehicle. Alternatively, the sensor may be a digital sensor. If the object is disposed in a vehicle, the digital sensor may detect whether a door of the vehicle is open or closed, or whether a vehicle brake has been released.

In some embodiments, the system includes a computer having circuitry in communication with the circuitry in the first tag. A processor is connected to the circuitry in the computer, and a port for communicating with a user is coupled to the processor. A computer memory linked to the processor includes a stored threshold and a program configuring the processor to perform a selected function when the processor reads the computer memory. The function can cause the processor to enable the circuitry to receive information from the first tag, compare the information to the threshold, and enable the port to notify the user if the information exceeds the threshold.

The system can also include a module comprising a port for communicating with the circuitry in the first tag. A processor is connected to the module port. A module memory coupled to the processor includes a program configuring the processor to perform a selected function when the processor reads the module memory. The function causes the processor to employ the port to receive an activating signal and to provide information regarding an object in the system in response to the activating signal. The port includes circuitry for receiving a wireless activating signal and circuitry for responding to the activating signal with an acoustic signal. The circuitry transmits the acoustic signal at a carrier frequency identical to (or different from) a carrier frequency of the activating signal.

In some embodiments, the system has a device with an information exchange port configured to communicate with the circuitry on the first tag. The port enables the device to store information in the memory of the first tag and to retrieve information from the memory of the first tag. The device also includes circuitry for long-range wireless communications with a wireless component.

In general, in another aspect, the invention features a module including a first tag having a port. Circuitry in the first tag is coupled to the port and configured for communicating with the second tag. A second tag in the module includes a mechanism for attaching the second tag to the first tag. A port disposed on the second tag is adjacent the port on the first tag when the second tag is attached to the first tag. A circuit in the second tag is coupled to the port in the second tag, the circuit being configured for communicating with the circuitry in the first tag.

Preferred embodiments of this aspect of the invention include the following features.

The first tag includes a controller connected to the circuitry and a power connection coupled to the controller. The second tag includes a power source coupled to its circuit and a second power connection. The second power connection couples to the first power connection when the second tag is attached to the first tag. The power source may include a connection to a power source external to the second tag.

The second tag has an interrupt source coupled to a second port on the second tag. The first tag further includes an interrupt port coupled to its controller. The second port on the second tag is coupled to the interrupt port on the first tag when the second tag is attached to the first tag.

The second tag includes a second circuit for communicating with a third tag and a switch connecting the second circuit to the first-mentioned circuit in the second tag. The first tag includes a memory coupled to its controller which stores a program configuring the controller to execute a selected function when the controller reads the memory. The selected function causes the controller to communicate with the second tag over the first-mentioned port and causes the second circuit in the second tag to communicate with the third tag.

The memory may also cause the first tag's controller to monitor the second circuit in the second tag over the first-mentioned communication port for the receipt of an activating signal. The controller causes the second circuit to respond with voice to the activating signal.

In general, in another aspect, the invention features a method for determining a topology of a set of spatially distributed nodes. The method includes the step of causing each node in the set to find its neighboring nodes by performing a Delaunay triangulation. Each node then stores an identification of each of its neighboring nodes.

A preferred embodiment of this aspect of the invention includes the following feature. A new node is added to the set and a Delaunay triangulation is performed at the new node to find the neighboring nodes of the new node. An identification of each of the neighboring nodes is stored at the given node. Each neighboring node of the new node stores an identification of the new node.

In general, in another aspect, the invention features a method for verifying a measured distance between a pair of objects in a set of spatially distributed objects. The method includes the steps of choosing a group of three objects and measuring the distances between each pair of objects in the group. The method estimates an error for each distance and determines whether the distances correspond to three sides of a triangle, taking into account the estimated errors.

Preferred embodiments of this aspect of the invention include the following features.

The method further includes the steps of choosing a group of four objects from the set and repeating the measuring and estimating steps for each pair of objects in the group of four objects. The method then determines whether the distances correspond to the sides of a planar tetrahedron sharing a common side, taking into account the estimated errors.

The method may also include choosing a group of five objects from the set and repeating the measuring and estimating steps for each pair of objects in the group. The method then determines whether the distances correspond to the sides of a pair of planar tetrahedrons sharing a common triangle, taking into account the estimated errors.

In general, in another aspect, the invention features a method of measuring a distance between two objects. The method includes the steps of transmitting from one of the objects a plurality of symbols, the transmissions occurring in a first series in which consecutive transmissions are separated by a first time interval which is a multiple of a first clock period; receiving each of the symbols at the other of the objects and re-transmitting each of the symbols back to the one of the objects, the re-transmissions occurring in a second series in which consecutive re-transmissions are separated by a second time interval which is different from the first time interval and which is a multiple of a second clock period which is different from the first clock period; measuring a round-trip time corresponding to detection of receipt from the other of the objects of each of the symbols, each round-trip time being a multiple of the first clock period; and determining the distance between the objects using a velocity of the symbols, the clock periods, at least one of the time intervals, and the round-trip times.

Preferred embodiments of this aspect of the invention include the following features. One clock period may be approximately equal to the product of the other clock period and a fraction, the numerator of the fraction may be equal to the sum of two terms, the first term of the sum may be the product of the number of symbols transmitted and the number of first clock periods corresponding to the first time interval, the second term of the sum may be a whole number that shares no multiplicative factors, other than 1, with the number of symbols transmitted, and the denominator of the fraction may be equal to the product of the number of symbols transmitted and the number of first clock periods corresponding to the first time interval. The measured round-trip times may vary and may have a variation range equal to one first clock period.

In another aspect, the invention features another method of measuring a distance between two objects. The method includes the steps of transmitting from one of the objects a plurality of symbols, the transmissions occurring in a series in which consecutive transmissions are separated by a time interval which is a multiple of a first clock period; returning each of the symbols from the other of the objects back to the one of the objects; measuring a round-trip time corresponding to detection of receipt from the other of the objects of each of the symbols, each round-trip time corresponding to a multiple of a second clock period; and determining the distance between the objects using a velocity of the symbols, the clock periods, at least one of the time intervals, and the round-trip times.

Preferred embodiments of this aspect of the invention include the following features. The method may further include a step of detecting each transmission using the second clock period, wherein the round-trip times correspond to time intervals between detections of receipt and transmission of the symbols. One of the clock periods may be approximately equal to the product of the other clock period and a fraction, the numerator of the fraction may be equal to the sum of two terms, the first term of the sum may be the product of the number of symbols transmitted and the number of first clock periods corresponding to the first time interval, the second term of the sum may be a whole number that shares no multiplicative factors, other than 1, with the number of symbols transmitted, and the denominator of the fraction may be equal to the product of the number of symbols transmitted and the number of first clock periods corresponding to the first time interval. The measured round-trip times may vary and may have a variation range equal to one first clock period.

In another aspect, the invention features another method of measuring a distance between two objects. The method includes the steps of transmitting from one of the objects a first symbol; transmitting from the one of the objects a second symbol, the transmission of the second symbol being separated from the transmission of the first symbol by a time interval which is a multiple of a first clock period; receiving the first symbol at the other of the objects and re-transmitting the first symbol back to the one of the objects; receiving the second symbol at the other of the objects and re-transmitting the second symbol back to the one of the objects, the re-transmission of the second symbol being separated from the re-transmission of the first symbol by a second time interval which is a multiple of a second different clock period; measuring a first round-trip time corresponding to detection of receipt from the other of the objects of the first symbol, the first round-trip time being a multiple of the first clock period; measuring a second round-trip time corresponding to detection of receipt from the other of the objects of the second symbol, the second round-trip time being a multiple of the first clock period; if the round-trip times are not different by at least one first clock period, repeating the transmitting, the receiving, the re-transmitting, and the round-trip measuring of the second symbol until the round-trip times are different by one first clock period; and determining the distance between the objects using a velocity of the symbols, the clock periods, the time intervals, and the round-trip times.

A preferred embodiment of this aspect of the invention includes the following feature. The first and second round-trip times may be original round-trip times, the original round-trip times being different by one first clock period, and the method may further include the steps of (a) equating the clock periods; (b) temporarily changing one of the clock periods for a period of time equal to a fraction of the time interval; (c) determining a new round-trip time for a symbol; (d) comparing the new round-trip time to at least one of the original round-trip times; and repeating (a) through (d) for a plurality of iterations, the fraction being different for each iteration.

In another aspect, the invention features another method of measuring a distance between two objects where one of the objects is able to measure time with a resolution of a minimum period of time. The method includes the steps of transmitting a plurality of symbols from the one of the objects; receiving each of the symbols at the other of the objects and re-transmitting each of the symbols back to the one of the objects after a delay period, the delay period being different for each symbol and being a multiple of a constant delay unit, the delay unit being approximately equal to the minimum period divided by the number of symbols transmitted; measuring a round-trip time corresponding to detection of receipt of each symbol from the other of the objects, each round-trip time corresponding to a multiple of the minimum period; and determining the distance between the objects using a velocity of the symbols, the minimum period, and at least one of the round-trip times.

In another aspect, the invention features another method of measuring a distance between two objects, where one of the objects is able to measure time with a resolution of a minimum period of time. The method includes the steps of transmitting a plurality of symbols from the one of the objects; after a first delay period, detecting each transmission, the first delay period being different for each transmission and being a multiple of a constant delay unit, the delay unit being approximately equal to the minimum period divided by the number of symbols transmitted; returning each of the symbols at the other of the objects back to the one of the objects; after a second delay period, detecting the receipt of each of the symbols from the other of the objects, the second delay period being different for each receipt and being a multiple of the delay unit; measuring a time difference between detections of transmission and receipt of each of the symbols, each time difference being a multiple of the minimum period; and determining the distance between the objects using a velocity of the symbols, the minimum period, and the time differences.

In another aspect, the invention features another method of measuring a distance between two objects, where one of the objects is able to measure time with a resolution of a minimum period of time. The method includes the steps of transmitting a first symbol from the one of the objects; receiving the first symbol at the other of the objects and re-transmitting the first symbol back to the one of the objects; measuring a first round-trip time corresponding to detection of receipt from the other of the objects of the first symbol, the first round-trip time being a multiple of the minimum period; a) transmitting another symbol from the one of the objects; b) receiving the another symbol at the other of the objects and re-transmitting the another symbol back to the one of the objects after a delay period, the delay period being a multiple of a delay unit, the delay unit being approximately equal to a fraction of the minimum period, the number of delay units in the delay period being equal to the number of symbols previously re-transmitted; c) measuring another round-trip time corresponding to detection of receipt from the other of the objects of the another symbol, the another round-trip time being a multiple of the minimum period; if the first round-trip time and the another round-trip time are equal, repeating a) through c) until the round-trip times are different by one minimum period; and determining the distance between the objects by using a velocity of the symbols, the minimum period, delay unit, and the round-trip times.

A preferred embodiment of this aspect of the invention includes the following feature. The method may further include a step of reducing the delay unit to a smaller fraction of the minimum period and repeating a) through c).

In general, in another aspect, the invention features apparatus for measuring a distance between two objects. The apparatus includes a transmitter having a first clock for transmitting from one of the objects a plurality of symbols, the transmissions occurring in a first series in which consecutive transmissions are separated by a first time interval which is a multiple of the period of the first clock; a transponder having a second clock for receiving each of the symbols at the other of the objects and re-transmitting each of the symbols back to the one of the objects, the re-transmissions occurring in a second series in which consecutive re-transmissions are separated by a second time interval which is different from the first time interval and which is a multiple of the second clock's period which is different from the period of the first clock; a clock counter for measuring each round-trip time corresponding to detection of receipt from the other of the objects of each of the symbols, each round-trip time being a multiple of the first clock period; and a calculator for determining the distance between the objects using a velocity of the symbols, the clock periods, at least one of the time intervals, and the round-trip times.

In another aspect, the invention features another apparatus for measuring a distance between two objects. The apparatus includes a transmitter having a first clock for transmitting from one of the objects a plurality of symbols, the transmissions occurring in a series in which consecutive transmissions are separated by a time interval which is a multiple of the period of the first clock; a transponder for returning each of the symbols from the other of the objects back to the one of the objects; a counter having a second clock for measuring a round-trip time corresponding to detection of receipt from the other of the objects of each of the symbols, each round-trip time corresponding to a multiple of the period of the second clock; and a calculator for determining the distance between the objects using a velocity of the symbols, the clock periods, the time interval, and the round-trip times.

In another aspect, the invention features another apparatus for measuring a distance between two objects. The apparatus includes a transmitter for transmitting from one of the objects a first symbol and transmitting from the one of the objects a second symbol, the transmission of the second symbol being separated from the transmission of the first symbol by a time interval which is a multiple of a first clock period; a transponder for (a) receiving the first symbol at the other of the objects and re-transmitting the first symbol back to the one of the objects and (b) receiving the second symbol at the other of the objects and re-transmitting the second symbol back to the one of the objects, the re-transmission of the second symbol being separated from the re-transmission of the first symbol by a second time interval which is a multiple of a second different clock period; a clock counter for (a) measuring a first round-trip time corresponding to detection of receipt from the other of the objects of the first symbol, the first round-trip time being a multiple of the first clock period, and (b) measuring a second round-trip time corresponding to detection of receipt from the other of the objects of the second symbol, the second round-trip time being a multiple of the first clock period; a comparator for (a) testing if the round-trip times are not different by one first clock period, and (b) initiating repeating of the transmitting, the receiving, the re-transmitting, and the round-trip measuring of the second symbol until the round-trips are different by one first clock period; and a calculator for determining the distance between the objects using a velocity of the symbols, the clock periods, the time intervals, and the round-trip times.

In general, in another aspect, the invention features another method of measuring a distance between two objects. The method includes the steps of transmitting from one of the objects a plurality of symbols, the transmissions occurring in a first series in which consecutive transmissions are separated by a first time interval which is a multiple of a first clock period, the symbols having a constant velocity; receiving each of the symbols at the other of the objects and re-transmitting each of the symbols back to the one of the objects, the re-transmissions occurring in a second series in which consecutive re-transmissions are separated by a second time interval, the second time interval being different from the first time interval, the second time interval being a multiple of a second clock period which is different from the first clock period, each re-transmission thus occurring after a delay, the delay being different for each re-transmission and constituting the period of time between arrival of each symbol at the other of the objects and re-transmission of each symbol, the delay having a nominal length which is a multiple of a delay unit, the delay unit being equal to the product of the number of first clock periods corresponding to the first time interval and the difference between the clock periods, the delay unit also being equal to the second clock period divided by the number of symbols in the plurality of symbols, the delay having an actual length which is within one delay unit of the nominal length; measuring a round-trip time corresponding to detection of receipt from the other of the objects of each of the symbols, each round-trip time being a multiple of the first clock period; and determining the distance between the objects by multiplying the velocity of the symbols by half of the difference between the average of all of the round-trip times and the first clock period.

Preferred embodiments of this aspect of the invention include the following features. The delay may further include an extra delay which is a multiple of the second clock period; and the distance may be determined by multiplying the velocity by half of the difference between (a) the average of all of the round-trip times and (b) the sum of the extra delay and the first clock period. The method may further include a step of offsetting the average of the round-trip times, wherein the offset is an amount of time equal to the second clock period divided by twice the product of (a) the number of symbols and (b) the number of first clock periods corresponding to the first time interval.

In another aspect, the invention features another method of measuring a distance between two objects. The method includes the steps of transmitting from one of the objects a plurality of symbols, the transmissions occurring in a series in which consecutive transmissions are separated by a time interval which is a multiple of a first clock period, the symbols having a constant velocity; detecting the transmissions using a second clock period, the second clock period being different from the first clock period, each transmission detection thus occurring after a delay, the delay being different for each detection and constituting the period of time between each transmission and the detection of each transmission, the delay having a nominal length which is a multiple of a delay unit, the delay unit being equal to the product of the number of first clock periods corresponding to the time interval and the difference between the clock periods, the delay unit also being equal to the second clock period divided by the number of symbols in the plurality of symbols, the delay having an actual length which is within one delay unit of the nominal length; returning each of the symbols from the other of the objects back to the one of the objects; detecting the arrivals of the returning symbols back at the one of the objects using the second clock period, each arrival detection thus occurring after a second delay, the second delay being different for each detection and constituting the period of time between each arrival and the detection of each arrival, the nominal length of the second delay being a multiple of the delay unit, the second delay having an actual length which is within one delay unit of the nominal length of the second delay; measuring a round-trip time corresponding to detection of receipt from the other of the objects of each of the symbols, each round-trip time corresponding to a multiple of a second clock period; and determining the distance between the objects by multiplying the velocity by half of the average of the round-trip times.

A preferred embodiment of this aspect of the invention includes the following feature. The symbols may be returned from the other of the objects after an extra delay; and the distance may be determined by multiplying the velocity by half of the difference between the average of all of the round-trip times and the extra delay.

Advantages of the invention include the following.

An operator is required to enter data into the system only once. After entry, the tags and devices in the system automatically move the data to where it is most needed. For example, the operator enters the contents of a particular asset into the tag attached to the asset. The tag then automatically communicates the contents to an inventory computer storing a list of local assets.

Because the tags communicate with other tags in their vicinity, the effective communications range of each tag extends beyond the range of its own communication circuitry. The effective range is further extended by placing an additional tag near a selected tag in the system. The selected tag relays communications from the remaining tags in the system to the additional tag. The remaining tags are thus not required to be located within the communication range and line of sight of the additional tag.

Once the tags are activated, they automatically seek other tags or devices in order to report their status. The system thus does not need to depend on the honesty of company employees in collecting and reporting data relating to the assets. The information reported by the tags takes a variety of forms. For example, a tag may monitor a sensor for the temperature of an object, and may notify a device of an abnormal increase in temperature. Similarly, the tag may determine a scheduled route for the asset, and report any deviations from that route to the user-operated device.

An operator obtains information relating to an asset in the system by directly querying an appropriate tag. Because several tags in the system share the information and can automatically move the information, the operator is likely to have access to a tag that either stores the needed information or that can acquire the information. The operator is thus not required to access an operations center that may be outside the operator's communications range in order to obtain the information.

A local or remote computer is easily integrated into the system. The computer gathers and disseminates information to operators who do not possess the appropriate device for querying tags, or to operators who are located far from any tag. The computer maintains a list of tags, their location and associated asset, so that any operator query can be directed to the tag.

Unlike the barrier systems described above, the system provides continuous spatial monitoring of the assets. Instead of only determining that a particular asset is located anywhere inside one or more cells, the system accurately locates a position of the asset within any cell. In addition, while barrier systems cannot typically determine a direction of movement of an asset when it crosses a boundary, the system according to the invention accurately determines direction and velocity of the asset.

Knowing the position and velocity of the asset allows operators to promptly find the asset in response to an emergency, and permits accurate policing of the asset to prevent future incidents. The assets are thus more secure from theft or misplacement, which is an important consideration when the assets include valuable cargo. In addition, the quick containment of incidents provides for more safety in transporting and storing of the assets. This is particularly important for assets carrying hazardous materials.

In some embodiments, the tags form an optimal communications network without user input, and update the network whenever there is a change in the location or identity of the assets. The tags define the network by designating tags for relaying information between specific pairs of tags. The network is optimized by minimizing the number of relay tags between every pair while maximizing the range of the communications. The tags superimpose on this network a hierarchy of communication links to other networks or devices.

The tags also optimize the network by assigning specific functions to particular tags in order to prevent tags from needlessly repeating the functions of other tags. These functions include checking whether assets have been added to or removed from the network.

The tags design the network based on their calculations of the location of other tags. Error correcting algorithms in the tags permit them to compute these locations with a high degree of accuracy. When new information becomes available to a tag (for example, when a new tag is added to the network), the tags automatically refine their location calculations.

When a network becomes too large, the tags automatically optimize the network by dividing it into subnetworks. When a network becomes too small, the tags join the network to another network.

The communications links include existing wireless communication links, for example, cellular telephone links. The system thus does not require investment in a long distance communications infrastructure. The system is also flexible enough to use a number of communication protocols. This is accomplished by providing tags to translate communications between different standards, such as are used with radio frequency, infrared, sound and serial link.

The tags remain active for long periods by employing a variety of energy conservation methods. These include tapping an external power source (for example, a vehicle battery) directly or through an intermediary tag, or by including a large or rechargeable battery in the tag.

The tags power themselves down between operations. This is possible because the tags can process and communicate information faster than they are typically queried by an operator. In a powered down, comatose mode, the batteries consume energy at a rate comparable to the degeneration rate of the stored battery.

The tags communicate with low power by minimizing the time required for communications, and using the optimal relay tags designated in the network. The tags further conserve energy by only reporting the existence of exceptional conditions to the device, instead of continuously reporting normal conditions. For example, a tag only communicates the fact that a temperature of an asset exceeds a given threshold, instead of continually reporting the temperature to the device.

Once subnetworks are formed, the tags conserve energy by communicating compacted information within the subnetwork, and uncompacting the information for communication outside the network. For example, each tag in the subnetwork is assigned a truncated ID that is shorter than its actual, global ID. The code indicating a type of communications between the tags is similarly truncated. The tags within a subnetwork synchronize their functions by powering on for a short time simultaneously.

Arranging the tags in a hierarchy of networks requires that only a selected tag within a network perform long range communications with a tag in another network. The tags within a network, being located within closer range of one another, employ lower energy for all their communications.

The selected tag communicates only with tags in a network at an adjacent level of the hierarchy. The tag in the adjacent level acts as a repeater, relaying the selected tag's message to another level of the hierarchy. The selected tag thus does not perform the longer range communications necessary to communicate directly with a network removed by several levels.

The methods and apparatus used for finding the distance between two objects or tags are efficient in time and in the number of steps involved. Significant improvements in distance measurement are obtained through the use of only a handful of symbols.

For distance measurement, the two objects operate in half-duplex mode so that separate channels are not needed for the outgoing leg and the return leg of the symbols' round-trip.

The distance measurement is made using only two clocks, which in some embodiments are included in the same object. If the clocks are included in the same object, the other object need operate only as a simple reflector or repeater of the symbols.

The methods and apparatus used for finding the distance between two objects also consume little energy.

The tags are standardized to allow them to be easily added and removed from a network. Flexibility is provided by connecting the tags to special tags (helper tags), which perform specialized support functions. These functions include providing additional power to the attached tag and acting as a communications interface for the tag.

The tags are small and easily fixed to assets. The lifetime and cost (including labor cost of use) of the tags is comparable to that of bar codes. The user interfaces on the user-operated monitoring device and computers are simple to use and reduce operator errors. For example, the monitoring device includes a personal digital assistant which has a menu of options. Enabling the user to select options instead of entering commands reduces the user's workload and minimizes potential errors.

Other features and advantages of the invention will become apparent from the following description and claims.

DESCRIPTION OF THE PREFERRED EMBODIMENTS

I. Overview of the Asset Management System

Figure 1:
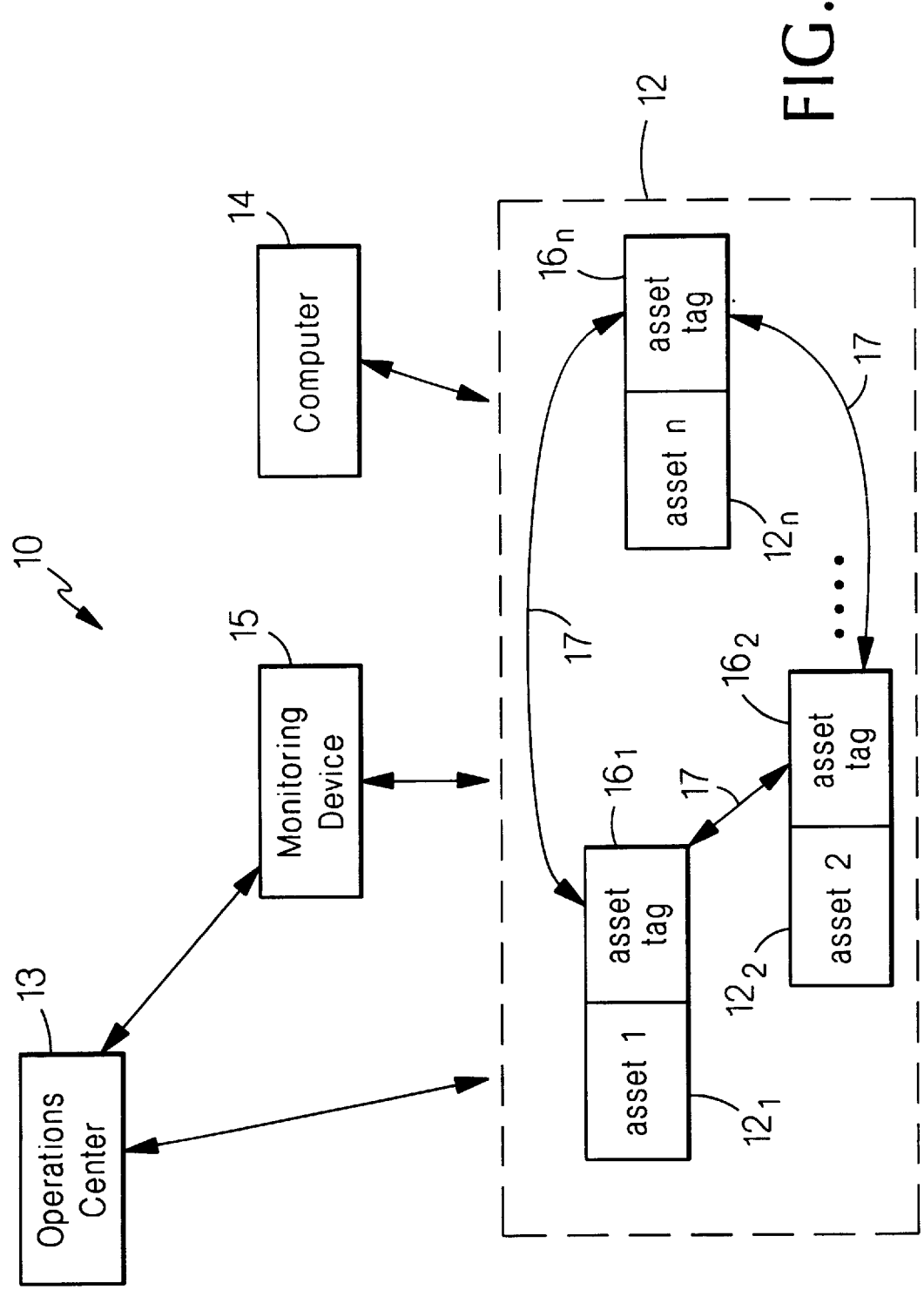
FIG. 1 is a schematic representation of an asset management system according to the invention.

Referring to FIG. 1, an asset management system 10 includes a collection of assets 12, individual assets respectively (identified as $12_1, 12_2, \ldots 12_n$) each having an asset tag respectively (identified as $16_1, 16_2, \ldots 16_n$) linked to a remote operations center 13 and a local computer 14. The operations center and computer both store and process information relating to the assets. A remote user employs the operations center to access the information, while a local user queries the computer. A local monitoring device 15 is linked to both the collection of assets and the operations center, and provides a mobile, portable interface for the local user.

The operations center, local computer and monitoring device can be linked to the collection of assets by at least one communication relay, for example, a cellular base station. Alternatively, the center, computer and device are linked directly to the collection of assets.

Figure 2:
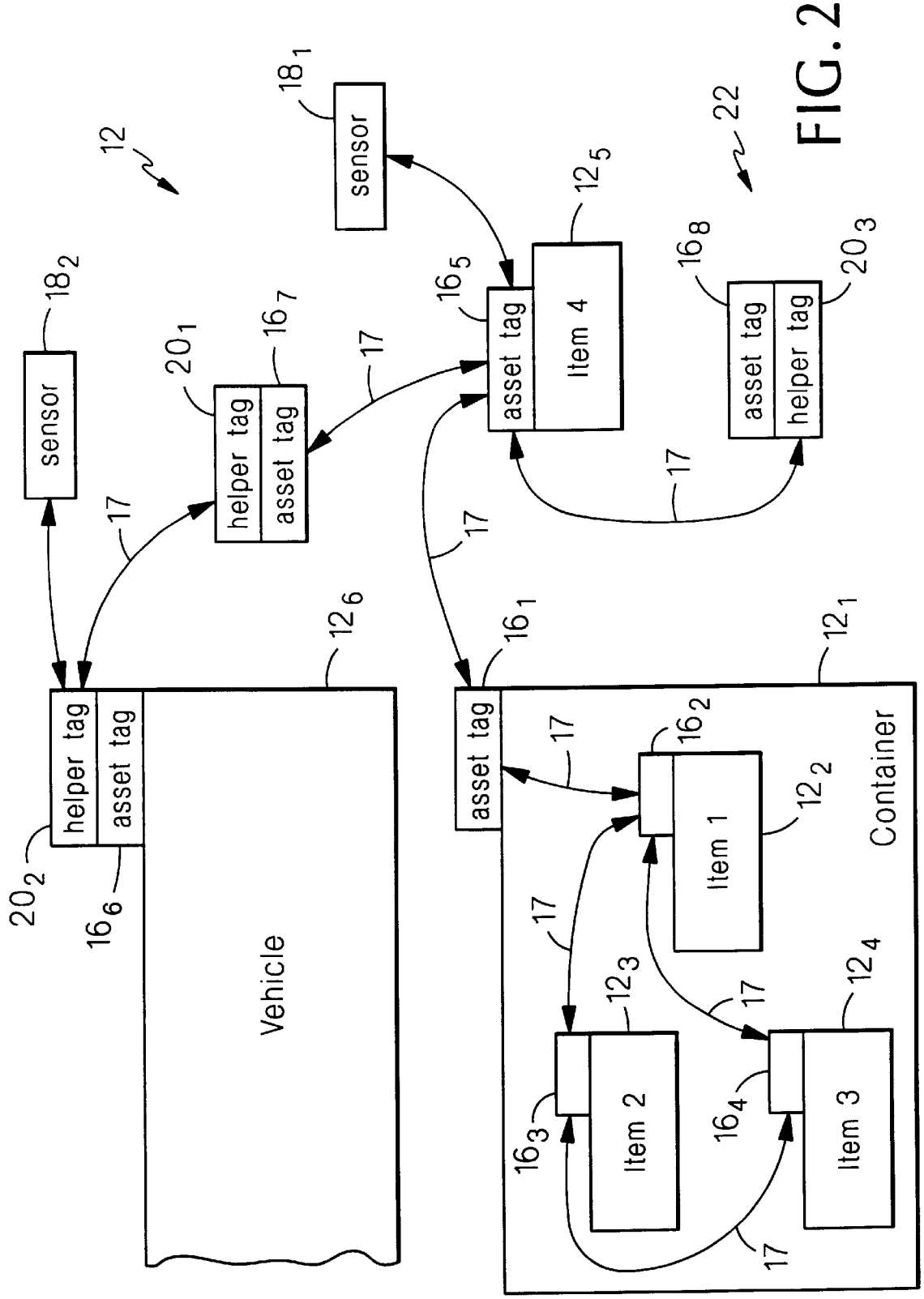
FIG. 2 is a schematic representation of a collection of assets in the system of FIG. 1.

Referring to FIG. 2, in one illustrated embodiment, the assets in the collection includes items $12_2, 12_3, \ldots, 12_5$, a container $12_1$ storing items $12_2, 12_3, 12_4$, and a vehicle $12_6$ for transporting the container and the items. For example, in a monitoring system for a warehouse, the assets include forklifts transporting pallets that store containers.

Each asset in the collection is equipped with an active electronic asset tag $16_1, 16_2, \ldots, 16_6$. Each asset tag is in communication with other asset tags that are within their communication range. A partial set of possible communication links 17 between asset tags is diagrammatically shown in FIG. 2 although in actuality, the links would be wireless. Additional asset tags $16_7, 16_8$ can be placed in the vicinity of the assets to assist in tag communications.

Selected asset tags can also communicate with sensors $18_1, 18_2$ and helper tags $20_1, 20_2, 20_3$ located near the assets. The sensors monitor a characteristic of an asset or of the asset's environment. For example, sensor $18_1$ monitors the temperature of item $12_5$, while sensor $18_2$ detects the location of the vehicle $12_6$.

The helper tags perform a variety of specialized functions. For example, helper tag $20_1$, provides power to asset tag $16_7$, and helper tag $20_2$ acts as a communication interface for asset tag $16_6$. Asset tag $16_8$ and helper tag $20_3$ together form an interrogate and respond module 22 that provides a description of the collection of assets when activated by an interrogator, for example, a radar gun.

Some asset tags communicate with the monitoring device 15 and the computer 14 located near the assets (FIG. 1). The monitoring device and some of the tags and sensors are additionally capable of long range communication with the remote operations center 13.

Some or all of the asset tags and helper tags process information regarding other asset tags and sensors in their vicinity, and use this information to form a communication network. The network defines a set of communication links between a neighboring group of helper tags, asset tags, sensors, devices and computers that maximizes the efficiency of communications within the group.

The asset tags are either battery powered or powered by an external source. The battery powered tags include various mechanisms for minimizing the energy consumed by the tag.

For example, the tags are placed in a low energy, sleep state between communications.

The local user employs the monitoring device 15 to survey the status of the assets in a variety of ways (see FIG. 1). For example, the local user may attempt to communicate with asset tag $16_5$ to determine whether the attached item $12_5$ is present in the system. In addition, the local user may use the device to query sensor $18_2$ through helper tag $20_2$ to determine a location of vehicle $12_6$.

The remote user may inform the operations center 13 of a new route planned for the transportation of a particular item in the system. The center relays this information to the monitoring device, which downloads the information to the tag attached to the particular item. The local user learns of the new route through the monitoring device.

The general system described above is tailored to specific applications by omitting certain components of the system, and/or by modifying the functions performed by a particular component in the system. For example, an application may omit the operations center and rely only on the local computer. The monitoring device in this system would then omit all functions relating to an operations center.

The following section provides a short overview of several specific applications.

II. Overview of Specific Applications of the System

Figure 3:
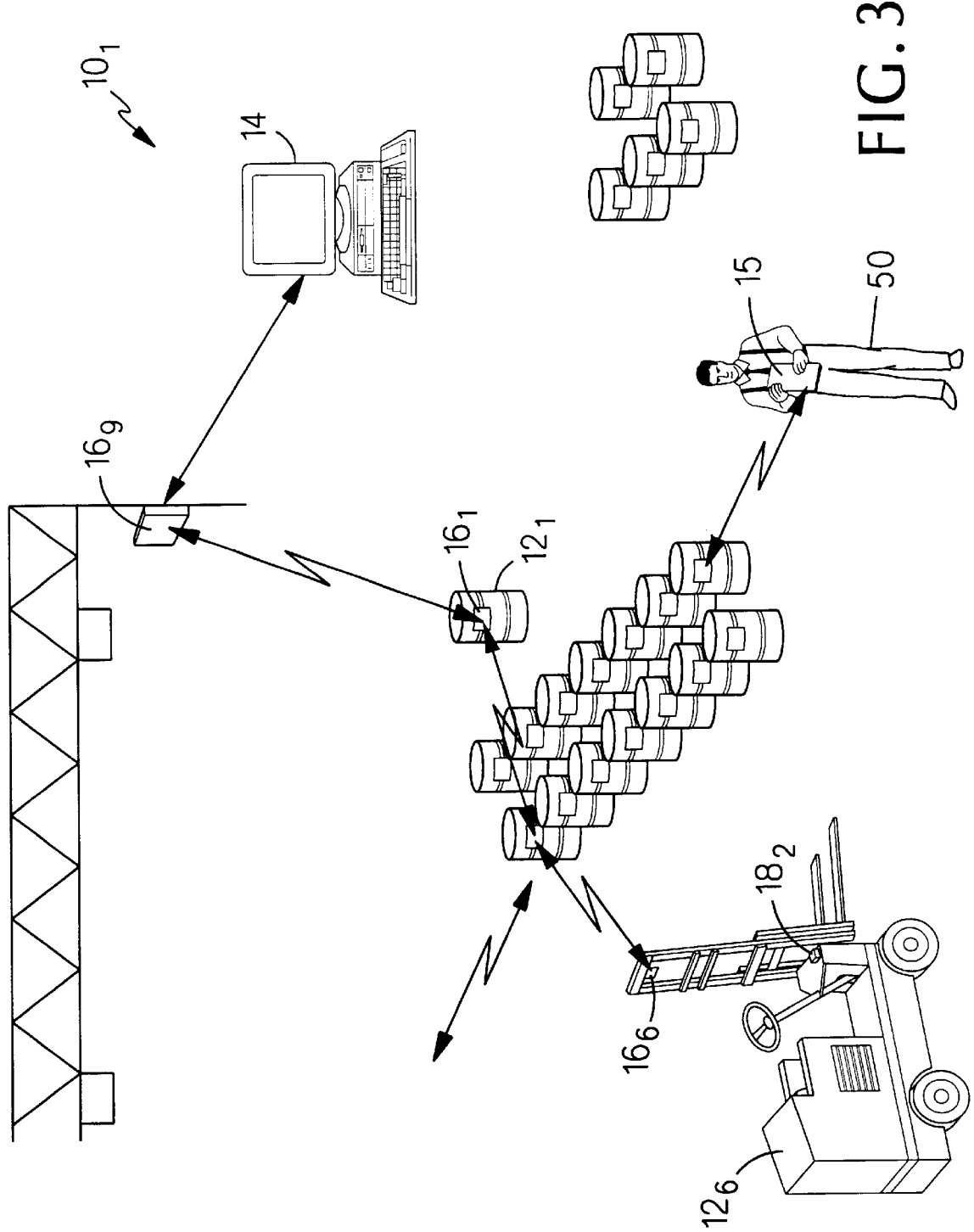
FIG. 3 is a schematic representation of the system of FIG. 1 as applied to a warehouse storing assets.

Referring to FIG. 3, one application $10_1$ of the system 10 is designed for monitoring the location of containers $12_1$ in a warehouse. (The assets will be uniformly labelled in the examples which follow as $12_i$ and the tags as $16_i$.) Each container $12_1$ in the warehouse, along with a forklift truck $12_6$ used for moving the containers, is equipped with an asset tag $16_1$, $16_6$, respectively. Tag $16_6$ on the truck is equipped with a global positioning system (GPS) sensor $18_2$ for determining the truck's location.

An asset tag $16_9$ (a gateway tag) capable of long range communications is mounted on a wall of the warehouse, and is in communication with a central inventory computer 14. The tags automatically form an efficient communication network for sending information to the inventory computer through the gateway tag. A user 50 monitors the location of the containers by using monitoring device 15 to directly access the asset tags on the containers. The user may also access the tags through the inventory computer.

Figure 4:
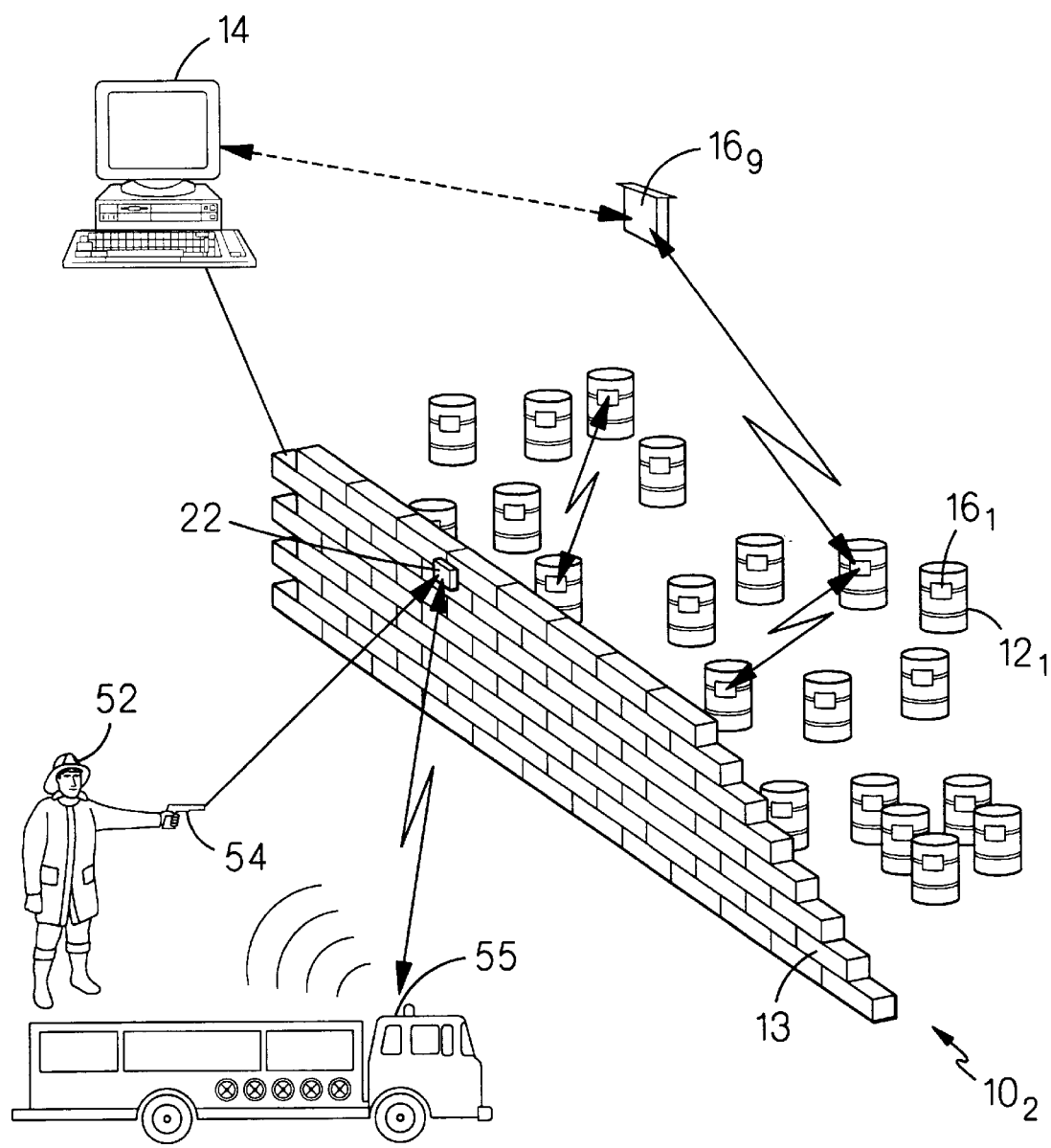
FIG. 4 is a schematic representation of the system of FIG. 1 as applied to a warehouse storing hazardous materials.

In another application $10_2$, shown in FIG. 4, a warehouse stores containers $12_1$ of hazardous waste. Each container is equipped with an asset tag $16_1$. Inventory computer 14 communicates with the asset tags through gateway tag $16_9$, in a manner identical to that described above in connection with FIG. 3.

An interrogate and respond module 22 is attached to an outside wall 13 of the warehouse. In the event of an emergency, a fireman 52 informs himself of the contents of the warehouse by querying the module using a standard police radar gun 54. The module responds with a synthesized voice message over the fireman's radio receiver 55. The fireman is thus notified of the hazardous contents of the warehouse before entering the warehouse.

Figure 5:
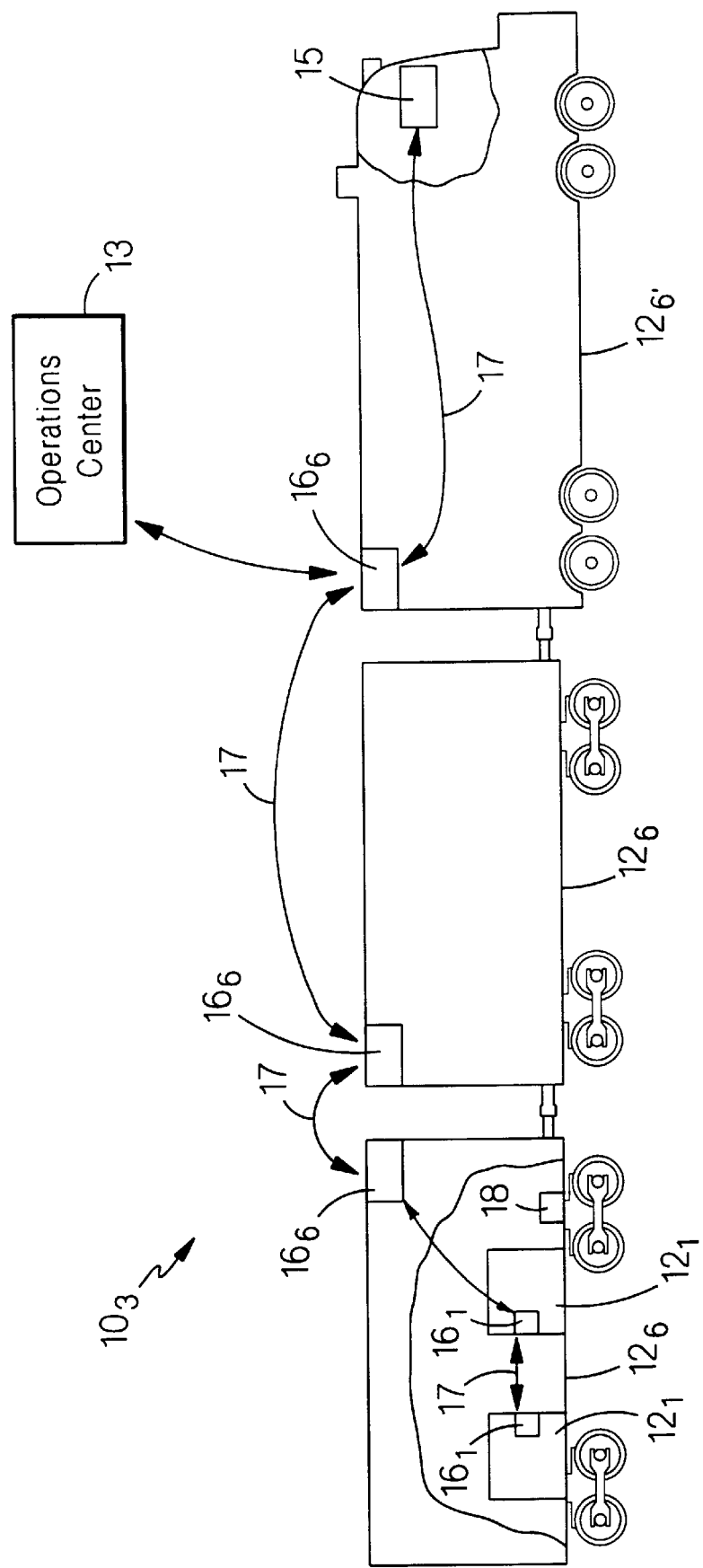
FIG. 5 is a schematic representation of the system of FIG. 1 as applied to a train carrying assets.

Referring to FIG. 5, another application $10_3$ monitors railway cargo by mounting a tag $16_6$ on each railway car $12_6$ and on the locomotive $12_6'$. Tags $16_1$ are also mounted on each container $12_1$ transported in the cars. The tags on the containers form a network with the tags on the cars and on the locomotive. The conductor uses a monitoring device 15 to communicate with the operations center 13 through the tag on the locomotive.

Several sensors 18 can be mounted, according to this embodiment, in the railway cars. These include a brake release sensor monitoring whether the brakes in a car have been released, a temperature sensor, and a fuel level sensor. A GPS sensor is typically provided near the tag on the locomotive.

Figure 6:
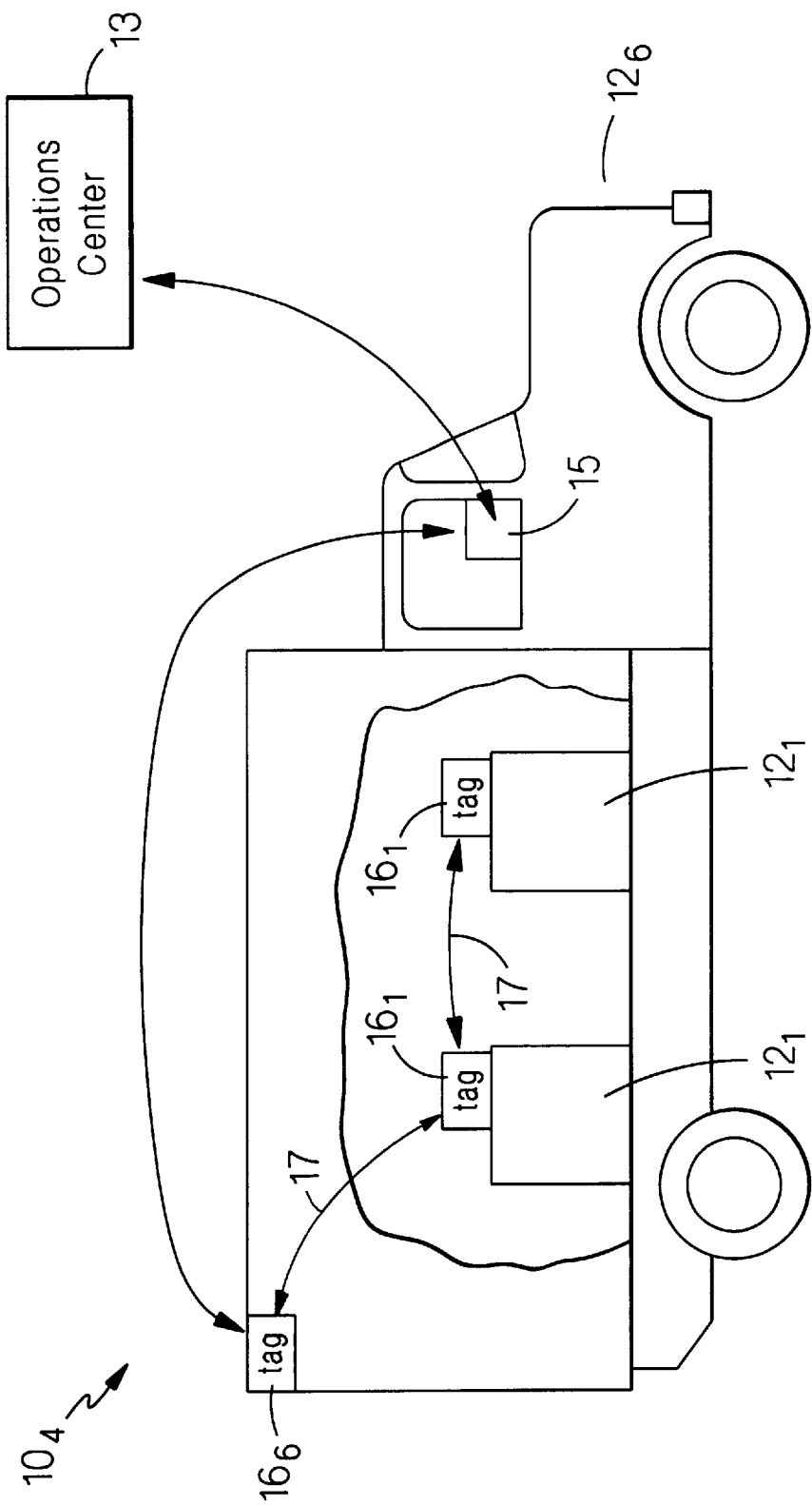
FIG. 6 is a schematic representation of the system of FIG. 1 as applied to a truck carrying assets.

A similar application $10_4$, shown in FIG. 6, involves monitoring the transportation of hazardous waste or other materials by a truck $12_6$. Asset tags $16_6$, $16_1$ are fixed to the truck and each container $12_1$ in the truck. A driver communicates with the tags on the containers with a monitoring device 15, which reports relevant information to an operations center 13. Unlike the railroad application described above, the tags in this application need not automatically form a communications network.

Figure 7:
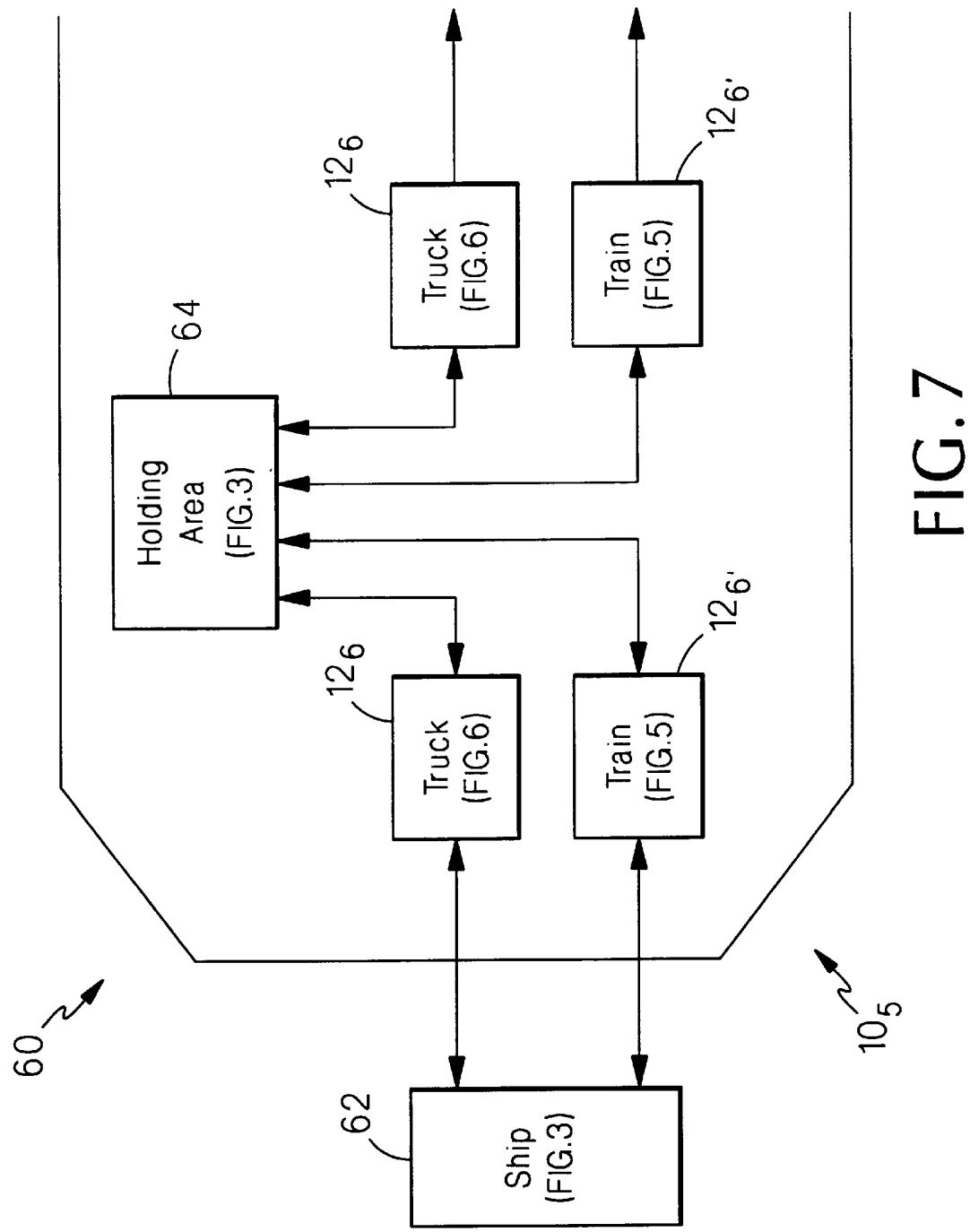
FIG. 7 is a schematic representation of the system of FIG. 1 as applied to a shipping port moving assets between a ship and a holding area.

Another application $10_5$, shown in FIG. 7, monitors the location of containers at a shipping port 60. Each container is equipped with an asset tag. Trucks $12_6$ and trains $12_6'$ carrying the containers to and from a ship 62 and holding area 64, are equipped with the systems in applications $10_3$, $10_4$ described above, respectively. The holding area 64 and the ship 62 include the warehouse application $10_1$ described in connection with FIG. 3. Arrows in FIG. 7 show the flow of containers between the ship and holding area.

Figure 8:
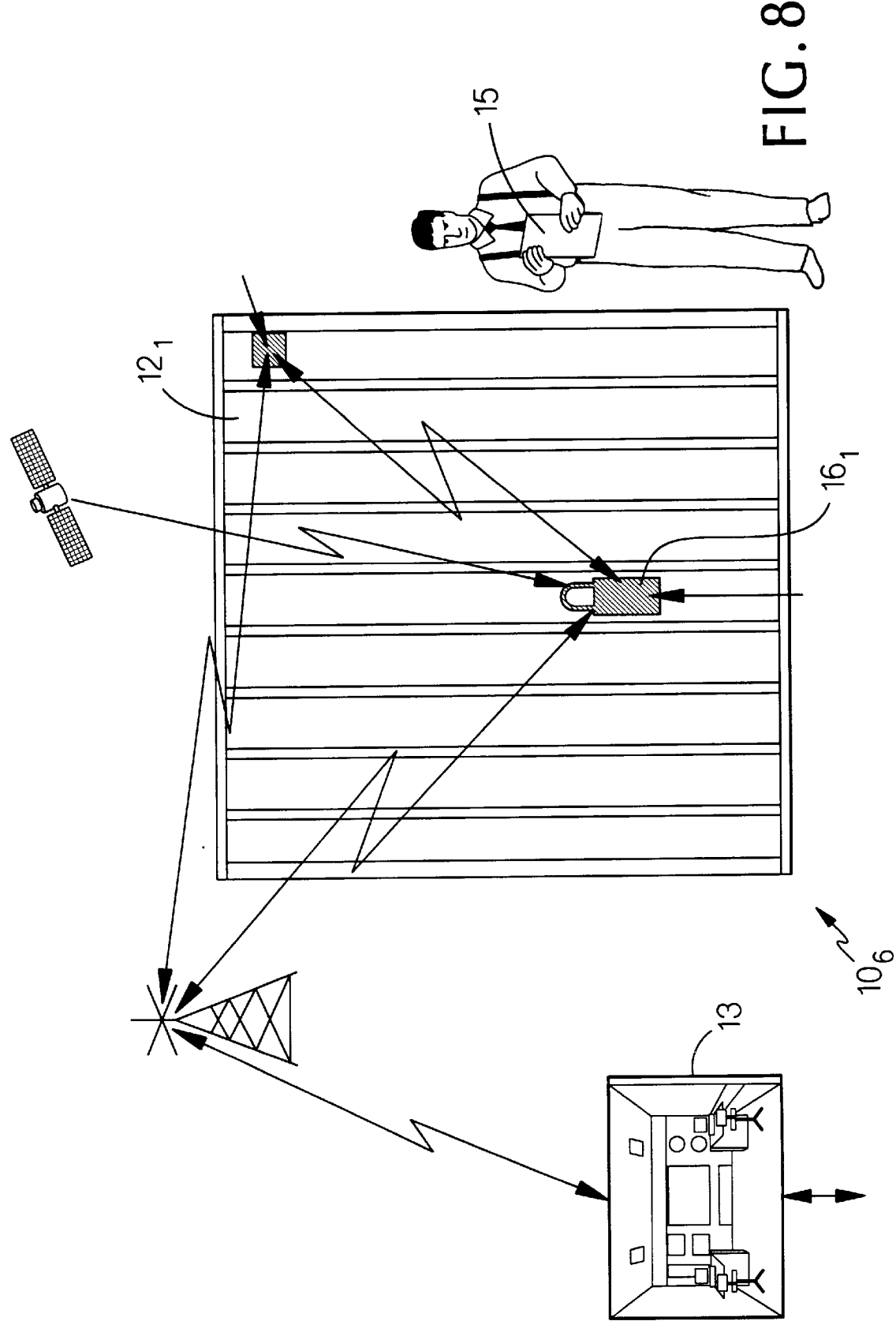
FIG. 8 is a schematic representation of the system of FIG. 1 as applied to a bonded carrier moving assets.

Referring to FIG. 8, another application $10_6$ of the system monitors bonded carriers that transport goods near or across national borders. These carriers are required to prevent their conveyances from being opened as they travel between specified locations near the borders.

Each container $12_1$ in the conveyance is equipped with an asset tag $16_1$ incorporating a tamper detector. When the tamper detector indicates to the asset tag that it has been damaged, the tag alerts an operations center 13. The operations center in turn notifies the carrier that one of its containers may have been tampered with.

Figure 9:
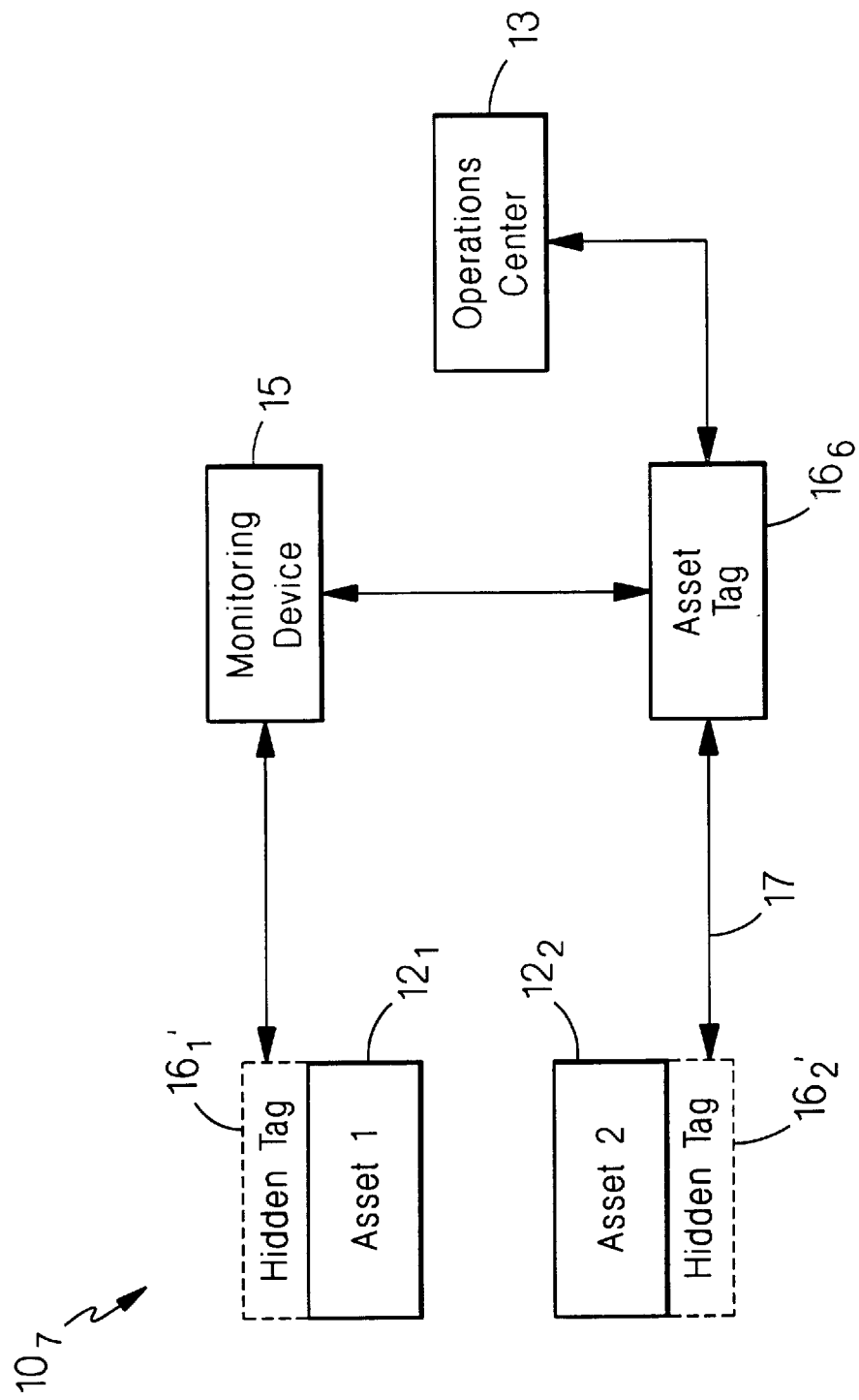
FIG. 9 is a schematic representation of the system of FIG. 1 as applied to a clandestine tracking system for stolen or contraband assets.

Another application $10_7$, shown in FIG. 9, monitors the location of valuable assets $12_1$, $12_2$ in a clandestine fashion to prevent theft. For example, the assets may include jewelry in a home or art objects in a museum.

The tags $16_1'$, $16_2'$ on the assets are hidden from view, to prevent a thief from noticing and removing the tags. This is generally accomplished by attaching very small but relatively low power tags to the assets. The tags are tracked by a monitoring device 15, or by another tag $16_6$, for example, a tag mounted in a conveyance in which the assets are being transported. The tag $16_6$ notifies the monitoring device 15 or an operations center 13 of the presence of the asset in the conveyance.

The full range of functions of each component in the asset management system of FIGS. 1 and 2 is described in the following sections of the Description. When used in one of the applications shown in FIGS. 3 through 9, a component may omit some of these functions. For example, the asset tags in the application of FIG. 6 do not automatically network with other tags. Details of the particular design of the components and their interactions in particular applications are given in Section XII.

III. Asset Tag

A. Structure of the tag

Figure 10:
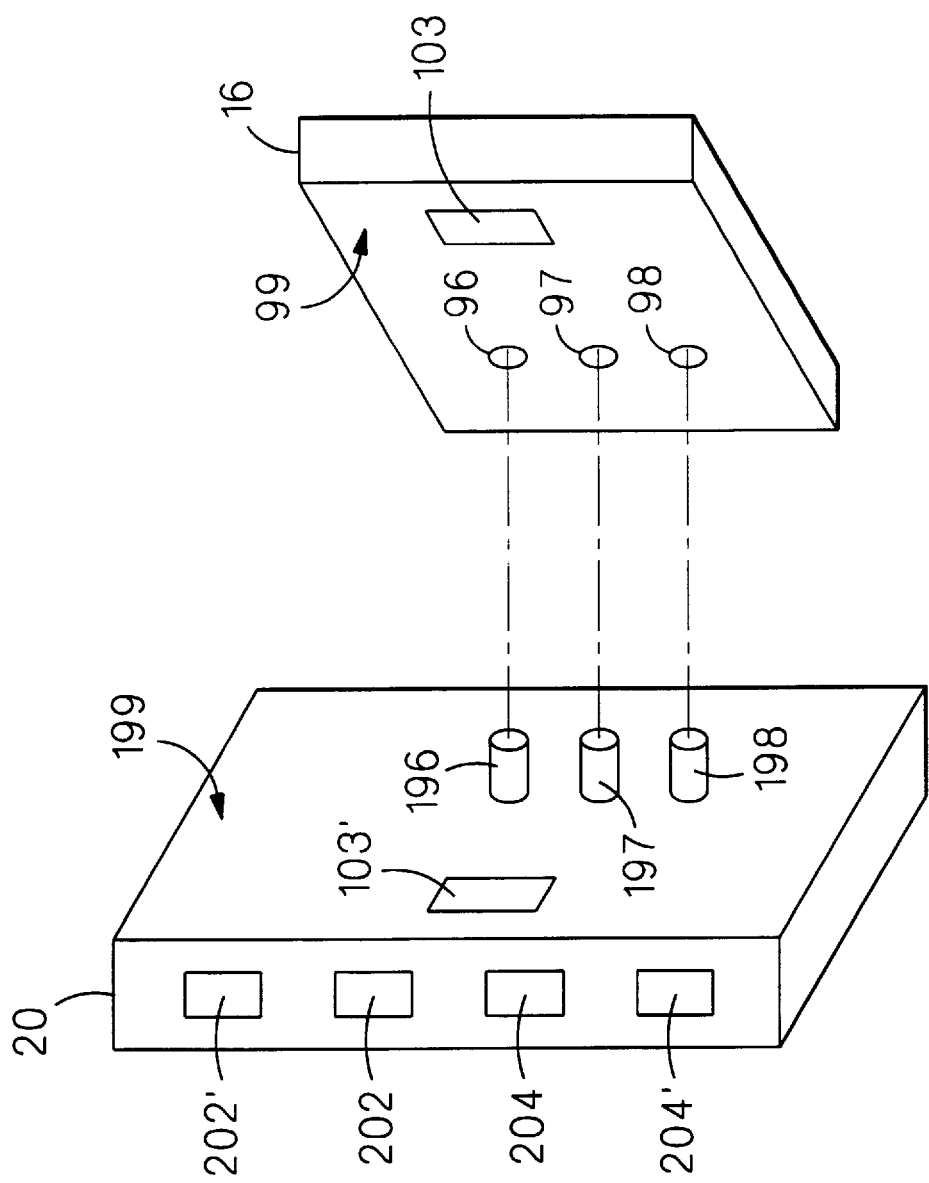
FIG. 10 is a perspective view of an asset tag and helper tag in the system of FIG. 1.

In the embodiment of the invention illustrated in FIG. 10, each tag 16 is a small rectangular package 2.5 cm on a side and 1 cm in thickness. (Other shapes and sizes could be used.) The illustrated tag has three recesses 96, 97, 98 on one face 99.

Figure 11:
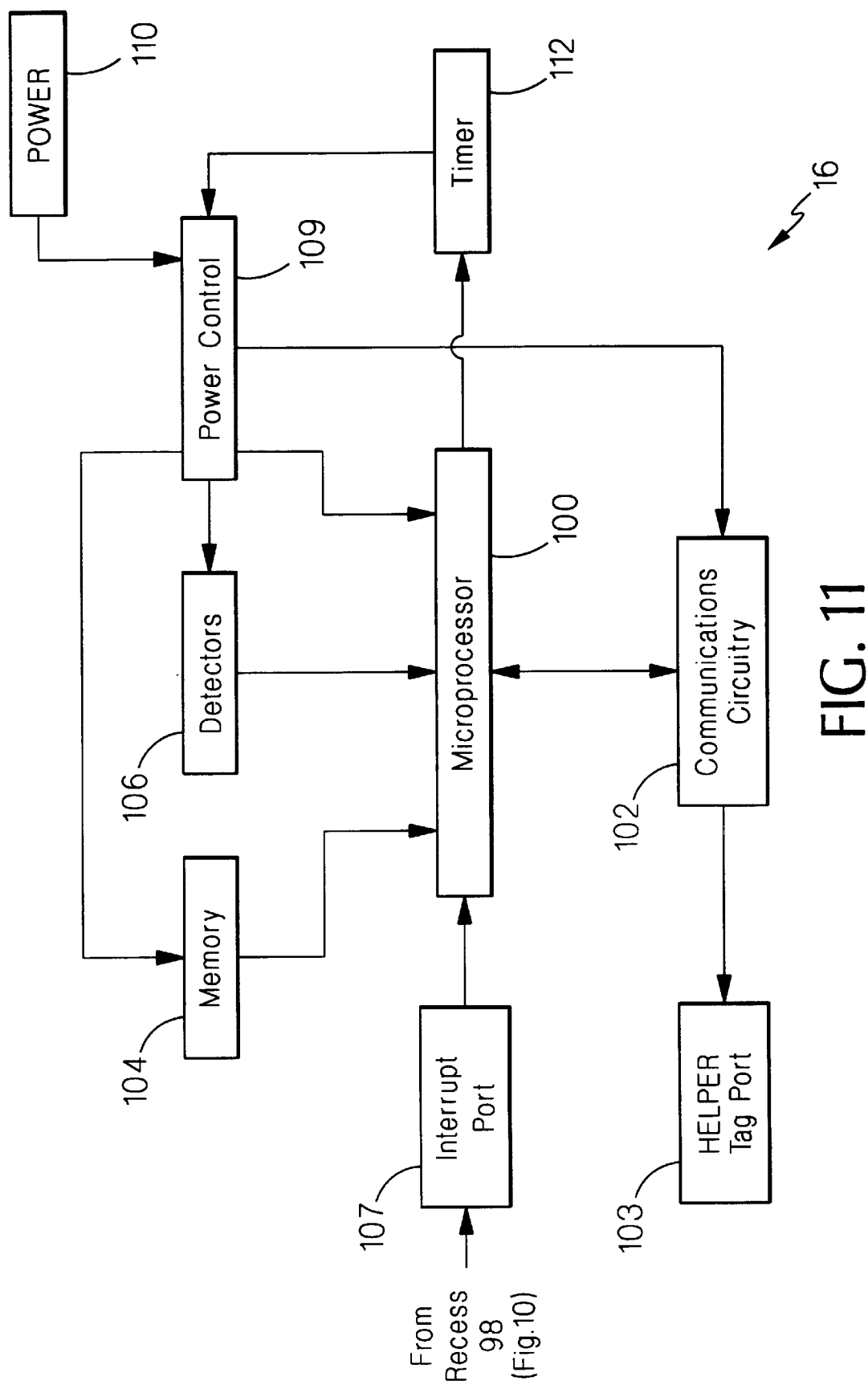
FIG. 11 is a block diagram of an asset tag port on the helper tag of FIG. 10.

Referring to FIG. 11, the interior of each tag includes a microprocessor 100, for example, model MC68L11A1FN available from *Wyle Electric*, 20 Chapin Rd., Bldg. 1013, P.O. Box 684, Pine Brook, N.J. 07058, which is provided with an adjustable clock. The microprocessor is connected to communications circuitry 102 which performs short range infrared (IR) and long range radio frequency (RF) communications with other tags and devices. The circuitry in this embodiment is connected to a helper tag port 103 located on face 99 of the tag (FIG. 10).

The microprocessor is coupled to a memory 104 for storing information and a set of detectors 106 for determining a status of the tag. The microprocessor is also coupled to an interrupt port 107 for receiving an interrupt signal from outside of the tag. The interrupt port 107 is connected at recess 98 on face 99 of the tag (FIG. 10).

A power controller 109 in the tag links the microprocessor to a power source 110. A timer 112 connected between the microprocessor and the power controller regulates the controller. The controller supplies power to the detectors, the memory, the timer and the communication circuitry, adjusting the power supplied to the communications circuitry by up to 10 db as commanded by the microprocessor.

Figure 12:
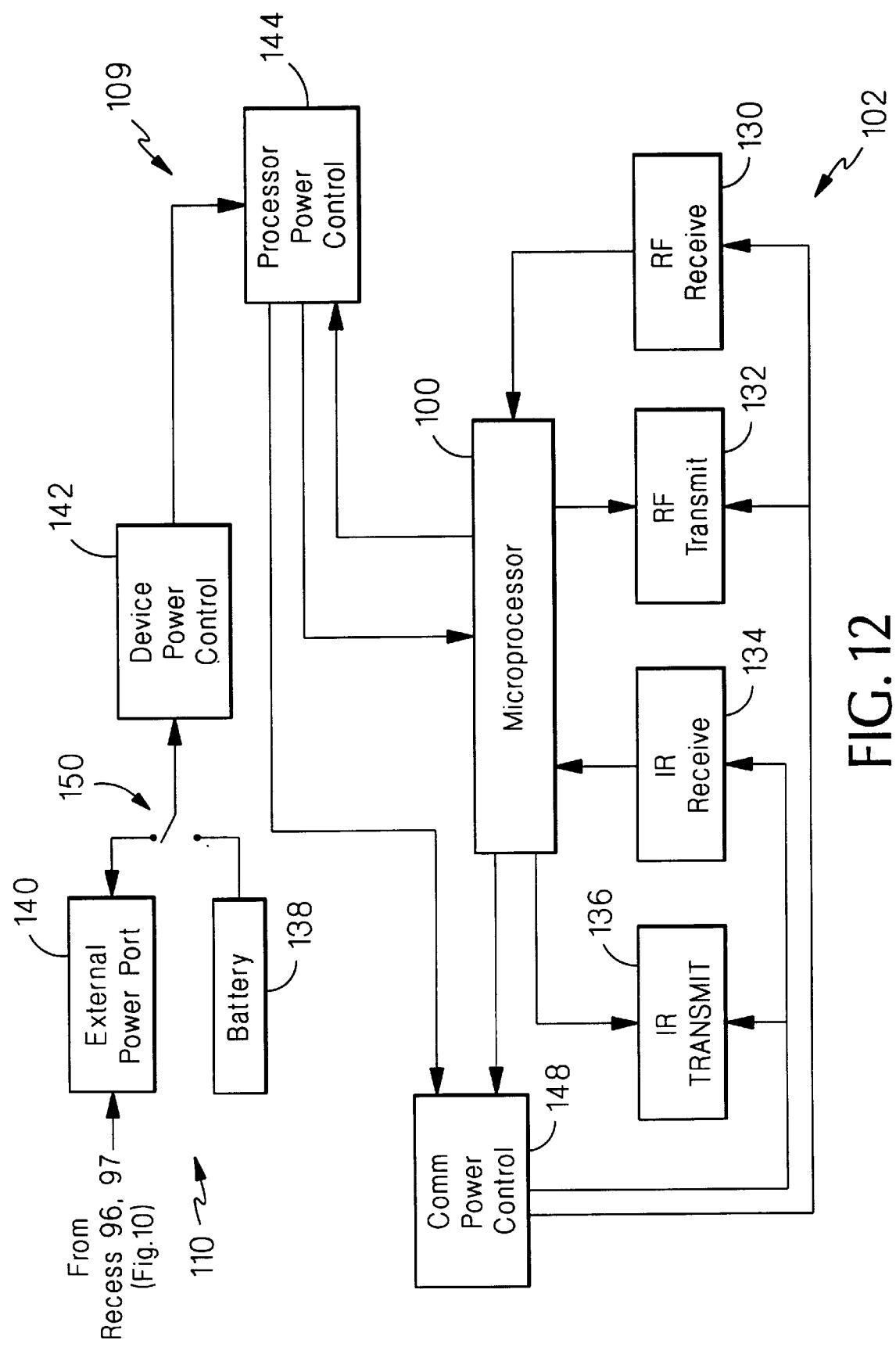
FIG. 12 is a block diagram of communications and power control circuitry in the asset tag of FIG. 10.

Referring to FIG. 12, the communication circuitry 102 (shown here in greater detail) includes an RF receiver 130 and transmitter 132 and an IR receiver 134 and transmitter 136, each of which is connected to the microprocessor 100.

The microprocessor causes the RF receiver and transmitter to communicate at, for example, 916.5 MHz with one of ten different spread spectrum, direct sequence gold codes. The IR transmitter and receiver communicate, preferably, with an unmodulated IR signal. The microprocessor also causes selected communications to be coded with public or private key encryption. The maximum communication range of the RF circuitry is on the order of 100 m, at a data rate, typically, of 25 kbps.

The power source 110 includes a battery 138 and an external power port 140. The battery has a two year active lifetime, with a ten year storage life. Power port 140 includes a power connection and a ground connection coupled to recesses 96, 97, respectively, on face 99 of the tag (FIG. 10).

The power controller 109 has three separate controls: a device power control 142, a processor power control 144 and a communications power control 148. The battery and external power source are coupled to the device power control by a switch 150 which automatically switches to the external power port when an external power source is available.

The processor power control 144 is connected to the device power control 142 and provides power directly to the microprocessor. The processor power control in turn receives control signals from the microprocessor. The communications power control 148 also derives power from the processor power control 144, and accepts control signals from the microprocessor. The communications power control 148 in turn supplies power to the IR transmitter 136, IR receiver 134, RF transmitter 132 and RF receiver 130.

Figure 13:
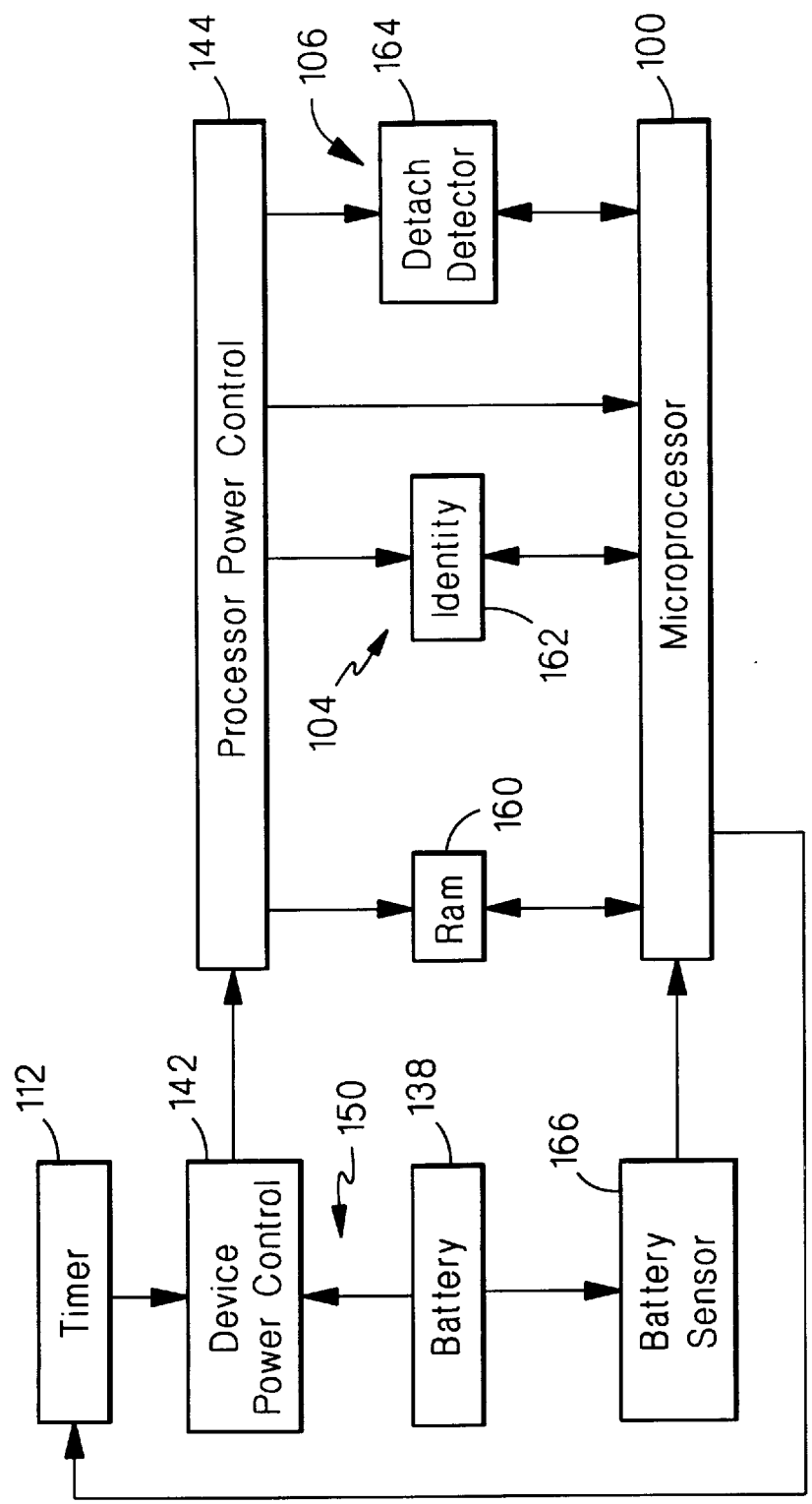
FIG. 13 is a block diagram of detector, memory and power control circuitry in the asset tag of FIG. 10.

Referring to FIG. 13, the processor power control 144 is additionally connected to the timer 112 by the device power control 142. The timer is in direct communication with the microprocessor.

The memory 104 in the tag (FIG. 11) includes a random access memory 160 (RAM) of at least 32 kB capacity, together with an identity store 162 (FIG. 13). Both the RAM and identity store are connected to the microprocessor, and receive power from the processor power control.

The detectors 106 in the tag (FIG. 11) include a detach detector 164 (FIG. 13) and a battery sensor 166. Both the detach detector and the battery sensor are connected to the microprocessor. The battery sensor is connected to the battery 138, and provides a signal to the microprocessor when the battery voltage falls below 2.7 V in the illustrated embodiment. The detach detector includes an electromechanical switch placed on one face of the tag, that is depressed when the tag is mounted on an asset. The switch derives power from processor power control 144 and provides a signal when the tag is detached from the asset, causing the switch to be released.

B. Basic operation of the tag

In use, the tag conserves energy by remaining in a low power state for approximately 99% of its lifetime. The tag remains in one type of low power state (a comatose state) until activated by an interrupt signal over interrupt port 107 (FIG. 11) or by a low frequency signal from timer 112. A second type of low power state (a sleep state) is interrupted by a higher frequency signal from the timer 112.

The tag begins its functions when an operator couples the external power port on the tag to an external power source. This causes switch 150 to connect the port to the device power control.

When connected to an external power source, the processor power controller supplies power from the power port to the microprocessor, placing the microprocessor in an awake state. The microprocessor remains in the awake state until it receives a high voltage signal from the interrupt port. The interrupt signal is typically supplied by connecting a helper tag 20 (FIG. 1) to the interrupt port, as described below.

The microprocessor then performs various functions, including communicating with the monitoring device 15 (FIG. 1) or other asset tags. These functions are described in detail in the following sections.

After the microprocessor has completed its functions, the microprocessor sets a frequency at which the timer sends a wake up signal to the power controller. The timer notifies the power controller to reduce the power supplied, to place the microprocessor in a sleep state. The microprocessor is subsequently awakened from the sleep state each time the power controller receives a wake-up signal from the timer.

The microprocessor synchronizes the wake-up timer with other asset tags and devices with which the tag communicates, as follows. First, the tag seeks an absolute time signal from a GPS sensor $18_2$ (FIG. 2), to set the internal clock in the microprocessor to the absolute time. The internal clock in the microprocessor records the length of time over which the tag remains awake, that is, the processing time required for the tag to communicate with other tags and devices, and to perform various functions. After being awakened several times, the microprocessor derives an average processing time for each wake-up signal. Based on the average processing time, the microprocessor informs the timer of an ideal wakeup frequency. Subsequently, the timer supplies signals to the power controller causing the power controller to wake the microprocessor from its sleep state at the ideal frequency.

When employing the RF transmitter, the microprocessor causes the transmitter to communicate an appropriate synchronization code for spread spectrum communication. If the tag is not synchronized with other tags, the transmitter broadcasts the code for T seconds, allowing enough time for the other asset tags to wake up and receive the code.

C. Other Embodiments

In other embodiments, the communication circuitry in the asset tag includes acoustic or optical communications, or long range communications circuitry. The RF communication protocol used may be 916.5 MHz, on-off keyed, or frequency modulated.

Long range communications circuitry include a cellular telephone connected to the microprocessor by a modem, or circuitry for employing all digital PCS (personal communications systems), AMPS (advanced mobile phone system), wireless data systems, GEOSAT systems (geosynchronous satellite), or LEOSAT/MEOSAT (low earth orbit satellite/medium earth orbit satellite). Other voice and data communications systems include Qualcomm's and InMarSat's geosynchronous based service, satellites for low cost messaging similar to two-way paging, CDPD and dedicated, trunked or other UHF and VHF communications.

The external power source can include solar power or fossil fuel power, for example, a vehicle's battery. If fossil fuel power is used, the tag can perform unlimited long distance communications. In embodiments where an external power source is readily available, the battery may be omitted. The tag can also be provided with an RS 232 port for factory testing.

If smaller tags are needed, for example, in the clandestine tracking application $10_7$ of FIG. 9, the battery is omitted or decreased in size. The size of a battery is proportional to the amount of energy it stores. A tag with a battery lasting two years is approximately 30 mm×30 mm×5 mm in size. For the clandestine application $10_7$ (shown in FIG. 9), a shorter lived, smaller battery is employed.

Some operations of the microprocessor (such as determining locations, described below) are alternatively performed by a machine performing logical and arithmetic calculations, for example, an ASIC state machine.

IV. Sensors

Sensors 18 (FIG. 2) can include a variety of analog and digital sensors. Each sensor is placed in the communications range of an asset tag 16 or helper tag 20, or is connected by a serial interface to a communications controller in monitoring device 15, described below.

Figure 14:
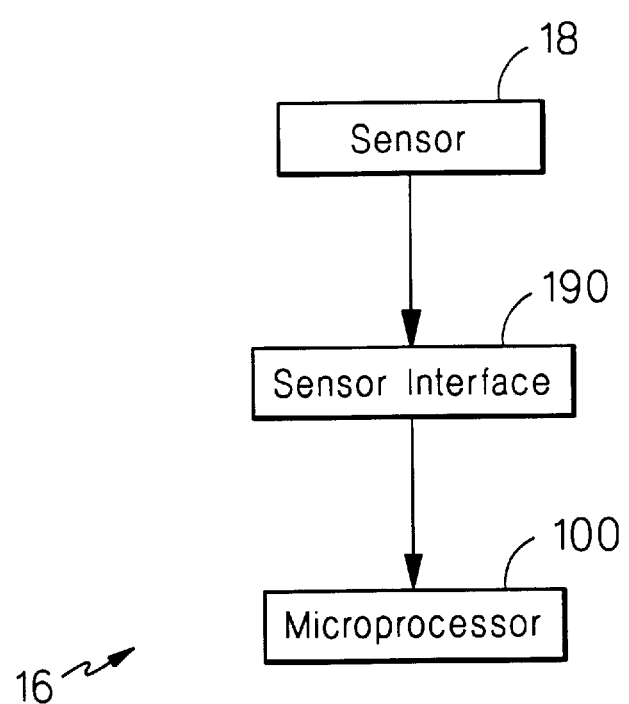
FIG. 14 is a block diagram of a sensor in the asset tag of FIG. 10.
Figure 15:
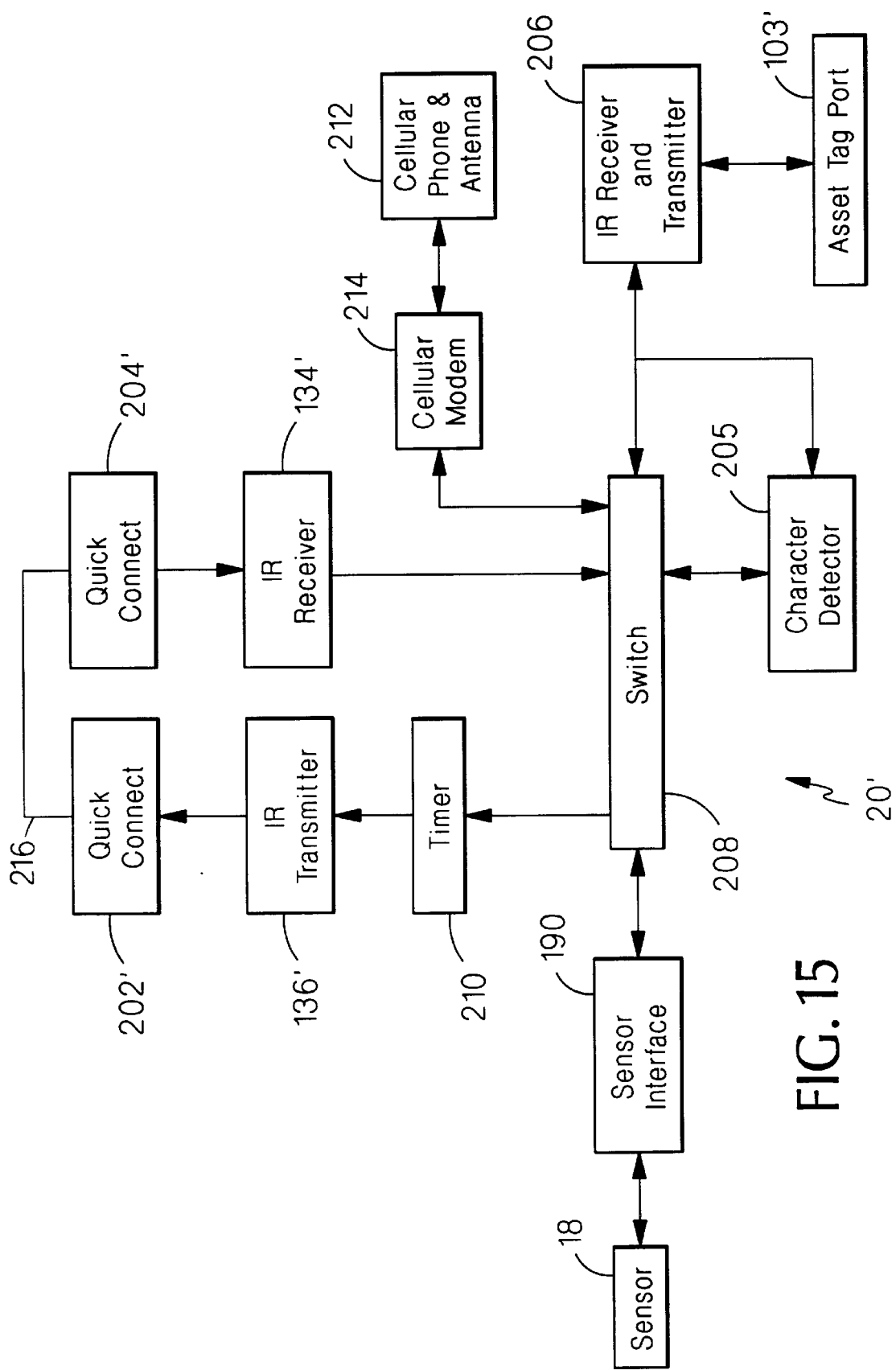
FIG. 15 is a block diagram of a helper tag in the system of FIG. 2.

Alternatively, as shown in FIG. 14, the sensor 18 is incorporated into the asset tag 16. The sensor is connected to the microprocessor 100 by a sensor interface 190. If the microprocessor has the capability of communicating with the sensor directly, the sensor interface is omitted. Similarly, the sensor can be incorporated in a helper tag 20 (FIG. 2), as shown in FIG. 15.

Tags communicating with the sensor generally report only deviations in the sensor's input from preset limits. The limits can depend on the absolute time, location of the sensor, or condition of an associated asset (for example, whether a tag has become detached from the asset). Examples of these functions are given below.

One type of sensor includes a global positioning system (GPS) receiver, for example, a Trimble Navigator, available from Trimble Navigator, Ltd., 438 East Main Rd., IronGate #1, Middleton, R.I. 02840. The GPS provides global coverage, continuous operation, and through a GPS receiver supplies position information with an accuracy on the order of 10 meters (or less depending whether the satellites function in a selective availability mode). The receiver also supplies velocity information and a current time. The receiver is typically operated for a few minutes to obtain ephemerides (locations) of the satellites in order to compute a time and position for the tag. This is accomplished using a method similar to that described in Section XA below. Monitoring device 15 (FIG. 1) shuts down the receiver between measurements to save energy.

Other sensors include temperature sensors, fuel level detectors, brake release detectors and door sensors. These sensors are available from Ivonics, located in Boulder, Colo., and are incorporated, for example, in the railroad system as described below. These sensors generally communicate with device 15 through an asset tag. Alternatively, the sensors are incorporated in specialized helper tags that communicate with asset tags.

Other sensors collect audio or video signals relating to an asset, analyze the signals for deviations from a given profile, and transmit compressed versions of the signal when a deviation exists.

V. Helper tags

Referring to FIG. 10, a helper tag 20 is illustrated as a rectangular package with dimensions larger than the asset tag 16. Three pins 196, 197, 198 on a face 199 of the helper tag are configured to be inserted in the three recesses 96, 97, 98 on face 99 of the asset tag. In some embodiments, the helper tag includes two sets of quick connect ports 202, 204, 202', 204'.

A. Seal Helper Tag

Referring to FIG. 15, one example of a helper tag is a seal 20'. The seal includes a character detector 205 (for example, a shift register) connected between an IR receiver in IR receiver/transmitter 206 and a switch 208. The receiver and transmitter 206 are connected to an asset tag port 103' on face 199 of the seal (FIG. 10).

A second infrared receiver 134' and an infrared transmitter 136' are each placed adjacent to a quick connect port 202', 204' respectively. The second infrared transmitter 136' is coupled to a switch 208 by a timer 210. The timer is connected, through switch 208 to a cellular telephone and antenna 212 by a cellular modem 214 and to a GPS receiver 18 by a sensor interface 190.

The seal additionally includes the power controller and battery described above in connection with FIGS. 11 to 13. The battery includes a ground connection and a power connection coupled to pins 196, 197, respectively, on face 199 of the seal (FIG. 10). Pin 198 is grounded in this embodiment.

In use, an operator inserts pins 196, 197, 198 on the helper tag in the recesses 96, 97, 98 in the asset tag. This enables the battery in the seal to supply power to the external power port in the asset tag through pin 197. Assembling the seal and asset tag in this manner also places helper tag port 103 on the asset tag adjacent the asset tag port 103' on the seal, which enables IR communication between the IR transmitters and receivers 134, 136, 206 in the asset tag and seal.

The user next attaches the seal to an asset by threading an aircraft cable through a latch on the asset, and inserting opposite ends of the cable in the quick connect ports 202, 204. The user also threads an optical fiber 216 through the latch and places opposite ends of the fiber in quick connect ports 202', 204'.

The timer causes the second IR transmitter to periodically transmit a pulse along the optical fiber. If the fiber is damaged or broken, the IR receiver will not receive the pulse, and will notify the attached asset tag. The asset tag then notifies another tag, an operations center or a monitoring device over the communications circuitry that the seal may have been damaged.

The character detector in the seal analyzes messages from the attached asset tag, and in response instructs the switch to connect the asset tag port 103' to the appropriate component, for example, the sensor 18 or the modem 214, in the helper tag.

In some embodiments, the seal includes a sensor or actuator that permits the seal to communicate only with a list of selected tags, devices or users. The actuator may include a fingerprint detector or a magnetic stripe reader. Whenever a tag or device not on the list attempts to access the seal, the seal notifies a tag, device or the operations center.

Typically, for added security, a second asset tag and seal combination is placed on the asset, so that if the first seal is disabled, the second seal may notify other tags or devices. In some embodiments, only one seal includes the GPS receiver and sensor interface.

B. Other embodiments of helper tags

In some embodiments, the IR transmitters and receivers in the helper tag and asset tag communicate with a modulated IR, RS 232 or a similar protocol. In addition, the helper tag may include its own microprocessor.

The helper tag and asset tag may also be the same size, and be attached through a variety of mechanisms. Alternatively, the asset tag may be larger than the helper tag.

In some embodiments, the character detector in the helper tag checks a special character in the message, indicating whether the helper tag should be placed in a pass through mode or in an operations mode. If the character indicates a pass through mode, the detector causes switch 208 to connect the asset tag port 103' to one communication circuit in the helper tag, for example, cellular modem 214. The helper tag thus re-transmits the message received from the asset tag over the communication circuit. In this mode, the seal acts as a communications interface for the asset tag.

If the message places the helper tag in an operations mode, the character detector in the helper tag causes switch 208 to couple the asset tag port 103' to all other circuits in the helper tag, for example, the sensor 18, modem 214, IR transmitter 136' and receiver 134'.

In this mode, the asset tag causes the helper tag to perform specialized functions, including switching the RF communication to a particular gold code. When the helper tag receives the command from the asset tag, the helper tag returns an acknowledgement of the command over the asset tag port 103'. Another function includes adding a preamble to all signals transmitted over the RF transmitter in the helper tag. The preamble indicates that the signal should be acted on only by a particular asset tag. Similarly, the asset tag may remove a preamble from signals arriving at the RF receiver in the helper tag that specify a particular tag identification number (ID).

The asset tag also causes the helper tag to change the time T over which the synchronizing code is broadcast to a new value. The helper tag subsequently transmits the code for a length of time equal to the new value.

Another embodiment of a helper tag is described below, in connection with the interrogate and respond module. A description of two other helper tags (called a boot and holster) is provided in connection with the monitoring device.

VI. Interrogate and Respond Module

A. Structure

The interrogate and respond module 22 (FIG. 2) includes a helper tag $20_3$ attached to an asset tag 16 in the manner shown in FIG. 10.

Figure 16:
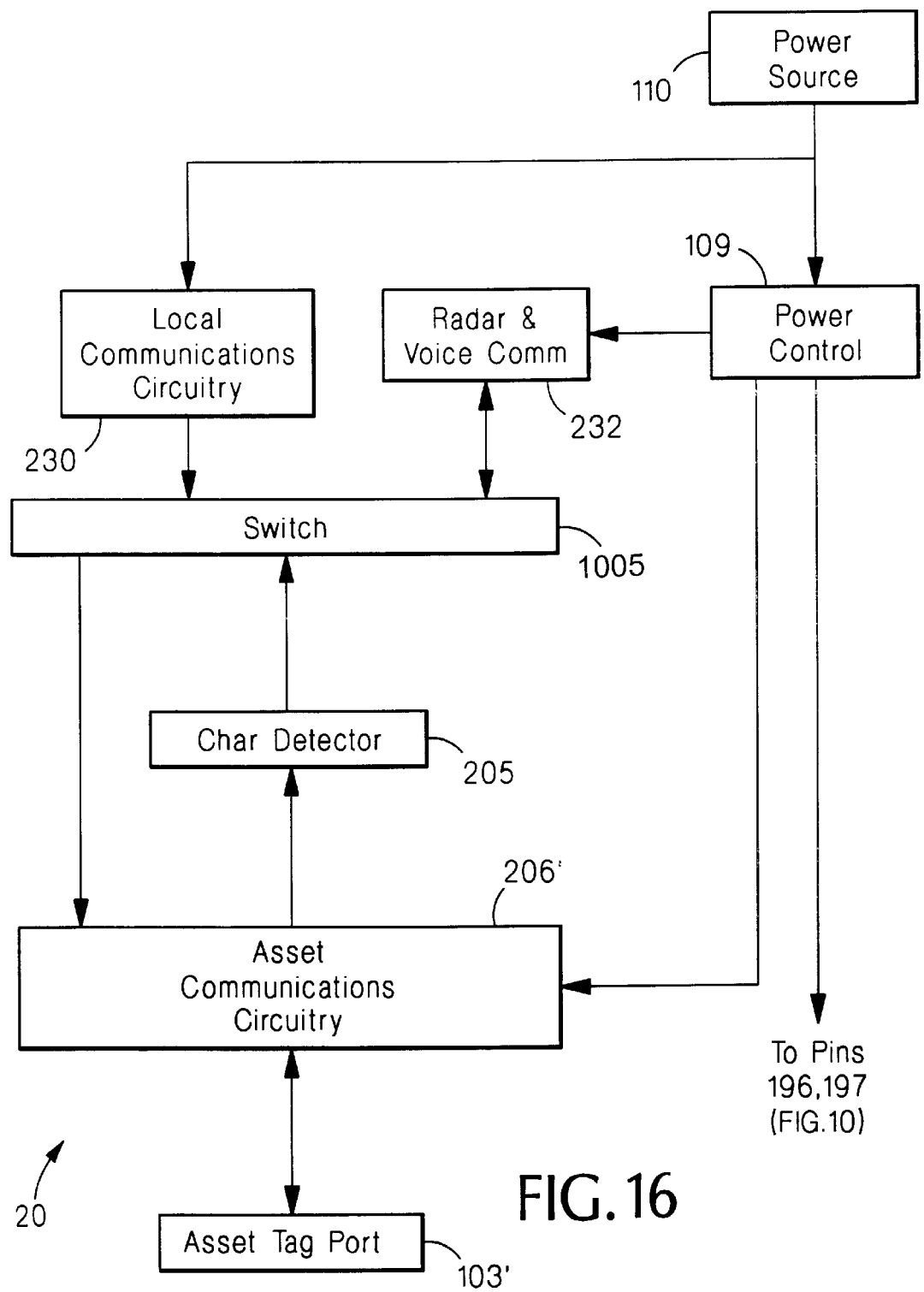
FIGS. 16 and 17 are block diagrams of an interrogate and respond module in the system of FIG. 2.

Referring to FIG. 16, one embodiment of helper tag $20_3$ (helper tag 20') in the module has a character detector 205 connected to an asset tag port 103' by asset communications circuitry 206'. A switch 1005 couples circuitry 206' and detector 205 to local communications circuitry 230 and a radar and voice communications circuitry 232. The local communications circuitry 230 can include an RS 232 link.

A power source 110 is connected to the circuitry 206; a microprocessor, by a power control 109. The power source can include a battery or a connection for an external power source. The power control is connected to pins 196, 197 (FIG. 10) and to the local communications circuitry and the radar and voice communications circuitry. The power control includes the device power control, processor power control and communications power control connected as shown in FIGS. 12 and 13. The helper tag is optionally supplied with the detach detector and battery sensors shown in FIG. 13, and a sensor interface as shown in FIG. 14.

Figure 17:
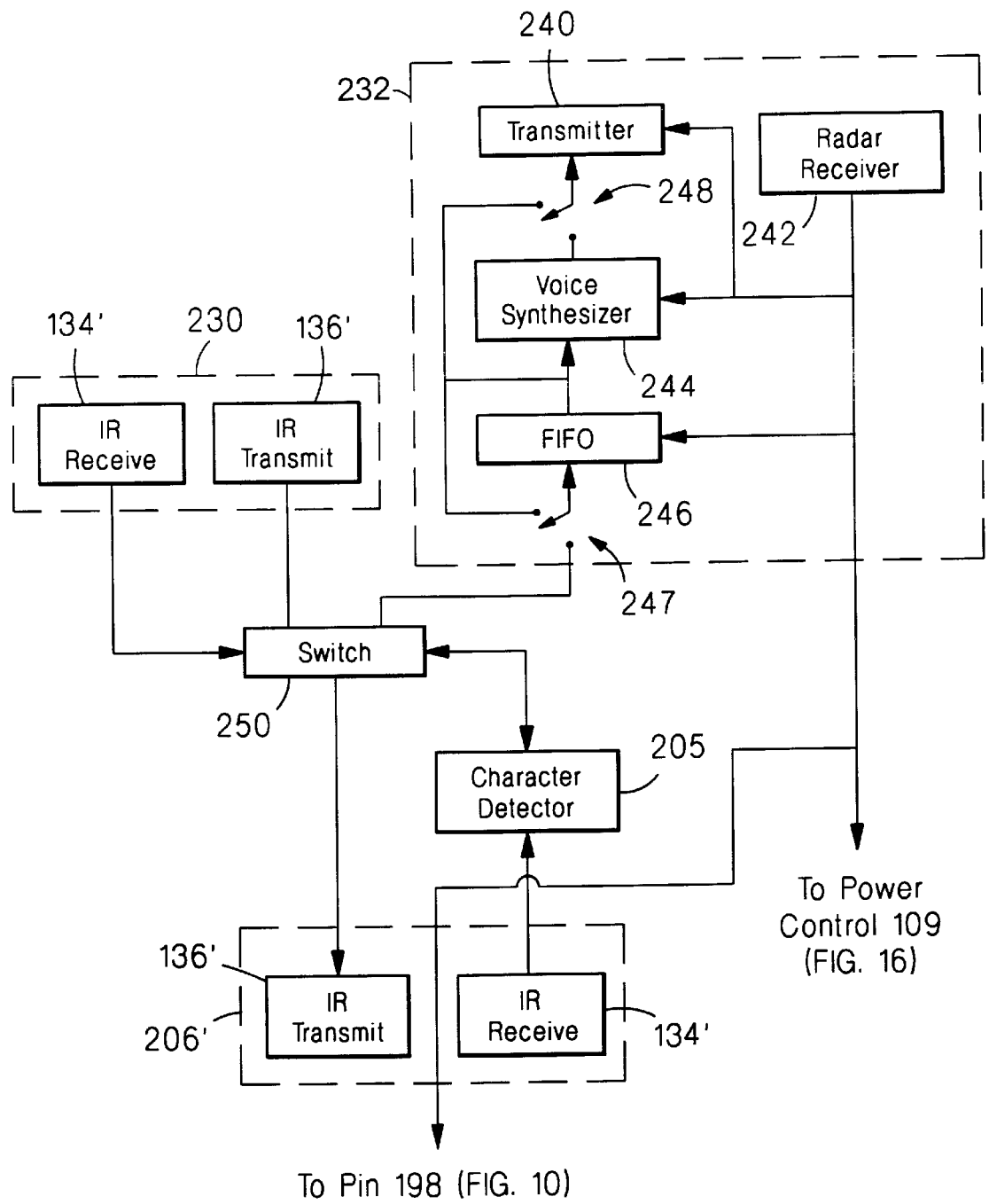

Referring to FIG. 17, the voice and radar communications circuitry 232 includes a voice transmitter 240 and a radar receiver 242. The transmitter is connected to a voice synthesizer 244 receiving data from a recirculating FIFO 246. An input of the FIFO is connected to an output of the FIFO by a switch 247. The output of the FIFO is in turn coupled to an input of transmitter 240 by a switch 248. The radar receiver is connected to the synthesizer, the FIFO and the radar transmitter, and provides an interrupt signal to pin 198 on face 99 of the helper tag (FIG. 10).

The asset communications circuitry 206' and the local communications circuitry 230 each include receiver 134' and transmitter 136' performing either unmodulated infrared or modulated RS 232 serial communications.

B. Operation

In use, the pins 196, 197, 198 in the helper tag are inserted in recesses 96, 97, 98 of an asset tag (FIG. 10). The helper tag supplies power to the asset tag over pins 196, 197, and provides an interrupt signal over pin 198. The helper tag also communicates with the asset tag through the asset tag port 103' placed adjacent the helper tag port 103 on the asset tag.

After receiving a message from the asset tag at the circuitry 206' (FIG. 17), the character detector searches for and finds the special character in the message. If the special character indicates pass through mode, the detector connects the switch to the transmitter 136' in circuitry 230, and passes the message to that IR transmitter 136'. The transmitter then sends the message to an appropriate destination. If the local communications circuitry is an RS 232 serial link, the microprocessor in the attached asset tag converts the signal to an RS 232 protocol before transmission.

If the character detector determines that the character indicates an operation mode, the detector connects switch 250 to the FIFO. The microprocessor of the asset tag then loads information stored in its memory into the FIFO. (Switch 247 is placed to connect switch 250 to FIFO 246.) The information is derived from communications with the asset tag (or through its local communications). This typically includes a description of the assets to which other asset tags in the vicinity of the helper tag are attached.

If the radar receiver later receives a standard police radar signal, the radar receiver causes 109 the power control to supply power to the voice synthesizer 244 and transmitter 240, and sends signals activating the synthesizer, FIFO and transmitter. The receiver 242 also supplies an interrupt signal which forwards the signal over pin 198 to the interrupt port in the asset tag. The signal causes the asset tag to halt its communications with any tag other than the helper tag.

When activated, the FIFO connects its output to its input through switch 247, and downloads its stored information into the voice synthesizer while simultaneously returning the information to its input port. This allows the FIFO to continue to store the information, even after it has been downloaded into the synthesizer. The information thus remains available at the FIFO the next time the radar receiver is interrogated.

The synthesizer converts the information from the FIFO to voice data and transmits the data to the transmitter through switch 248. The transmitter broadcasts the data on a police radio frequency (a carrier frequency). The transmitter then connects, through switch 248 to FIFO 246 and transmits the ASCII data stored in the FIFO on the same radio frequency for reception by a suitable computer. Alternatively, the transmitter broadcasts the data on a different radio frequency.

Since the helper tag will receive radar signals only during an emergency (which are expected to be infrequent), transmissions over transmitter 240 may be high power even though the energy source is a modest size.

The information is loaded onto the FIFO generally before the helper tag receives a radar signal. As a result, the helper tag is not required to seek the data during an emergency, when the communication links in the system may be inoperative.

In some embodiments, the radar receiver responds to a radar signal only under certain conditions. For example, if the module is mounted on a vehicle, the receiver will not respond to radar signals received while the vehicle is moving. In this embodiment, it is assumed that the vehicle moves only under normal, non-emergency conditions.

VII. Monitoring Device 15

A. Structure

Figure 18:
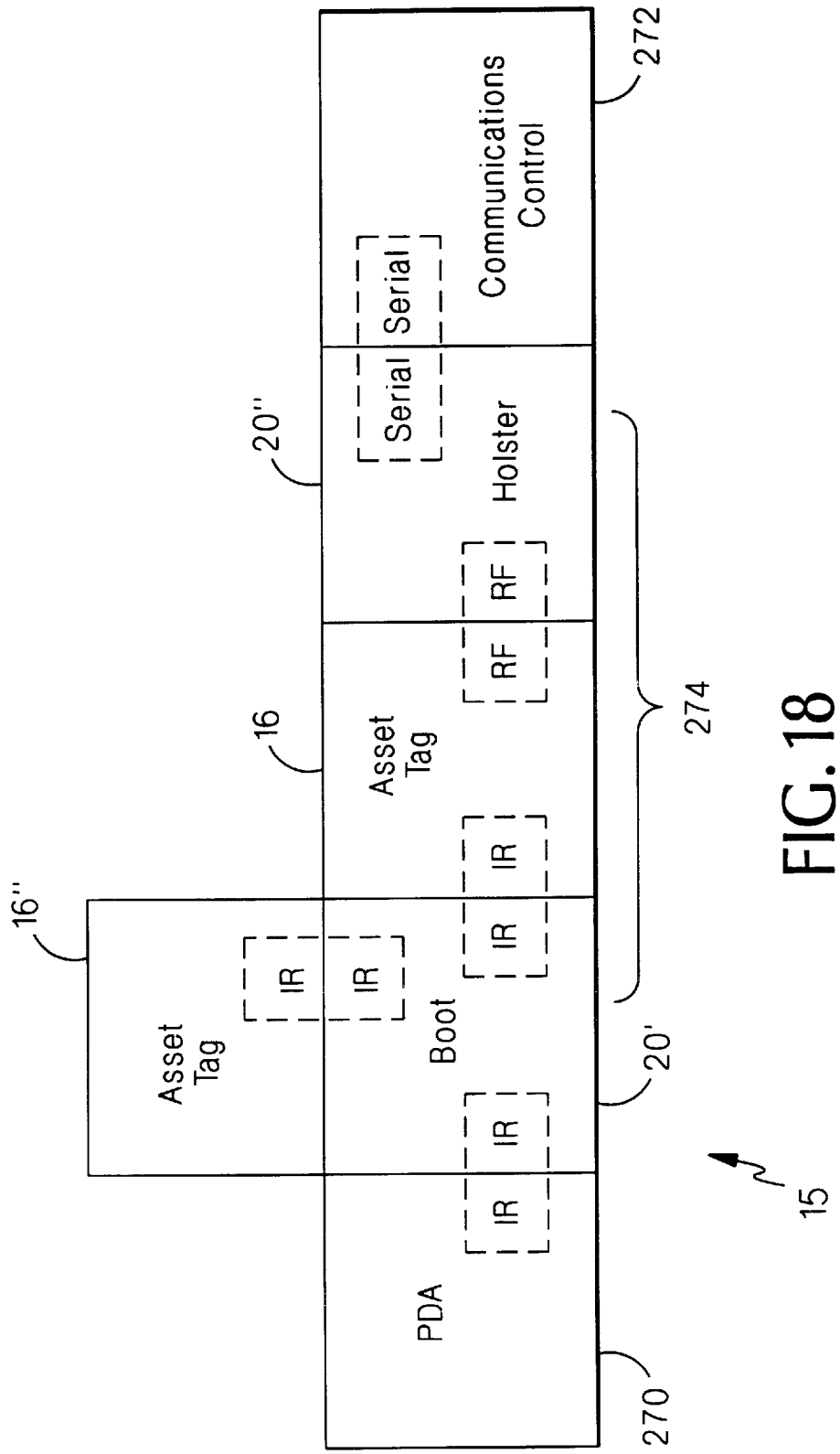
FIG. 18 is a schematic representation of a monitoring device in the system of FIG. 1.

Referring to FIG. 18, monitoring device 15 includes a personal digital assistant (PDA) 270 coupled to a communications controller 272 by an interface 274. The interface includes a helper tag (a boot) 20' connecting an asset tag 16 to the PDA. A second helper tag (a holster) 20" in the interface provides a link between the communications controller and the asset tag.

The PDA, for example, is a Newton, available from Apple, in Cupertino, Calif. The Newton has a processor connected to a user interface, a modulated IR communications port and a memory. The user interface allows an operator to access information that has been stored in the memory by the system. The operator also uses the interface to cause the processor to execute stored functions.

The PDA has at least two software applications. The first includes a driver interface for programming tags. In specific applications, the software may include additional functions. For example, in a system where the assets are being transported (for example, application 10$_4$ described in FIG. 6 above), the PDA has software for identifying which assets are to be dropped off and picked up at a particular stop, and for reviewing maps. The PDA provides lists for checking off completed stops, and the driver may modify the lists. The PDA also records signatures of the recipients of the assets and verifies the correct assets have been picked up.

The second software application monitors incoming messages and routes them to other tags and devices. The messages include information regarding the contents of an asset and messages identifying missing tags and tags with low batteries. If the PDA stores a list of the contents of the assets, it compares the information to the list and notifies other tags or the operator of any discrepancy. The device also assists in downloading the information to an interrogate and respond module. Finally the application includes the location and network formation functional units described below.

Figure 19:
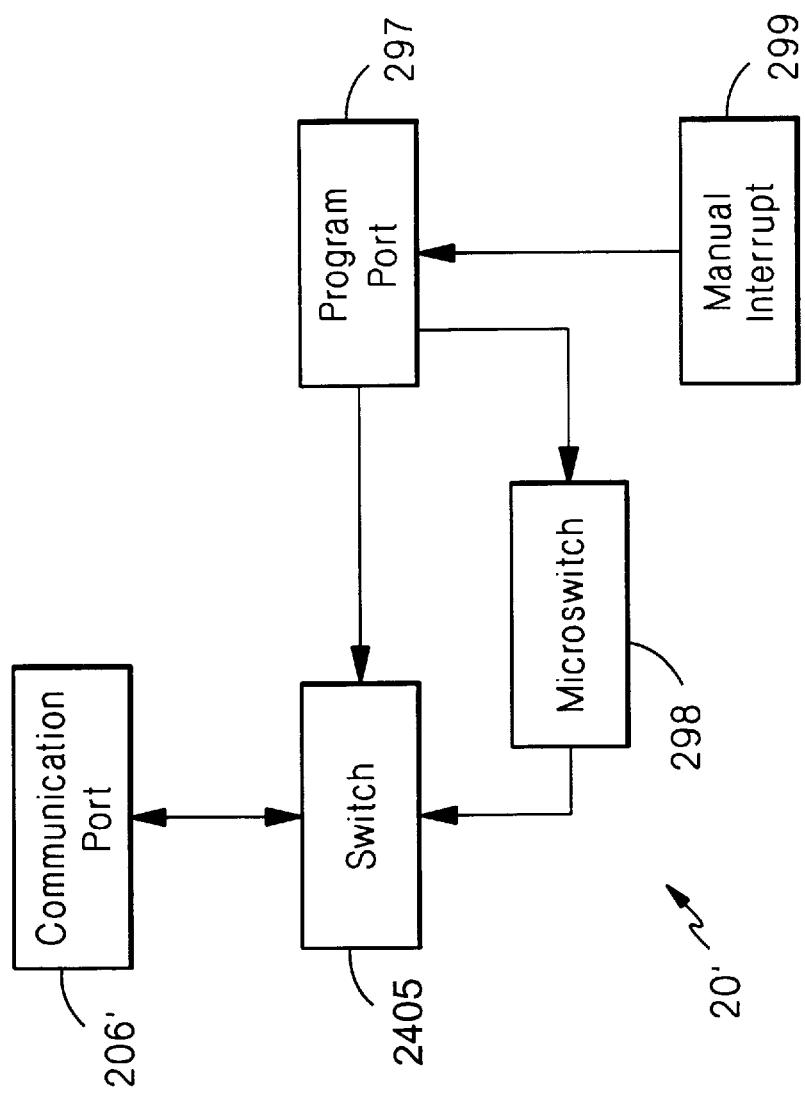
FIG. 19 is a block diagram of a helper tag in the device of FIG. 18.
Figure 20:
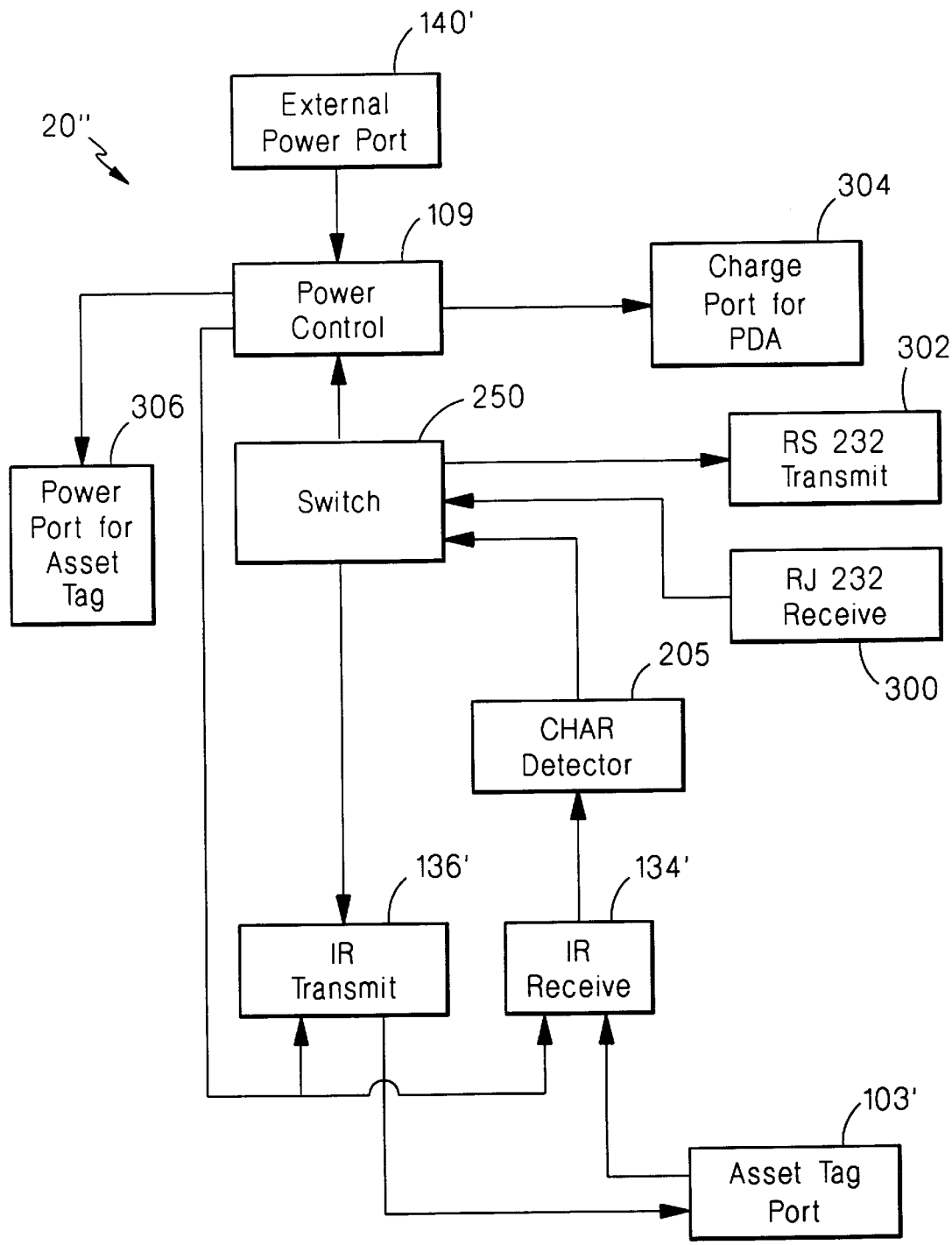
FIG. 20 is a block diagram of a holster in the device of FIG. 19.

Boot 20' is a helper tag of the type shown in FIG. 10. Referring to FIG. 19, the boot includes a switch 2405 connected to a programming port 297 and a communication port 206', each including an IR transmitter and receiver. The character detector 205 to be described in connection with the helper tag of FIG. 20 is replaced by a microswitch 298 which senses the presence of an asset tag in the programming port and causes the switch 240 to route signals to the programming port 206'.

A manual interrupt 299 provides an interrupt signal to the programming port, which forwards the signal to pin 198 on the boot (FIG. 10). The manual interrupt is activated by pressing a button on a face of the boot. The boot additionally contains a power control (not shown) connecting a battery to pins 196, 197, in the manner described above.

The boot is connected to asset tag 16 (FIG. 18) by placing communication circuitry 206' opposite port 103 of the asset tag (FIGS. 10 and 11).

The holster 20" is a helper tag of the type shown in FIG. 10. Referring to FIG. 20, the holster 20" has a switch 250 coupled to an asset helper tag port 103' by an unmodulated infrared transmitter 136'. A character detector 205 is interposed between the IR receiver 134' and the switch 250. The switch is also connected to a receiver 300 and transmitter 302 for RS 232 serial communications and to a sensor interface 190 (as shown in the helper tag of FIG. 15).

A charge port 304 on the holster is configured to connect the PDA and its attached boot to the holster's power source. Similarly, a power port 306 for the asset tag is connected to pins 196, 197 on the helper tag (FIG. 10). Both ports 304, 306 are connected to an external power port 140' and to the switch 250 by power control 109.

The holster also includes all the features of the asset tag shown in FIGS. 11 and 12, but without the RF transmitter and receiver and microprocessor 100. The boot and holster are continually activated by their power controllers. Alternatively, the boot and holster are activated when they receive a message at their respective IR receiver.

When the monitoring device is assembled, the pins 196, 197, 198 in the holster are inserted in the recesses 96, 97, 98 in the asset tag 16, in the manner shown in FIG. 10. The holster supplies power to the asset tag over pins 196, 197, and communicates with the tag through asset tag port 103'. The helper tag (holster 20") is coupled to the communications controller by connecting the RS 232 port (receiver 300 and transmitter 302) to the communications controller.

Figure 21:
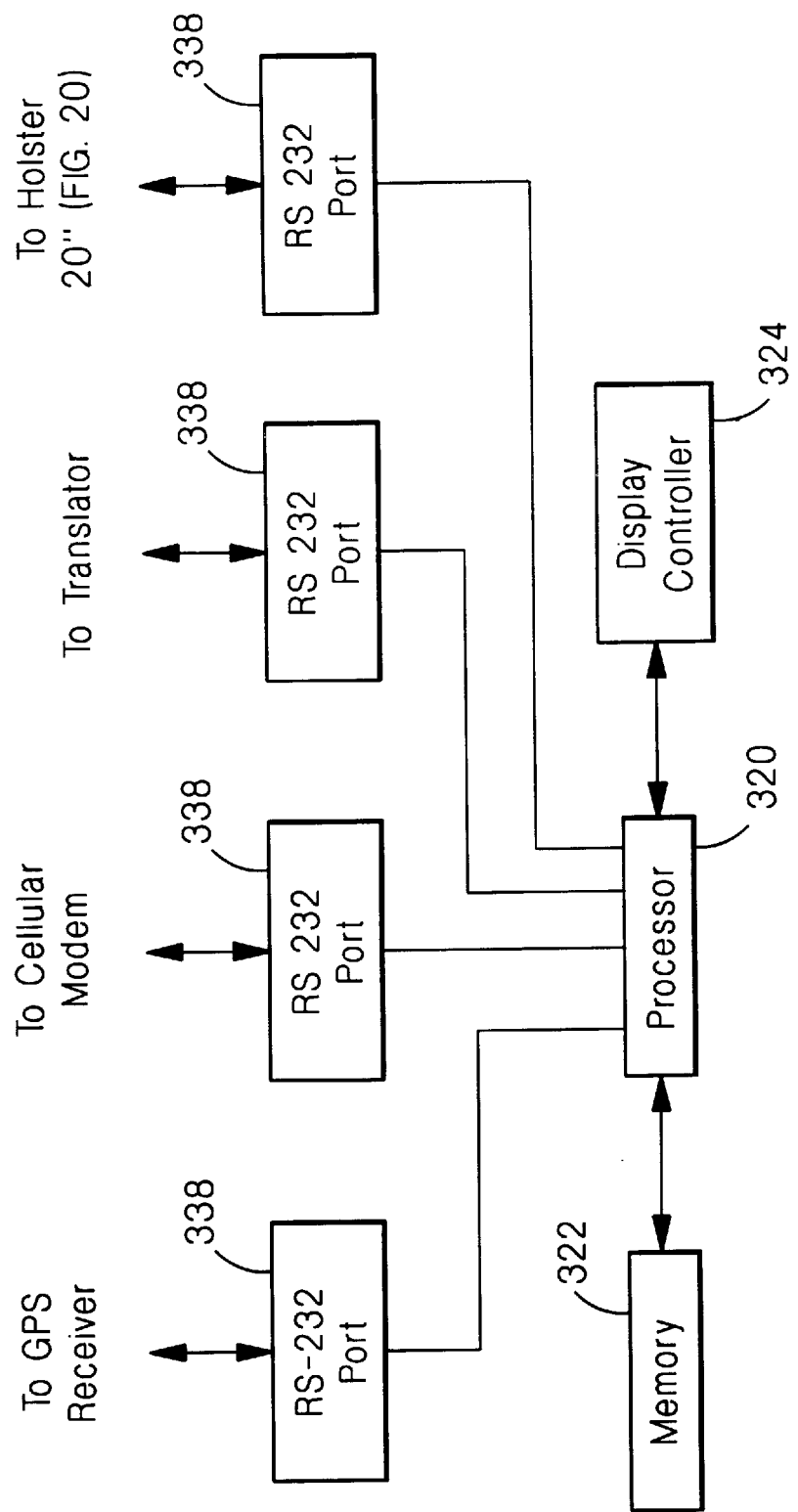
FIG. 21 is a block diagram of a communications controller in the device of FIG. 19.
Figure 22:
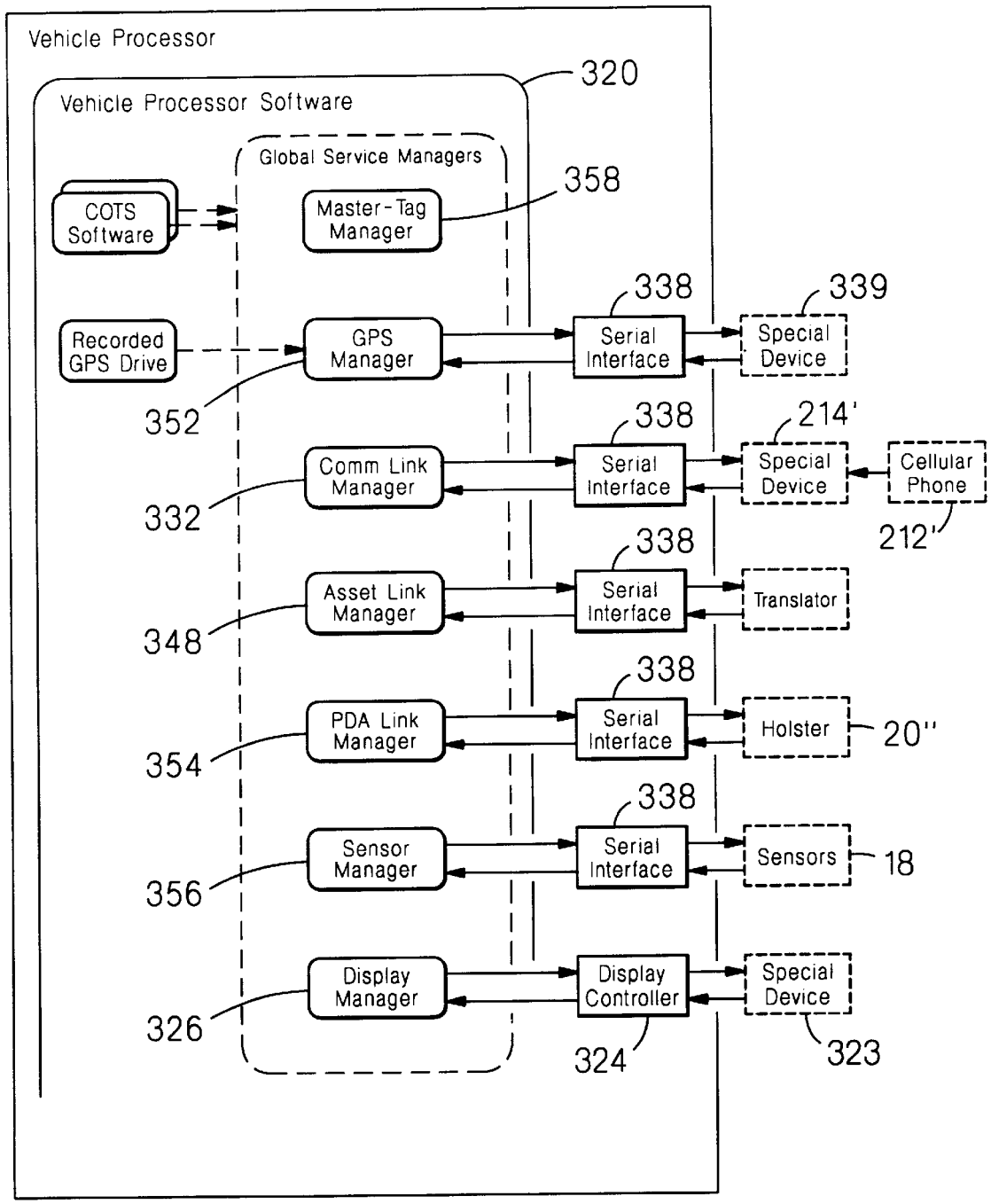
FIG. 22 is a block diagram of software in the controller of FIG. 21.

Referring to FIGS. 21 and 22, the communications controller includes a PC/104 processor 320 running, for example, Microsoft DOS. The PC/104 (already installed with DOS) is a unit number 6 available from Tri-M Systems in Coquitlam, British Columbia. The processor is connected to a random access memory 322, a display controller 324, and a set of RS 232 ports 338. Each port includes an RS 232 transmitter and receiver. The controller is powered by an external power source.

For testing, referring to FIG. 22, the controller 324 is equipped with a user interface 323 (for example, a keyboard and monitor) which is removed when the controller is in use. The interface is connected to the display controller 324 in the processor, and managed by display manager software 326 in the processor.

The processor is linked to a cellular phone 212' by a cellular modem 214' over an RS 232 link 338. The cellular modem is a ZyXEL U-1496P, available from ZYXEL/Zero One, 4920 E. La Palma Ave., Anaheim, Calif. 92807. The processor includes a communication manager 332 that controls the modem. A GPS receiver 339 is coupled to the processor over another RS 232 port 338 and managed by a manager 352.

A translator (such as a holster 20") coupled to an RS 232 port 338 converts RS 232 communications from the processor to IR transmissions. An asset link manager 348 such as a PDA link manager 354 controls the holster over port 338, causing the holster to communicate with the PDA. A sensor manager 356 controls a port 338 connected to a sensor 18. Other functions in the processor are handled by a master manager 358.

B. Operation of monitoring device (a) Network communications

An operator employs the monitoring device for programming the asset tags, and for communicating with the asset tags, other devices, sensors and the operations center (FIG. 1).

Referring to FIG. 18, for example, an operator communicates with a sensor in the system by first selecting an appropriate command on the PDA 270. The PDA then generates a message based on the command, for example, a command for reading sensor data results in the message "PDA #Y to sensor ID #X, send data\." The PDA forwards the message to the boot which forwards the message to its attached asset tag 16 (FIG. 18).

The attached asset tag checks the destination of the message and determines, for example, that the message must be re-transmitted. The asset tag 16 attaches a preamble to the message, indicating "Holster ID #Z, message follows." The holster 20" receives the message from the asset tag, the holster's character detector places the holster in a pass through mode, and forwards the message over the RS 232 link to the communications controller 272.

The controller determines that it is not the destination of the message and adds the preamble translator ID#W, message follows" to the message. The controller then passes the message to an asset tag attached to an appropriate translator over an RS 232 port.

The translator asset tag receives the message, strips the preamble, and determines the message is not destined for it. The translator asset tag passes the message to its IR port and forwards it to a fourth asset tag that is attached to the helper tag containing the sensor. The fourth asset tag determines that the destination of the message is its attached helper tag, and generates a special character that it attaches to the beginning of the message. The helper tag character detector receives the message, detects the character, and connects the switch 208 in the helper tag (FIG. 15) to the sensor interface 190. This allows the fourth asset tag to read data provided by the sensor.

After obtaining the data, the fourth asset tag then formulates the message "from sensor ID #X to PDA #Y, the location is (loc.)." This message is transmitted back to the PDA in a manner analogous to that described above.

In the operations mode, the boot 20' and holster 20" respond to all the commands listed in Section V above, except the boot does not respond to the message commanding a change in the time T over which the synchronization code is transmitted.

Referring to FIG. 22, the processor 320 in the communications controller continuously scans each RS 232 port 338 for incoming messages. The processor routes a message arriving from a particular source to an appropriate manager that examines the destination identification in the message and forwards the message over the appropriate RS 232 port 338. For example, when the controller receives a message addressed to the PDA over its cellular telephone from the operations center, the manager 332 forwards the message to the PDA link manager 354, and in turn to the holster 20" for transmission to the PDA.

The processor buffers the incoming messages in memory when it becomes necessary to match the communication rate of a transmitter with the communication rate of a receiver in a particular RS 232 port. Certain messages are buffered until the PDA queries the controller for the message. For example, the controller may store messages arriving from the operations center until interrogated by the PDA.

The boot and holster also receive RF messages directly from other electronic tags or sensors in the system. Similarly, the asset tag 16 communicates directly with other asset tags.

(b) Programming asset tags

Referring to FIG. 18, the operator employs the boot 20' to store information directly on an asset tag 16", for example, software for maintenance and upgrades, or to store information relating to an asset. The operator inserts pins 196, 197, 198 on the boot into recesses 96, 97, 98 on the tag 16". This places the programming port of the helper tag adjacent to port 103 on the asset tag, to enable communication between the ports.

Inserting the pins of the boot into the recesses of the asset tag causes the microswitch 298 (FIG. 19) to activate the switch 240, and connect the programming port 297 to the microprocessor in the asset tag. The switching action simultaneously disconnects the communication port 206' from the microprocessor.

The operator presses the button on the boot to activate the manual interrupt 299. The boot transmits the interrupt over pin 198 to the interrupt port on the asset tag 16", causing the attached tag to discontinue all communications with other devices and look for information from its helper tag port 103.

The operator then selects information on the PDA through the user interface. The PDA transmits the information to the boot 20', which re-transmits the information over the programming port to the IR receiver in the helper tag port to the attached asset tag. The microprocessor 100 in the tag receives the information and stores it in memory.

The operator then removes the asset tag from the programming port. This action causes microswitch 298 to cause switch 240 to disconnect from the programming port and connect to the communication port.

If the PDA is battery powered, it is recharged by inserting a power port on the PDA in the PDA charge port 304 of the holster (FIG. 20).

VIII. Operations Center

The operations center 13 (FIG. 1) includes one or more workstations linked together by a network. For example, the center includes Pentium PCs and Sun Sparkstations linked by a 10Base T Ethernet network. The workstations are powered by an uninterruptable power supply. Commercial power is backed up by a generator.

At least one of the workstations has a cellular communications modem to land lines. In addition, redundant equipment is provided to enable operation when a workstation or the communications interface fails.

The workstations include database software that is tailored to the system, for example, Access or Oracle software, available from Oracle Corporation, Federal Group, 3 Bethesda Metro Center, Suite 1400, Bethesda, Md. 02814. The workstations also include geographic visualization software with raster or vector maps tailored to the area of operation, for example Blue Marble or available from Blue Marble Geographics, 46 Water St., Gardner, Me. 04345.

Accounting software in the operations center tracks billings and inventory control software manages inventory lists stored in the center. Communication software controls communication with the system, and client communication software manages communications with clients, as described below.

Custom communications gateway software controls communications between the center and vehicles carrying assets. If the assets are stationary, the center is directly connected to particular asset tags, for example, a gateway tag. This is done by using an RS232 connection with standard protocol.

IX. Detailed description of the asset tag microprocessor

A. Overview

The processor memory includes entity, gateway and data tables. The entity table includes a list of identification numbers of tags, devices or sensors to which the tag will respond. The numbers are stored in the identity store of each tag. The gateway table includes a list of gateway tags with which the tag communicates. The data table stores information sent to the tag.

Figure 23:
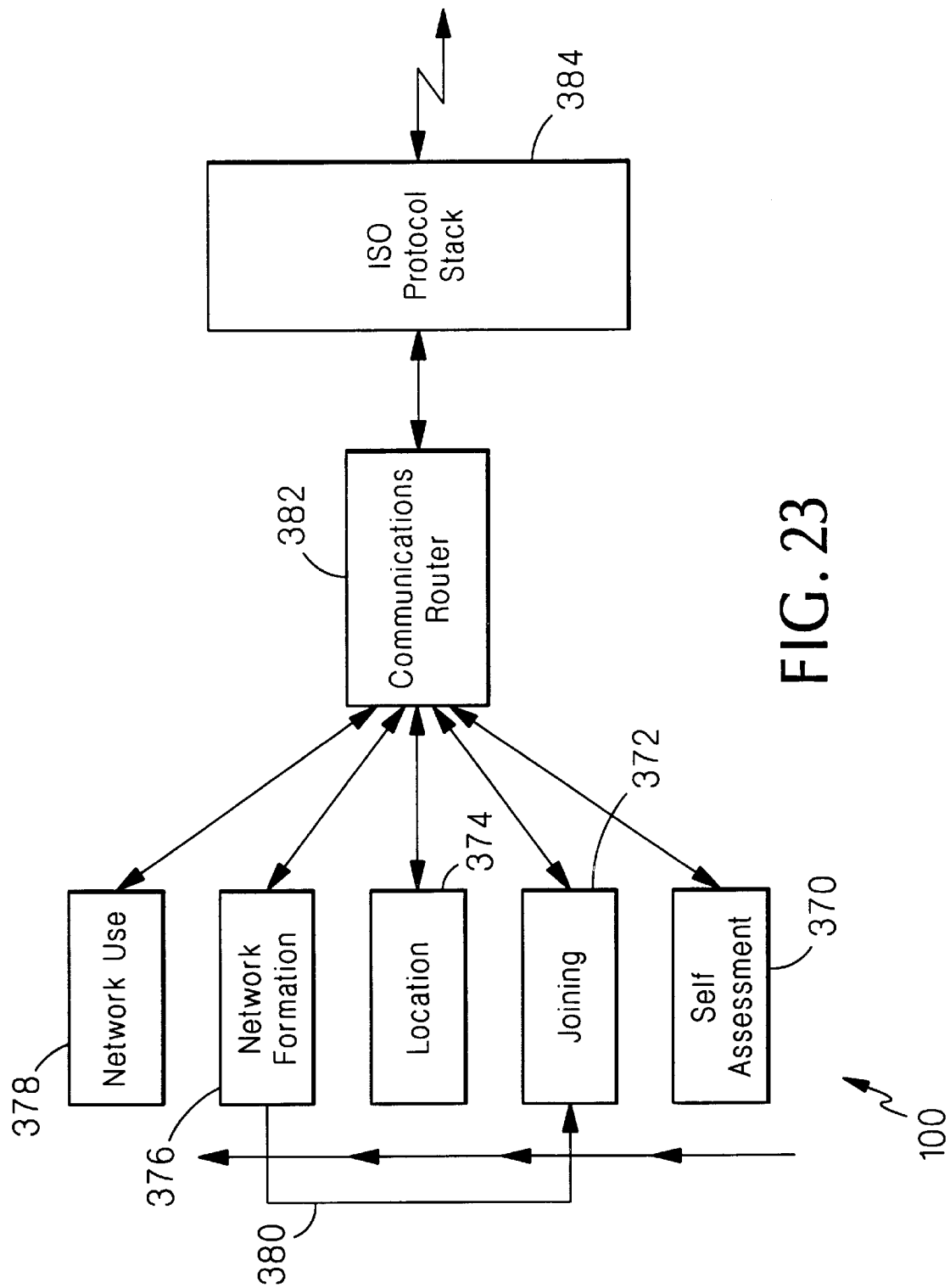
FIGS. 23 through 25 are block diagrams of functions performed by a processor in the asset tag of FIG. 1.

Referring to FIG. 23, each tag's microprocessor software 100 includes a hierarchy of functional units. The functional units, from lowest to highest in the hierarchy, include self-assessment 370, joining 372, location 374, network formation 376 and network use 378 units. Certain units are omitted from the tag in specific applications, as described below.

Each unit is in communication with the units adjacent to it in the hierarchy. In addition, a feedback path 380 is provided between the network formation unit and the joining unit.

A communications router 382 couples each unit to an ISO 7 protocol stack 384. The stack controls the IR transmitter and receiver and RF transmitter and receiver in the asset tag.

Each functional unit is standardized in its communication with the router and with its neighboring functions in the hierarchy. This allows each unit to be easily replaced with a new unit.

Each unit is active so long as the unit below it in the hierarchy is active. Once a lower unit becomes inactive, all the units above it in the hierarchy become inactive.

Other devices that automatically network with the tags, for example, monitoring devices and sensors, typically also include all the functional units shown in FIG. 23.

B. The router

Each unit controls the router by indicating whether a communication should occur over the IR transmitter or the RF transmitter in the tag. If RF is chosen, the unit also selects the frequency, time slot and code to be used in the transmission. In certain applications, a unit may communicate directly with the transmitter or receiver by bypassing the router (for example, the intertag distance subunit, described below).

When the router receives a message from the IR or RF receiver, the router sends the message to the network use unit 378, which checks whether the message is addressed to the tag. This is done by comparing the tag's identification number to the number in the message. If it was not addressed to the tag, the router ignores the message. If the message was properly addressed, the unit determines whether the final destination of the message is the tag itself, an attached helper tag, or another component.

If the message is for the tag itself, the network use unit acts on the message. The commands obeyed by the unit include the commands performed by the helper tag in the operations mode, listed in Section V.

If the message is for an attached helper tag, the unit adds a special character to the beginning of the message, and a different special character to the end of the message. The special characters are excluded from a set of characters used for transmitting messages. The router then sends the message to the helper tag. The first special character causes the helper tag to switch from a pass through to an operations mode. The second special character causes the helper tag to switch back to a pass through mode.

If the message is for another component, the router sends the message to the component through an appropriate transmitter. If the router employs the RF transmitter, it first transmits the synchronizing code over the period T to allow other asset tags enough time to synchronize to the signal and thus receive the code.

A detailed description of each functional unit in the processor follows.

C. Tag functional units (a) Self-assessment

Figure 24:
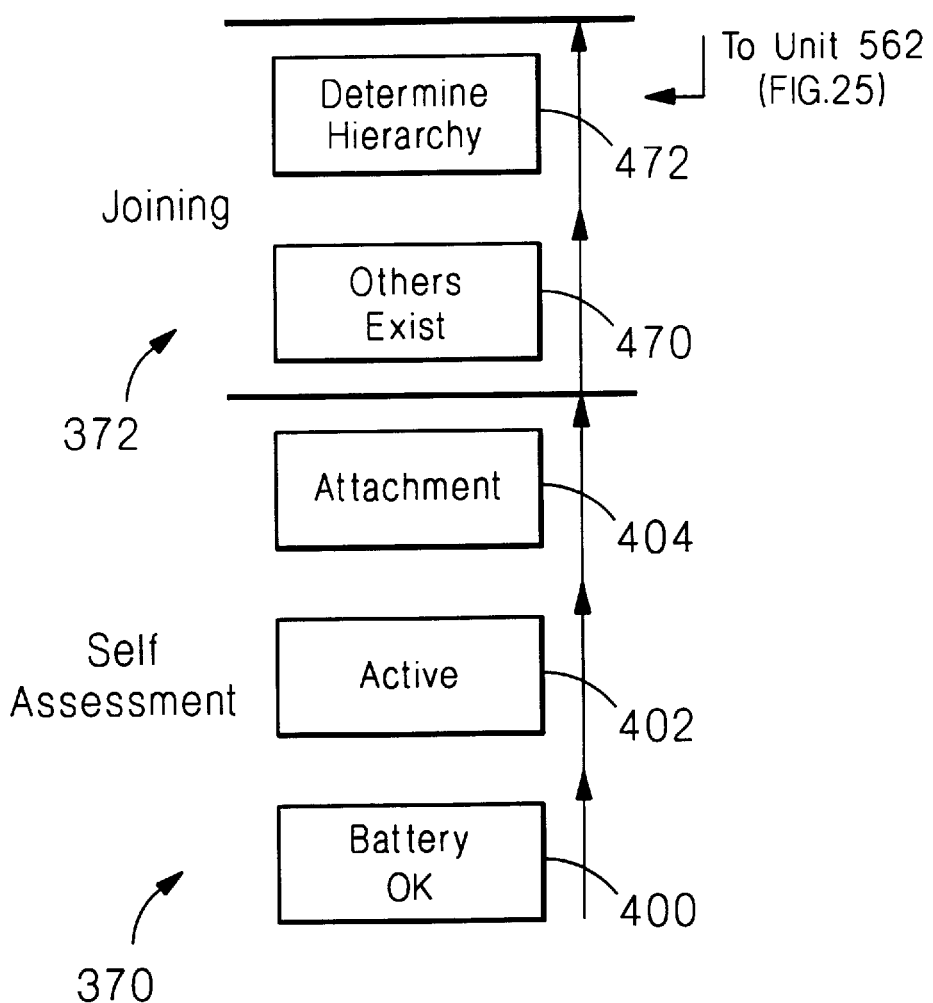

Referring to FIG. 24, the self assessment unit 370 includes a battery subfunction 400, an active subfunction 402 and an attachment subfunction 404, arranged in increasing levels in the hierarchy.

Figure 26:
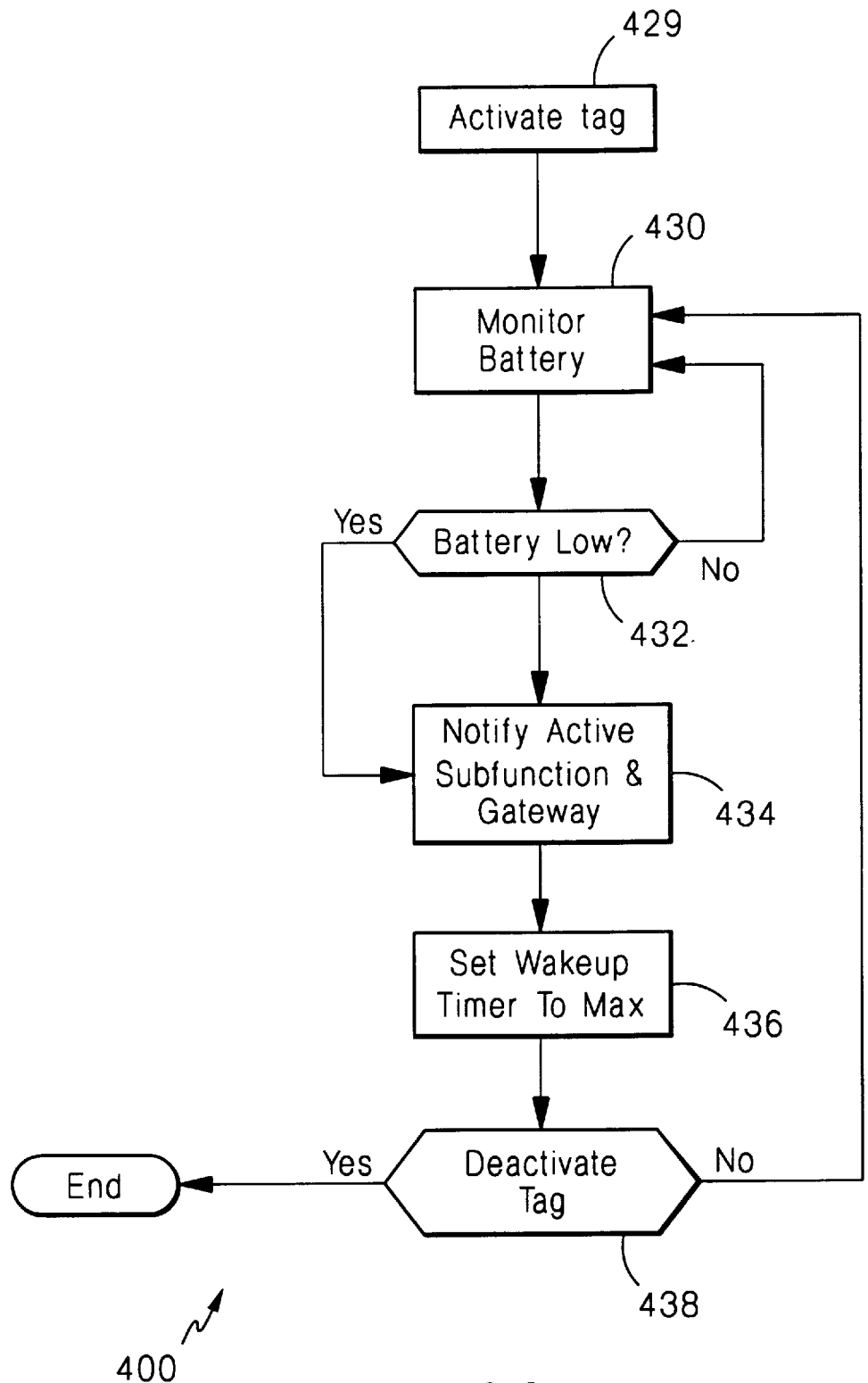
FIGS. 26 through 28 are flowcharts for software performed by a self-assessment unit in the processor of FIG. 23.

Referring to FIG. 26, when the tag is active (step 429), for example, after an interrupt has awakened the tag from its comatose state (Section III), the battery subfunction monitors the state of the battery through the battery sensor 166 (FIG. 13) (step 430). If the battery is low (step 432), the subfunction notifies the active subfunction (step 434). The active subfunction in turn passes this information to higher levels of the hierarchy.

The battery subfunction also notifies a gateway tag through the router that the battery is low (step 434). The message includes the tag's identification number. The subfunction then sets the tag's timer to a maximum value (step 436) and decides whether to deactivate the tag (step 438). If the subfunction does not deactivate the tag, it returns to step 430 and repeats the process (steps 430–438).

Figure 27:
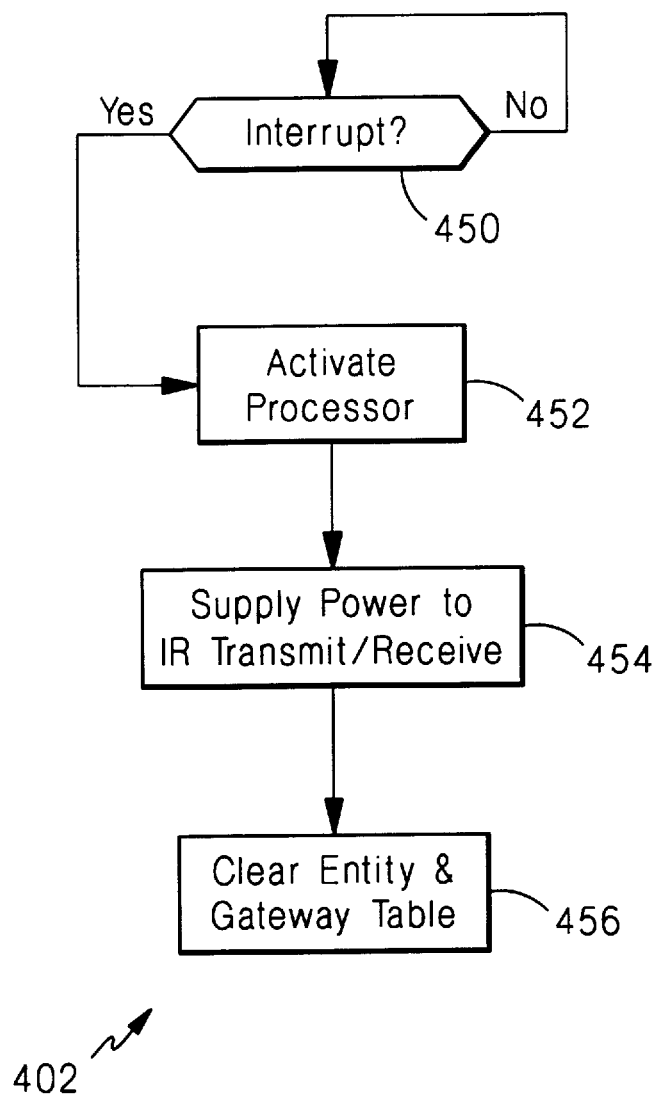

Referring to FIG. 27, the active subfunction monitors the interrupt port 107 (FIG. 11) of the tag for an interrupt signal (step 450). The signal is typically supplied by a boot in the monitoring device when the tag is attached to the programming port of the boot. When the active subfunction detects the interrupt, it informs the processor power control to increase the power supplied to the microprocessor (step 452) and the IR transmitter and receiver (step 454). This causes the tag to leave the comatose state. The subfunction then resets a pointer to a first unit of available memory in the entity and gateway tables (step 456).

The active subfunction also responds to the following commands received from the router. The subfunction replies to a query regarding the tag's ID. Another command indicates to the subfunction that it will be commanded by a particular entity. If the entity ID is not recorded in the entity table, the subfunction records the ID in the table.

Another command causes the subfunction to clear certain data in the data table and write new data. This can include data relating to the asset's shipper, destination etc. Other messages cause the subfunction to concatenate new data to the data table. The subfunction checks for and notifies another asset tag or the monitoring device 15 (FIG. 1) of any data overflow from the router.

Still another command causes the subfunction to read and communicate the data in the data table, the data in the gateway table, and the information in the entity table. The subfunction also deletes any erroneous or unwanted information, such as an entity ID, and activates and uses the RF transmitter and receiver in response to appropriate commands.

The active subfunction informs the attachment subfunction of the tag's status. For example, the active subfunction can send the message that the tag is inactive, as commanded by a particular entity. The attachment unit verifies that the entity is listed in the entity table. If it is, the attachment subfunction becomes inactive.

Figure 28:
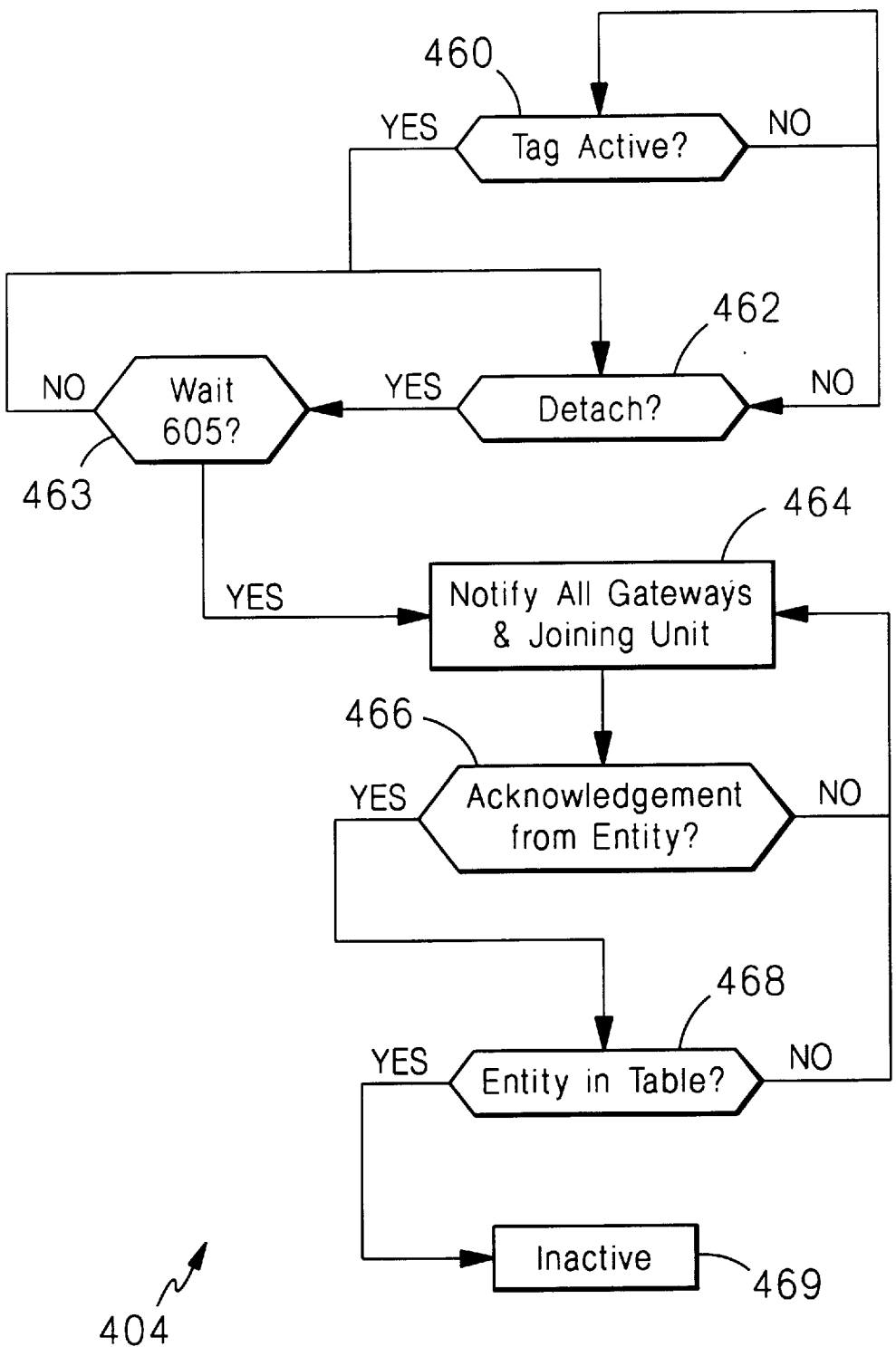

Referring to FIG. 28, when the tag is active (step 460), the attachment unit verifies the detach detector 164 (FIG. 13). When it determines that the tag is detached (step 462), it waits 60 seconds to enable the operator to attach it to an asset (step 463). If still detached, the subfunction informs each gateway in the gateway table through the router (step 464). The subfunction continues to transmit this message until it receives notification that the tag ID and its detachment have been recorded by one or more entities (step 466). If one of the entities is listed in the entity table (step 468), the attachment unit becomes inactive (step 469).

The tag also notifies the joining unit of the detachment in step 464. Alternatively, the subfunction may cause the router to notify a device, such as a user-operated device, instead of a gateway of the detachment.

(b) Joining

The joining functional unit 372 includes an existence subfunction 470 connected below a hierarchy subfunction 472 (FIG. 24).

Figure 29:
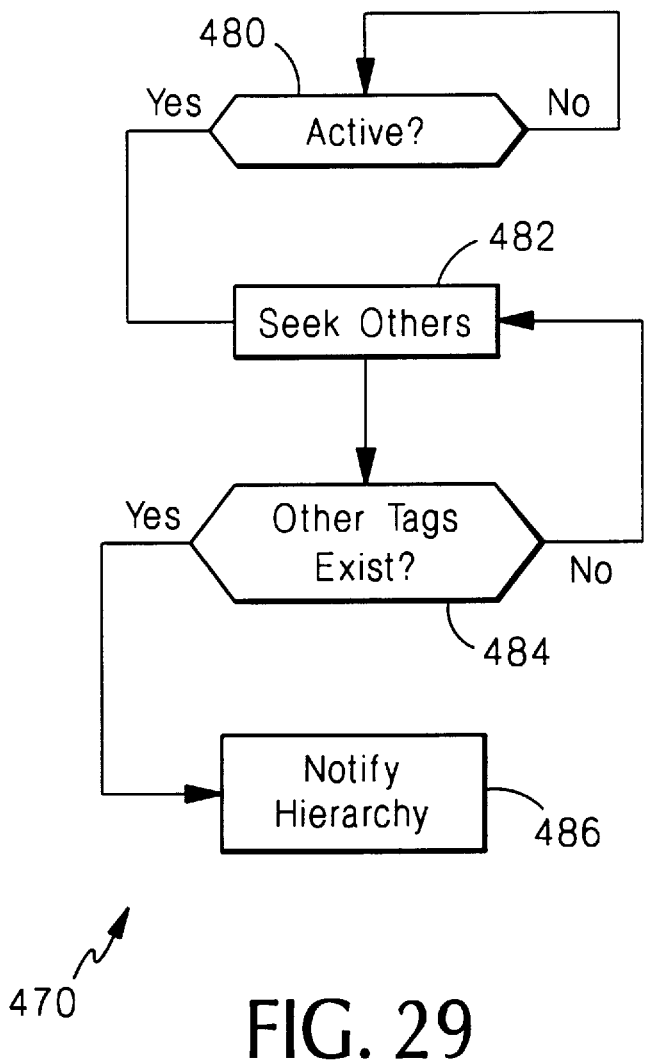
FIGS. 29 and 30 are flowcharts for software performed by a joining unit in the processor of FIG. 23.

Referring to FIG. 29, when the attachment subfunction indicates to the existence subfunction that the tag is active (step 480), the existence subfunction causes the tag to look for other tags by attempting to initiate communications through the router on a particular hailing channel (482). If other tags exist (step 484), the subfunction notifies the hierarchy and supplies the identity codes of the tags (step 486).

If a group of tags are located near the asset tag, the subfunction chooses one asset tag (a netmaster) to perform some of the location and network formation units. This prevents the tags from duplicating calculations already performed by other tags.

Figure 30:
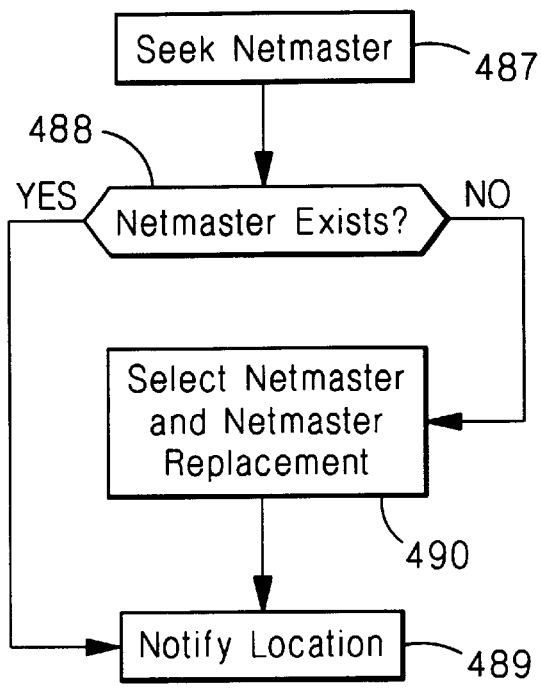

Referring to FIG. 30, the hierarchy subfunction communicates with the other tags to determine if the other tags have designated a particular tag as netmaster (step 487). If the tag locates a netmaster (step 488), it notifies the network formation unit through the location unit (step 489). Otherwise, the tag chooses the tag with the highest identification number as the netmaster, and chooses the tag with the next highest identification number as the assistant netmaster (step 490).

The netmaster periodically surveys the tags for new or missing members, and notifies the hierarchy subfunction. The netmaster uses a particular hailing frequency for its communications.

If the netmaster disappears or indicates its battery is low, the assistant netmaster replaces the netmaster, selects another assistant, and informs the hierarchy subfunction of the change.

(c) Location

Figure 25:
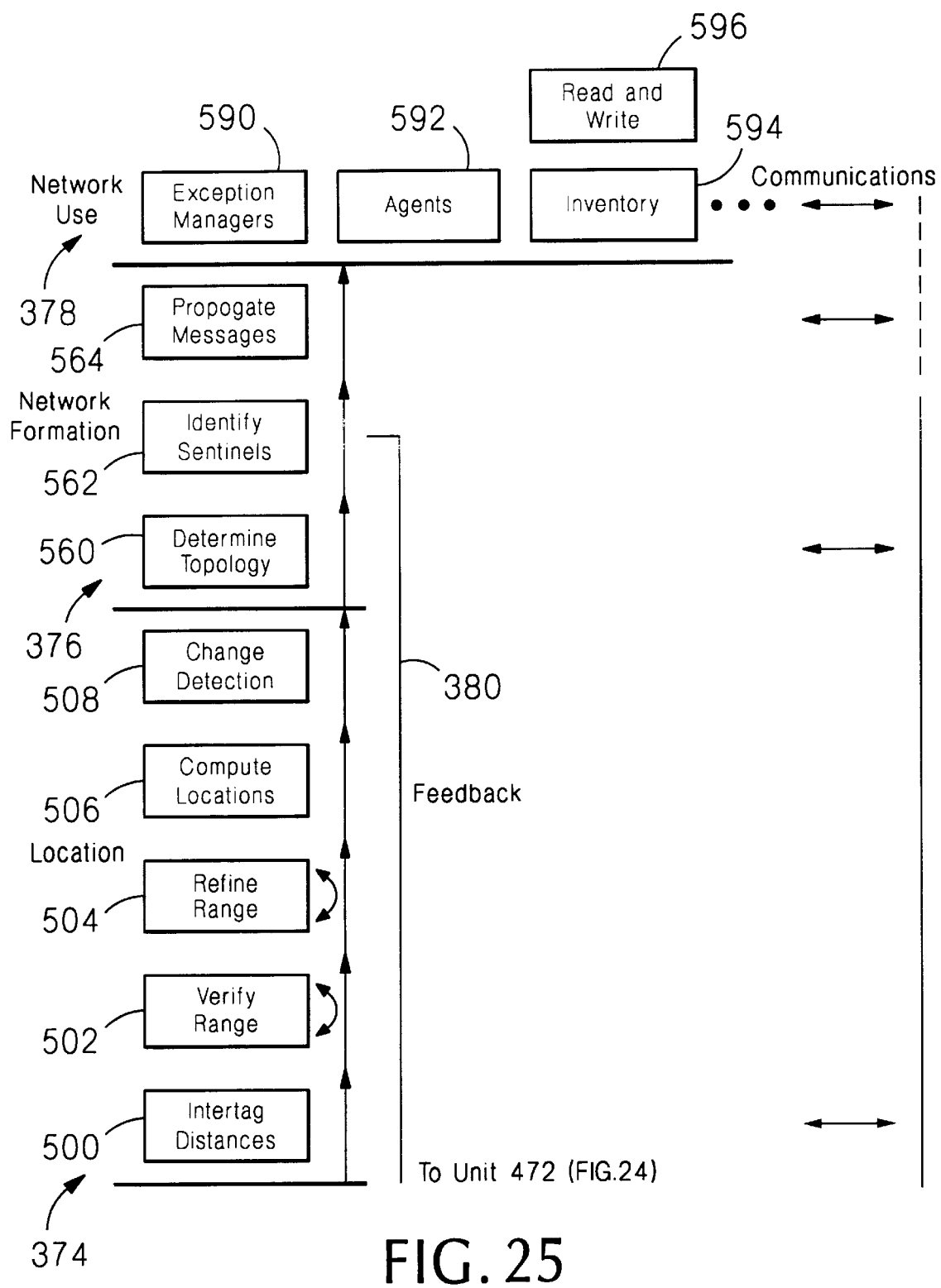

Referring to FIG. 25, the location unit 374 determines the locations of tags in the network using the following subfunctions: intertag distance 500, verify range 502, refine range 504, location compute 506 and detect change 508 (FIG. 25).

Figure 31:
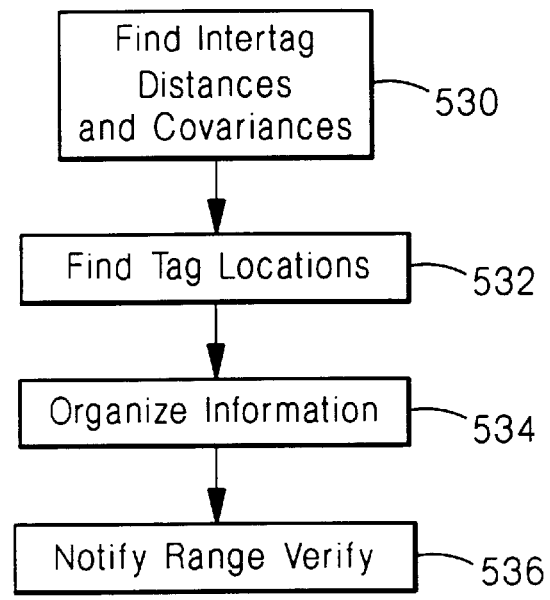
FIG. 31 is a flowchart for an software performed by a location unit in the processor of FIG. 23.

Referring to FIG. 31, the intertag distance subfunction 500 determines the distance and the covariance (or measurement error) of the distance between the tag and each tag identified by the joining unit (step 530). The subfunction also communicates with the tags to obtain location information for the tags (step 532). The location information is typically obtained from a GPS sensor located near the tags. The subfunction organizes this information in the tag memory (step 534), and notifies the verify range subfunction 502 that the information is available (step 536).

The verify range subfunction verifies these ranges, and eliminates ranges that are clearly erroneous. The refine range subfunction provides accurate estimates for the ranges eliminated in the previous subfunction. The compute locations subfunction transforms the corrected ranges supplied by the refine range function into an arbitrary set of coordinates for each tag. Using the location information, the location subfunction transforms the arbitrary coordinate system into an absolute coordinate system, and determines a location for the tag.

The detect change subfunction receives the location information from the verify range subfunction, and monitors the ranges of other tags in the network to detect a change in the tag's location.

Each of these subfunctions is discussed in more detail below.

(d) Network Formation

The network formation unit includes a determine topology subfunction 560, a sentinel subfunction 562 and a message subfunction 564 (FIG. 25). The determine topology subfunction receives information from the change detection subfunction indicating changes in the existence of a tag, and the location of the tag over time. Using this information, the subfunction determines a set of neighbors for each tag. A topology description of the set is found using a Delaunay triangulation, described below, which describes the topology as a convex hull and identifies the set of nearest neighbors. When the determine topology subfunction receives updated information from the location unit, it modifies the topology description.

The sentinel subfunction identifies tags that are located on the convex hull. These tags (referred to as sentinels) are assigned to communicate with tags outside the hull. The subfunction also identifies gateway tags capable of long distance communication and PDAs acting as a man-machine interface. The subfunction stores the identity of each gateway in the gateway table.

The sentinel subfunction communicates the identity of the sentinels to the hierarchy subfunction 472 (FIG. 24) over the feedback path 380. The hierarchy subfunction causes the sentinel to search for new tags, extending the range of the netmaster.

The sentinel subfunction also responds to commands received over the router 382 (FIG. 23). Each time a command from an entity is routed to the sentinel subfunction, the subfunction first verifies that the source of the message is listed in its entity table. If the entity is not listed, the subfunction ignores the message. If it is listed, the unit responds to the command.

The first command received by the sentinel subfunction queries whether a tag with a given identification exists. The subfunction checks whether any stored identification matches any stored tag's identification number. If it does, it answers "yes" to the entity. The unit then checks whether the entity is listed as a gateway in the gateway table. If it is not listed, the unit records the identity of the entity as a gateway. If there is insufficient memory to store the identity in the table, the unit communicates with the oldest recorded gateway in the list. If it is unable to establish communication, it deletes the gateway from the list. The unit repeats this for each gateway in the list.

The second command asks whether there are tags which have not been queried by a gateway. The subfunction looks at its gateway table, and if the gateway ID is not listed, the unit replies with the tag ID.

The last command asks whether a tag with a particular ID has registered the gateway. If the tag ID is the same as that in the message, the unit checks its entity and gateway table and records the ID of the gateway if it is not already present in the table. If there is insufficient memory to store the gateway, the tag repeats the process described above to delete non-communicating gateways.

The propagate message subfunction defines a network containing a set of efficient communication links between tags using the topology derived by the topology subfunction. The subfunction accomplishes this by assigning tags in the networks as relay points for communications between a pair of tags.

The subfunction also chooses a second netmaster based on the topology. The second netmaster redefines the network whenever a tag is added or removed from the network, and communicates information regarding the changes in the network to the gateways listed in the gateway table. In some embodiments, the netmaster only notifies the gateway of changes regarding specific tags. The other tags in the network do not duplicate the functions of the netmaster.

The netmaster polls members of the network periodically to make sure they still exist. Each tag in the network checks the time interval since it was last polled by the netmaster. If the time interval exceeds a threshold, the network formation unit in the tag removes the tag from the network.

When the network grows too large, the network formation subfunction divides the network into smaller subnetworks. The subfunction designates channels of communication within a subnetwork that do not interfere with communications in the other subnetwork. In addition, communications within a subnetwork are coded in compacted form. For example, the subfunction assigns each tag a truncated ID. If spread spectrum communications are used, the subfunction uses a short code for communication relayed between tags.

The subfunction designates a tag for maintaining communication with another subnetwork. When the subnetwork grows too small, the subfunction queries the tag for the existence of the other subnetwork. If the subnetwork still exists, the subfunction merges the two subnetworks.

(e) Network Use

The network use unit 378 includes a manager subfunction 590, an agent subfunction 592, an inventory subfunction 594, and a read and write subfunction 596 (FIG. 25).

Figure 32:
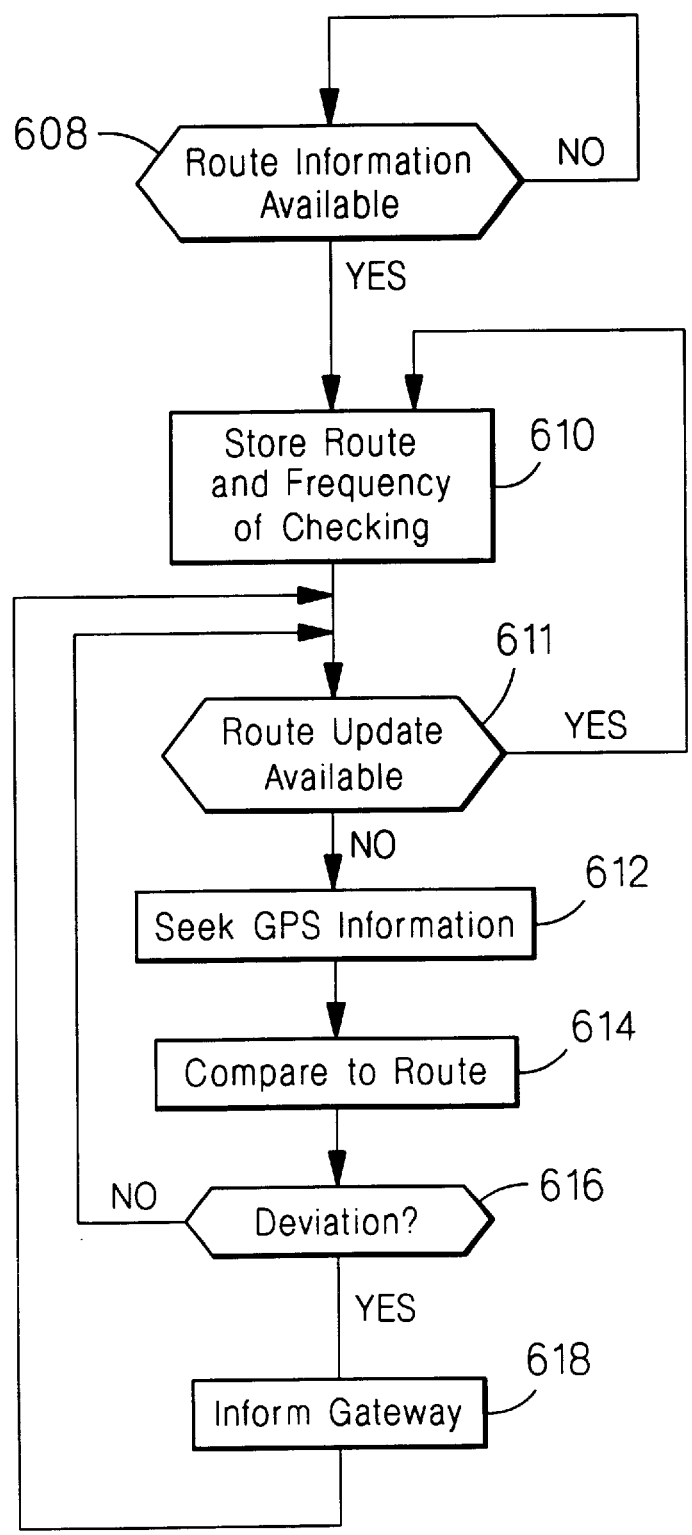
FIGS. 32 and 33 are flowcharts for software performed by an agent unit in the processor of FIG. 23.

Referring to FIG. 32, the manager subfunction continually checks whether route information is available in the network (step 608). The information is typically provided by a monitoring device, computer or operations center.

When the information is available, the subfunction stores information regarding the transportation route scheduled for an asset attached to the tag and a checking frequency (step 610). The subfunction then surveys the network to determine whether there has been an update to the route information (step 611). If there is, the subfunction returns to step 610 and stores the new information.

If no update information is available, the subfunction examines the location of the tag (as supplied by the location unit) (step 612), and compares the location to the route (step 614). If the location of the asset deviates from the route (step 616), the subfunction informs a gateway through the network (step 618) and returns to step 611. If no deviation exists, the subfunction repeats the process by returning to step 611.

Figure 33:
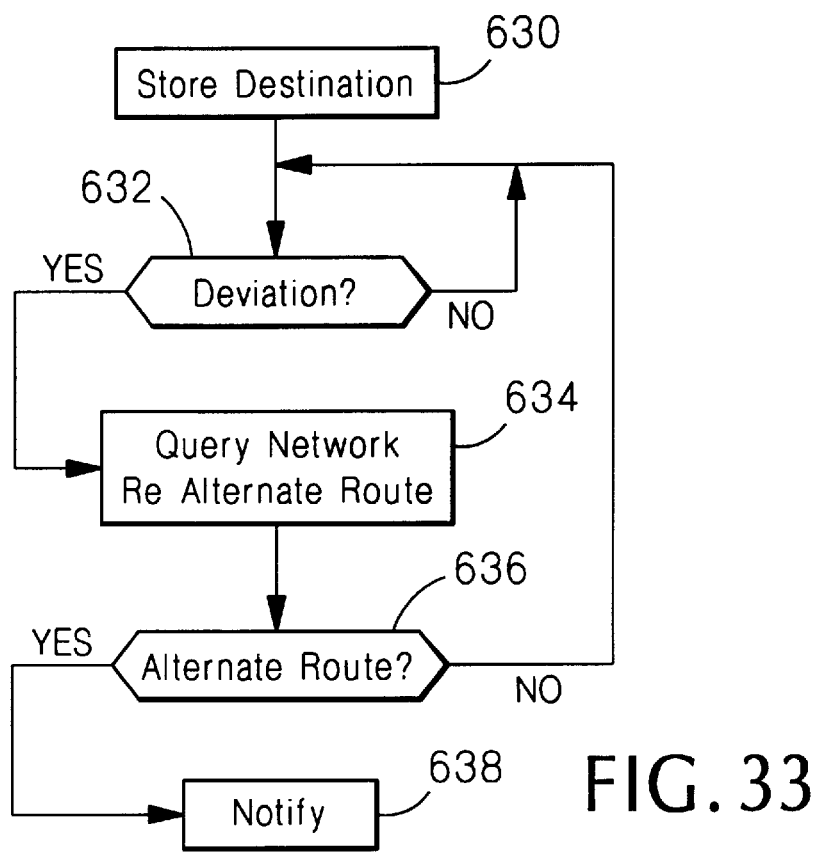

As shown in FIG. 33, the agent subfunction 592 stores information regarding the destination of the attached asset (step 630). When a deviation from the route is reported by the manager subfunction (step 632), the agent subfunction queries the network regarding available alternative routes (step 634). If a more effective alternative route is available (step 636), the subfunction notifies a gateway (step 638).

In some embodiments, the route includes a series of locations where the conveyance carrying the asset is changed (transhipment points). The subfunction seeks a conveyance for the next part of the route at each transhipment point. The subfunction also searches for other tags following a similar route, and searches for a proper conveyance for carrying all the assets together. The subfunction then informs a tag on the desired conveyance that the conveyance should load the assets. The subfunction thus performs functions analogous to a node in a packet switched network.

The inventory subfunction maintains a list of assets in the network. This subfunction is particularly useful in a warehouse application.

The read and write subfunction stores and retrieves data from the asset tag's memory. The subfunction is activated by the following commands from one or more entities stored in the entity list.

1. Read data to one or more identified entities.
2. Clear data as instructed by one or more identified entities, and write certain data.
3. Append the following data as instructed by one or more identified entities.
4. Add an identified entity to the entity table as instructed by one or more entities.
5. Delete an entity from the entity table.
6. Read the entity table.
7. Read the gateway table.

X. Detailed design of the location unit

A. Intertag Distances Subfunction (a) Baseline Method.

Figure 34:
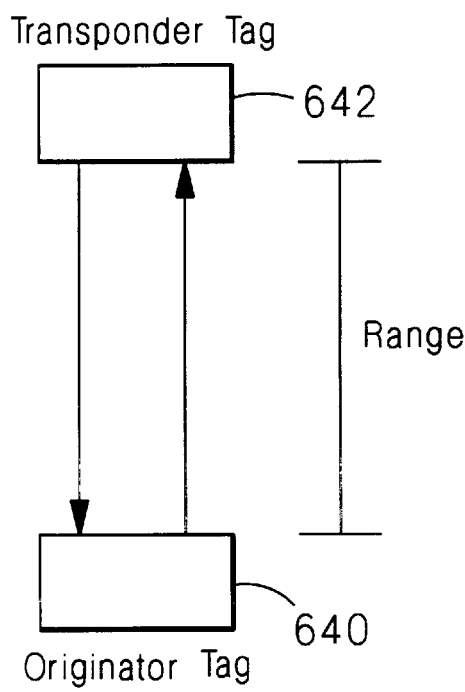
FIG. 34 is a schematic diagram of two tags in the system of FIG. 1.

The intertag distances subfunction (FIG. 34) in a tag 640 determines the tag's distance, that is, range, from another tag 642 by measuring the time required for an electromagnetic pulse to travel round-trip between the two tags. There are several methods for measuring this time. A baseline method is described first, followed by descriptions of alternate methods. Most of the methods require that the pulse-originator tag have a cooperating transponder tag for a reference, with one clock on each tag. However, the last alternate method describes a dual-clock technique wherein both clocks are on the originator tag—the other tag is simply a repeater or a repeater with a delay. In fact, if a delay is not required, another active tag is completely unnecessary in the last alternate method; the reference can be totally passive, for example, a mirror or a three-dimensional corner reflector.

The resolution of the range measurement is proportional to the time-measuring resolution of the tag, so it is advantageous to use methods of range measurement that effectively increase the time-measuring resolution. The methods described below take advantage of the tag's ability to detect a pulse received during a period of the tag's time-measuring clock. For a single pulse, the tag can detect that the pulse arrived during the period but not when during the period. Therefore, the range-measurement methods use multiple pulses and multiple successive measurements. In the baseline method, small offset delays of differing but known lengths are inserted, one per round-trip, in the round-trips of the pulses, to stagger the arrivals of the pulses. Thus, for a set of ranges, the offset delays cause a fraction of the pulses to return in a later time-measuring clock period in any particular range measurement. As described below, the method determines the range from this fraction.

In the baseline method, the originator tag and the transponder tag initially have identical clock periods. To insert a multiple of an offset delay "d" in the round-trips (FIG. 35), the originator alters its clock period slightly. The length of the alteration is an amount of time which provides a one-clock-period difference with the transponder's clock over a measurement interval. The measurement interval is an amount of time equal to the number of pulses sent, "N," multiplied by the time interval between the sending of each pulse. Although the originator's clock may be altered above or below the frequency of the transponder's clock, the embodiment of the baseline method described herein uses an originator's clock with a higher frequency, that is, a shorter period, than the transponder's clock.

The difference in clock periods results in the insertion of differing but known delays in the round-trip time, in the following way. Like the originator tag, the transponder tag can detect that a pulse was received during a period of the transponder's clock. The transponder participates in the round-trips by resending the pulse received from the originator. A delay in resending occurs because the transponder does not detect, and thus cannot resend, a pulse until the end of the period of the transponder clock during which the pulse is actually received. If the originator and the transponder use identical clock periods, pulses sent regularly according to the originator's clock always arrive at the same point within a period of the transponder's clock. With identical clock periods, such pulses are also always re-sent at the same time after arrival, that is, with the same "delay," adding nothing to range measurement resolution. A transponder with a slightly longer clock period detects and re-sends pulses with differing delays, because each regularly-sent pulse does not arrive at the transponder at the same time within a period of the transponder's clock.

Figure 35:
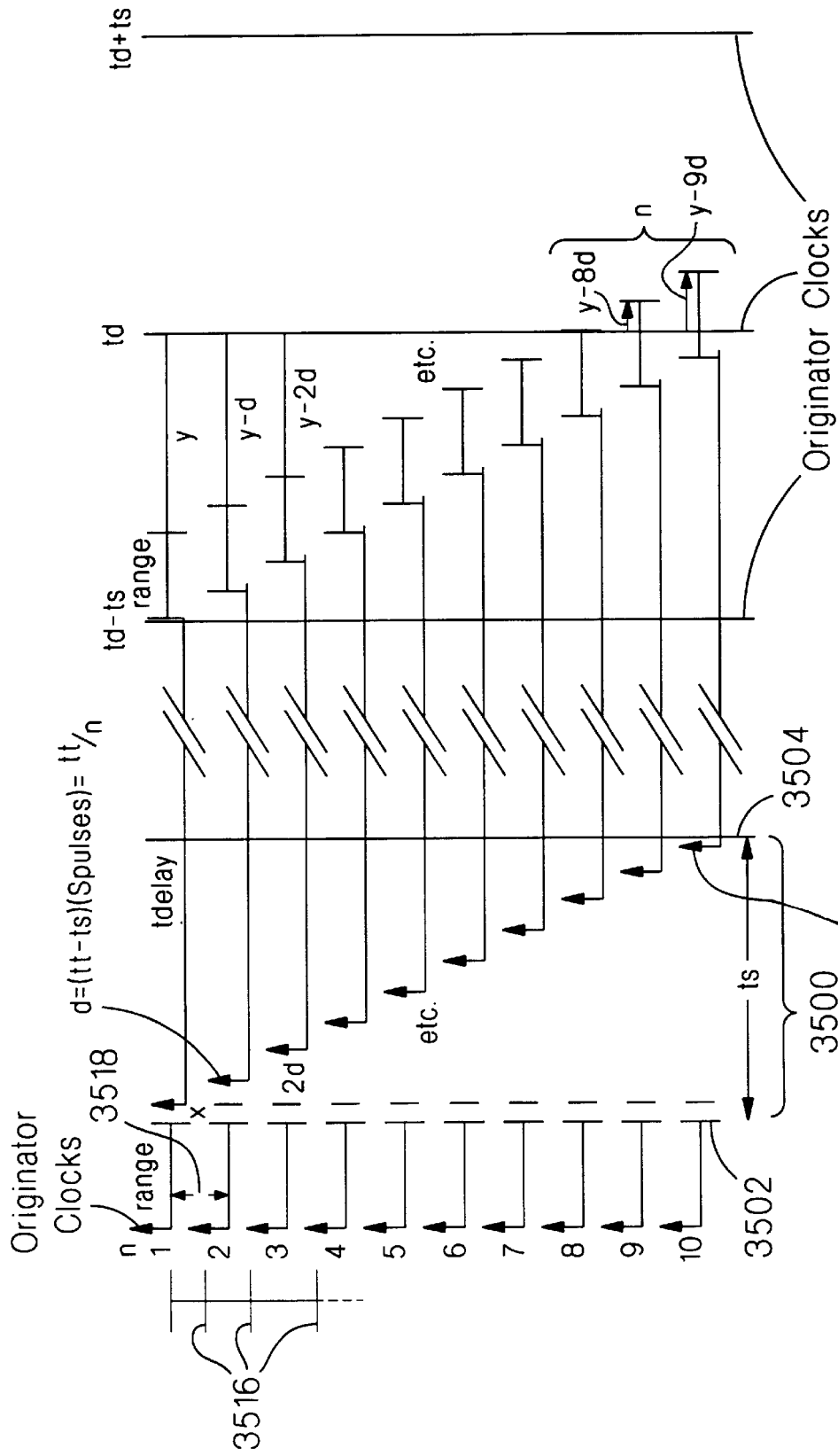
FIG. 35 is a graph of signals in the asset tags of FIG. 34.
Figure 37:
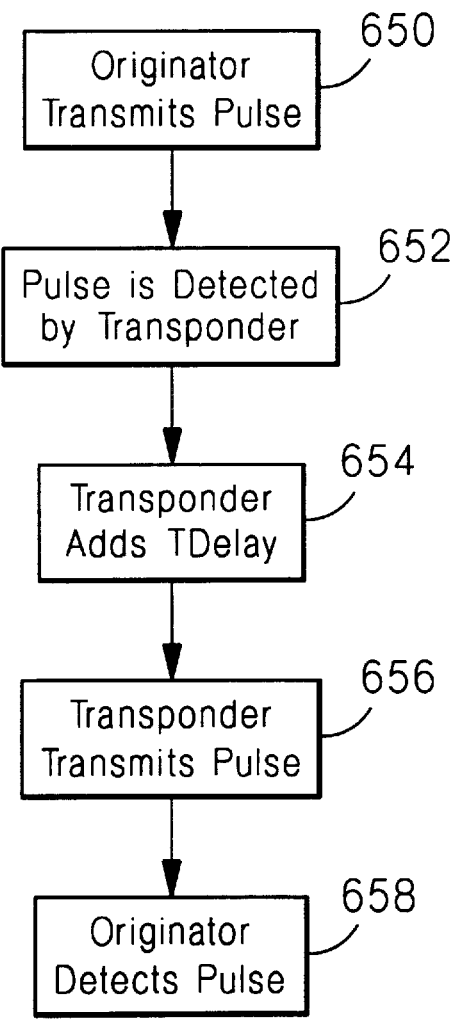
FIG. 37 is a flowchart for a process performed by the tags in FIG. 34.

In the baseline method (FIG. 37), the originator tag transmits "N" pulses (step 650) based on its clock such that the time between transmitted pulses, measured in clock pulses and designated "spulses," is constant. In the preferred embodiment, the difference in clock periods in such that after sending "N" pulses, the higher frequency clock has gained an entire clock period compared to the lower frequency clock. After a range delay, which is the time the pulse takes to reach the transponder and which is designated "range" in FIG. 35, each pulse is detected by, or clocked into, the transponder (step 652) as shown in FIG. 35 by the vertical arrows designated "transponder detections." The pulses are detected only at the end of the transponder clock period in which they are received. Although FIG. 35 shows the transponder's detections occurring in order from earliest after a pulse is actually received to latest, the method does not require and generally will not have this ordering. Depending on the range and the relative timing of the originator and transponder clocks, the cycle of differing delays can begin anywhere. The earliest pulse has an ambiguity "x" which has a maximum actual value of an offset delay "d." Ambiguity "x" refers to the interval between the pulse's arrival at the transponder and its actual detection by the transponder at the beginning of the next transponder clock period. The offset delay "d" is equal to the difference between the transponder clock period and the originator clock period multiplied by the number of originator clocks between the sending of pulses, i.e., "spulses." In accordance with this illustrated embodiment of the invention, the offset delay "d" is also equal to the period of the transponder clock divided by the number of pulses "N" used in the measurement. Each successive transponder clock period is additionally delayed, relative to the time the originator pulse is received, by a multiple of the offset delay "d."

In this baseline method, the transponder can also insert an extra delay, designated "tdelay," (step 654 in FIG. 37) sufficiently long such that the pair of tags can operate in a half-duplex fashion, that is, such that the originator has sufficient time after sending a pulse to switch to attempting to detect the transponder's pulse's return. This extra delay is unnecessary if full-duplex operation is possible, that is, if pulses can be re-transmitted by the transponder and detected by the originator using an independent return path, such as a different electromagnetic frequency. After the extra delay, the transponder transmits a pulse back to the measuring device (step 656). After the range delay, the pulse arrives back at the originator. Since the phase relationship between the two clocks is arbitrary, there is further created another ambiguity "y" (which also has an actual value which may differ by an amount up to "d") (FIG. 35) between the arrival time and the time that the pulse is actually detected at the originator (step 658).

For each individual measurement, the ambiguity "x" increases by "(n−1)d" over the initial measurement, where "n" is the measurement number in FIG. 35. The ambiguity "y" decreases by the same amount, taking on negative values in some measurements such as 9 and 10, such that "(x+y)" remains a constant having a maximum possible value that is "2d" greater than its minimum possible value. This constant is a result of the fact that "td" (the total time to detection of the returning pulse) is the sum of "y," two range delays, "tdelay," and "x." Because "td," the range delay, and "tdelay" are constants, "y" must decrease by the same amount that "x" grows, and vice versa.

Whenever a returning pulse arrives at the originator too late to be detected by a clock time "td," that pulse is recognized by the next clock "ts" time units later ("ts" is the originator clock period). Due to the relationships between the clocks, described above, there are never more than two such clock periods involved in a particular measurement. From the number of measurements which fall into each of the two clock periods before and after time "td," the range is determined to a resolution which is approximately 1/N of the originator's clock period.

In particular, if the range is such that all pulses arrive back at the originator within the same clock period in each measurement (FIG. 36), the range is readily determinable. In this case, all pulses will have had a round-trip time of "td." The average round-trip range delay is determined by subtracting from "td" the extra delay, "tdelay," and the constant (x+y):

$$\text{round-triprangedelay} = td - tdelay - (x+y) \tag{1}$$

In this case, where all pulses arrive back within the same clock period, the constant (x+y) can take any value from (ts−d) to (ts+d). The constant's actual value within these bounds is unknown because delay "d" corresponds to the resolution of the measurement method. Thus the actual range delay falls within maximum and minimum round-trip range delays given as:

$$\text{round-triprangedelay}_{max} = td - tdelay - ts + d \tag{2}$$

$$\text{round-triprangedelay}_{min} = td - tdelay - ts - d \tag{3}$$

Thus the range is half the round-trip range delay multiplied by the speed of light "c":

$$\text{range}_{max} = \frac{c(td - tdelay - ts + d)}{2} \tag{4}$$

$$\text{range}_{min} = \frac{c(td - tdelay - ts - d)}{2} \tag{5}$$

If the range is great enough such that "n" of the "N" measurements slip to the next clock period as shown in FIG. 35, (n)(ts)/N is added to the round-trip range delay:

$$\text{round-triprangedelay}_{max} = td - tdelay - ts + d + \frac{(n)(ts)}{N} \tag{6}$$

$$\text{round-triprangedelay}_{min} = td - tdelay - ts - d + \frac{(n)(ts)}{N} \tag{7}$$

and the range is:

$$\text{range}_{max} = \frac{c\left(td - tdelay - ts + d + \frac{(n)(ts)}{N}\right)}{2} \tag{8}$$

-continued $$\text{range}_{min} = \frac{c\left(td - t\text{delay} - ts - d + \frac{(n)(ts)}{N}\right)}{2} \quad (9)$$

The average of the receiving times of all the pulses is td+(n/N)(ts). Therefore, the range calculation reduces to $$\text{range}_{max} = \frac{c\left(\frac{(\text{Totalclockcount})(ts)}{N} - t\text{delay} - ts + d\right)}{2} \quad (10)$$

where Totalclockcount is the sum of all the clock counts used in the measurement and (Totalclockcount)(ts) is the sum of all the receiving times, as illustrated below. For $$\text{range}_{min} = \frac{c\left(\frac{(\text{Totalclockcount})(ts)}{N} - t\text{delay} - ts - d\right)}{2} \quad (11)$$

example, as shown in FIG. 35, if seven measurements are detected at time "td" and three are detected at time "td+ts," the sum of the all the receiving times is 7(td)+3(td+ts). Dividing the sum of all the receiving times by "N" provides a time measurement of resolution ts/N, effectively.

Turning now to a discussion of reducing errors in the method, the range calculation method is refined further as necessary. The difference between the minimum range value and the maximum range value is (c)(d). In the method, a reference range value is taken to be the average of the maximum range value and the minimum range value. Thus, the actual range value is always within (c)(d)/2 of the reference range value, that is, (c)(d)/2 is the "primary range error" with respect to the reference range value.

The range value is considered "nominal," meaning within a minimum of error, when the group of transponder detections is centered in a "ts" window 3500 as illustrated in FIG. 35. In other words, when the actual range produces centered transponder detections, the reference range value accurately represents the range. However, if the actual range is slightly shorter, the group of detections appears slightly shifted towards the left end 3502 of the window, but the range measurement remains the same. Similarly, if the actual range is slightly longer, the group of detections appears slightly shifted towards the right end 3504 of the window, but the measurement remains the same. In addition, the same observations apply to shifts corresponding to the detections of the returns of the pulses. That the measurement remains the same for different ranges amounts to measurement error. This measurement error corresponds to the primary range error noted above.

Figure 38:
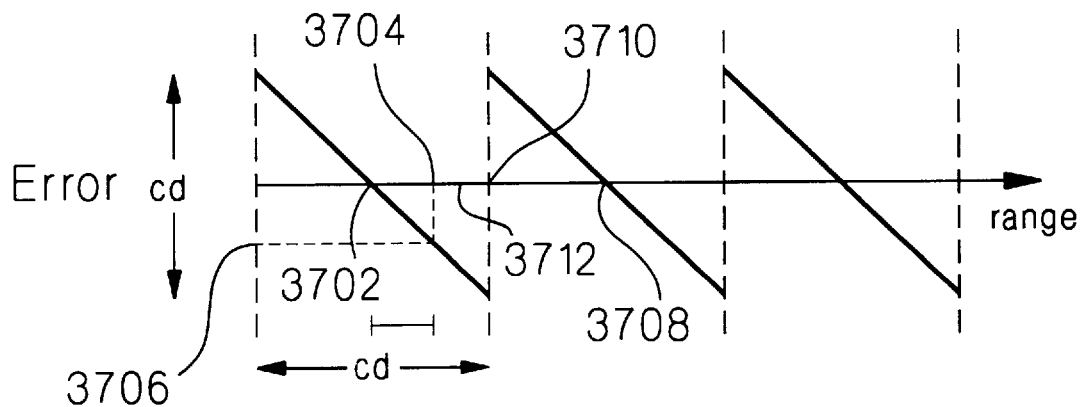
FIGS. 38 and 39 are graphs of errors in a range measured by the asset tags of FIG. 34.

With respect to FIG. 38, a simple example is now used to illustrate the primary range error as a function of range. In the example, an originator tag is stationary and a transponder tag is mobile. At first the transponder tag is at an actual range 3702 from the originator tag such that the primary range error is minimal, that is, the measured range value is nominal and the transponder detections are centered. The transponder is then moved slightly further from the originator tag, corresponding to a slightly larger range 3704. This larger range 3704 generates the same range measurement value as the original nominal range 3702, but this measurement value is now low compared to the actual range value, resulting in a negative error level 3706. As the range is increased further, the magnitude of the negative error level also increases. At a range 3710 midway in-between the original actual range 3702 and an actual range 3708 corresponding to the measurement method's next highest nominal range value, the error switches from negative to positive. The switch occurs because at this point the measurement method reports as a value, the range 3708, which is greater than the actual range 3710. If the transponder's actual range is then increased further, the magnitude of the error decreases as the transponder tag's actual range closes in on the new nominal range 3708. Thus, as a function of range, the primary error forms the sawtooth pattern shown in FIG. 38.

With respect to phase-related errors (FIG. 35), the relationship described above between the transponder clock period "tt" and the initiator clock period "ts" can be described in terms of the "N" pulses sent at "spulses" intervals, as follows.

$$ts = tt\frac{((N)(\text{spulses}) - 1)}{((N)(\text{spulses}))} \quad (12)$$

The incremental offset delay "d" between the transponder's periods, in terms of the initiator period "ts," is (tt−ts)(spulses). Because there are (N−1) such delays "d" plus a leading delay, "x," which cannot be larger than "d," the largest possible interval between the pulse's arrival at the transponder and the transponder's detection of the pulse is (N)(tt−ts)(spulses), or, substituting for "ts" from the previous equation, the largest arrival-detection interval is "tt." Thus, a detection occurring "tt" after arrival is referred to as a "maximally-late" detection.

Figure 36:
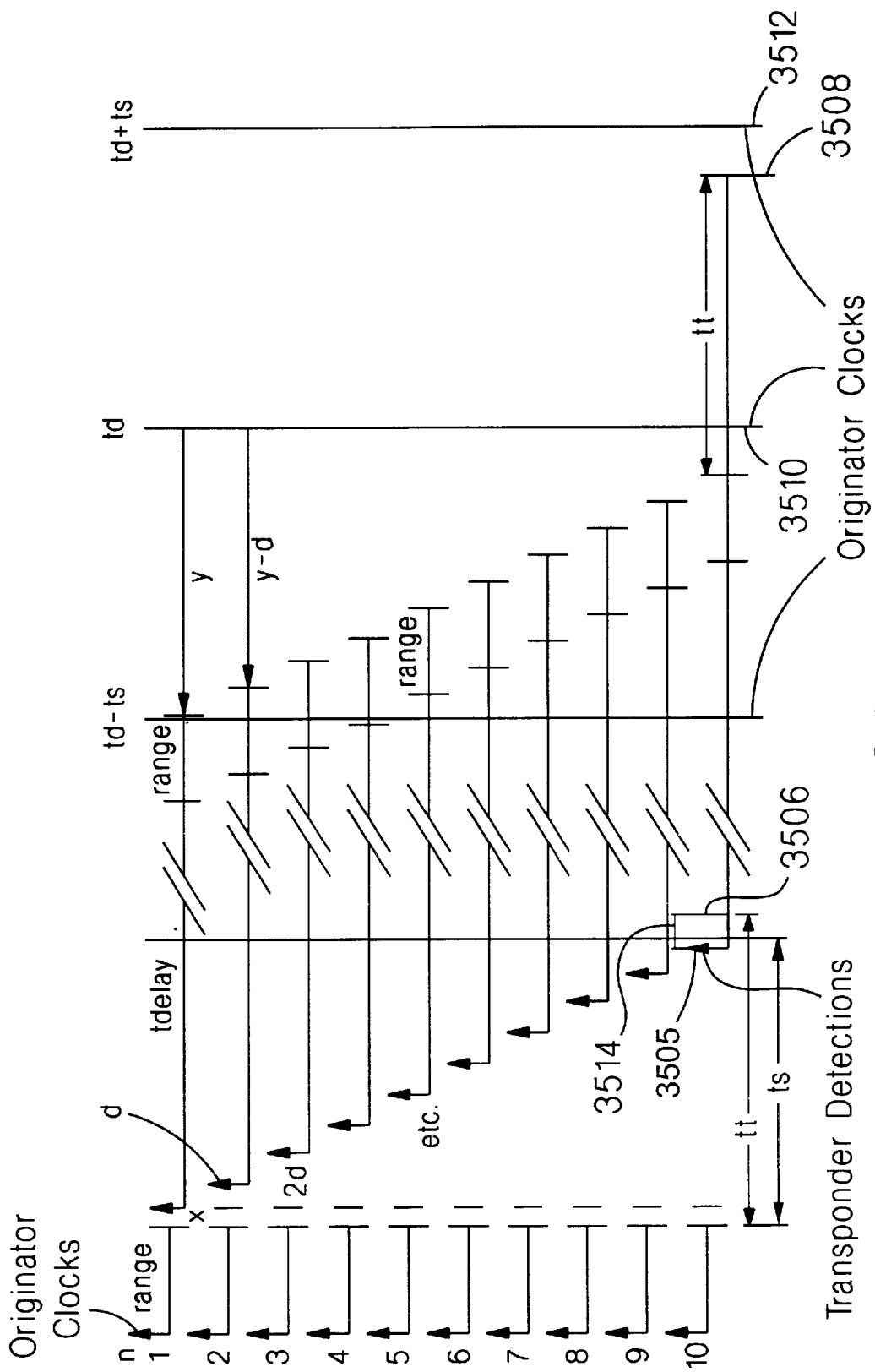
FIG. 36 is a second graph of signals in the asset tags of FIG. 34.

The "maximally-late" detection can cause a bias in the range measurement. For example, as shown in FIG. 36, it is possible that a phase-related error could cause the tenth transmission, which should be detected at an earlier time 3505, to be detected instead at a later time 3506 (not shown to scale). In this example, this "maximally-late" detection does cause a bias in the range measurement.

The bias occurs because the maximally-late detection provides a maximally-late re-transmission which, due to "tt" being larger than "ts" in this illustrated embodiment, causes the return of the pulse at the originator 3508 to be detected one originator clock period late. In other words, in this particular "maximally-late" situation, the return of the pulse 3508 is extended past the originator clock 3510 and therefore is not detected until the next originator clock 3512 even though it should have been detected at clock 3510.

Given that the length of the "ts" window is tt−tt/(N)(spulses) (from the previous equation), the maximally-late interval 3514 is tt/((N)(spulses)) time units in length. With the clock phasing distributed uniformly, the probability of the re-transmission occurring at the maximally-late time is the interval 3514 divided by the total time in which the transponder clock period can exist, or "tt":

$$\frac{\left(\frac{tt}{((N)(\text{spulses}))}\right)}{tt} => \frac{1}{((N)(\text{spulses}))} \quad (13)$$

As described below, (N)(spulses) is typically in the tens of thousands for these tags, so the probability of the maximally-late re-transmission is less than 0.01%. In addition, when the error occurs, it adds a maximum range delay error of ts/N, because the detection one originator clock period "ts" late is averaged across all "N" measurements in the baseline range measurement method.

Furthermore, the latest detection-re-transmission is the only one that can cause such an error, because, as discussed below, the second-latest transponder detection/re-transmission is always in the "ts" window. The arrival-detection interval corresponding to the second latest detection/re-transmission is one "d" delay shorter than the interval for the latest, or (N−1)(tt−ts)(spulses). Subtracting the second latest's interval from the length of the "ts" window, "ts," and substituting for "ts" yields a difference of (tt/N)(1−1/spulses). As a result of "spulses" being large and positive, the second term in (1−1/spulses) is small and less than one. The total result is positive, regardless of the chosen values of "N" or "spulses," which means that the second-latest re-transmission is always in the "ts" window. Thus, for most practical purposes, the baseline method is insensitive to phasing between the two clocks.

Figure 39:
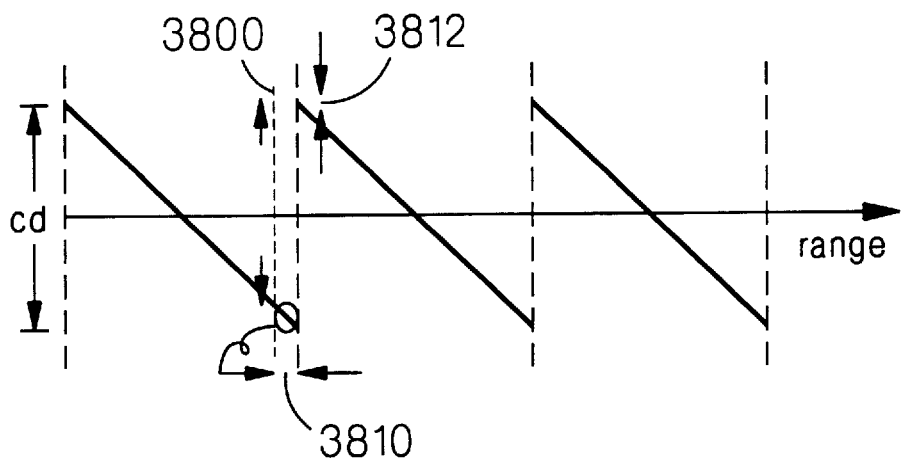

However, this secondary error due to phasing does have the effect of increasing the apparent primary range error, because the resulting additional round-trip range delay, which is equal to "ts," makes the range seem longer. With reference to FIG. 39, this secondary error, when it occurs, creates an altered "jump" 3800 in the apparent range. The jump 3800 occurs closer in range by a distance 3810 of (c)(ts)/2, which is the speed of light multiplied by half the additional range delay. This effectively offsets the primary error's sawtooth pattern by an error increase 3812 of (c)(ts)/(2). This error increase 3812 is corrected, on average, by subtracting the error increase 3812, discounted by its probability, from the range calculation:

$$\text{range}_{max} = \quad (14)$$

$$\frac{c\left(\frac{(\text{Totalclockcount})(ts)}{N} - t\text{delay} - ts + d\right)}{2} - \frac{(c)(ts)}{(2N)(spulses)}$$

$$\text{range}_{min} = \quad (15)$$

$$\frac{c\left(\frac{(\text{Totalclockcount})(ts)}{N} - t\text{delay} - ts - d\right)}{2} - \frac{(c)(ts)}{(2N)(spulses))}$$

If the expression (tt−ts)(spulses) is substituted for d, an average $\text{range}_{aver}$ of $\text{range}_{max}$ and $\text{range}_{min}$ can be calculated as follows. For a fixed calculation, "N," "ts," "tt," and "spulses" are constants. In the baseline method, "tdelay" is also a constant, which simplifies the calculation to:

$$\text{range}_{aver} = \frac{c\left(\frac{(\text{Totalclockcount})(ts)}{N} - \text{Constant}\right)}{2} \quad (16)$$

$$\text{Constant} = t\text{delay} - ts - \frac{ts}{((N)(spulses))} \quad (17)$$

To simplify computation, the calculation of the range is reduced even further to:

$$\text{range}_{aver} = \text{Constant1}(\text{Totalclockcount}) - \text{Constant2} \quad (18)$$

$$\text{Error1} = \frac{c(tt - ts)(spulses)}{2} \quad (19)$$

$$\text{Constant1} = \frac{(c)(ts)}{2N} \quad (20)$$

$$\text{Constant2} = \frac{c(\text{Constant})}{2} \quad (21)$$

where $\text{range}_{aver}$ is within Error1 of $\text{range}_{max}$ and $\text{range}_{min}$.

The same principles apply if the clock frequencies are reversed, that is, the originator clock has a lower frequency than the transponder clock. In this case, all transponder detections are contained within the clock period of the measuring device. However, because the "ts" window is never quite filled with transponder detections, the group of transponder detections has a range error of the same probability and magnitude described above.

The overall resolution of the range calculation is Constant1 or (c)(ts)/(2N), which is the slope of the range calculation equation. In other words, every increment in Totalclockcount corresponds to another (c)(ts)/(2N) of range. Thus, for example, for "N" on the order of 100, the resolution is on the order of 1% of (c)(ts).

This resolution enhancement allows the baseline method to measure ranges using a relatively low bandwidth.

Transponder and initiator clock frequencies on the order of 20 MHz (a 50 nsec clock period), combined with "N"= 100, produce a range delay measurement resolution on the order of 0.5 nsec with ±0.25 nsec maximum error. Higher values of "N" and higher clock frequencies result in finer resolution.

At ten microseconds between pulses, with a 20 MHz clock, "spulses"=200. If "N"=100, the frequency ratio of transponder clock to originator clock is 1.00005, that is, 50 ppm (parts per million). At 20 MHz, this yields a 1,000 Hz difference between the transponder clock frequency and the originator clock frequency.

Of course, secondary errors external to the baseline method itself can affect the resolution of the method. The transponder and originator clocks each have frequency error rates on the order of 1–10 ppm when operating at the same temperature. The frequency errors are somewhat larger if the temperatures are substantially different. Thus, a working clock rate of 20 MHz has a maximum error of 200 Hz for each clock. If the relationship between the originator clock and the transponder clock requires a frequency difference of 1000 Hz, and both clocks are in error by the maximum amount and in opposite directions, the difference error is 400 Hz, which is significant in relation to the frequency difference. In addition, range measurement errors due to clock frequency error increase as the range increases. However, if the delay times inserted by the measuring device and the transponder are large compared to the range being measured, these errors are nearly constant. If the delay times are not large, or if clocks with lower error rates cannot be used or higher frequencies are needed, an alternate clock method described below is used.

Transmission of pulses can also result in group delays and pulse smoothing such that, for example, the pulses are delayed and have slow rise times. To compensate, the group delays are measured and added to "tdelay" in the range calculation.

In addition, where the pulses are received by a threshold detector, a fluctuation in the perceived amplitude of the pulses at the detector can result in detecting the pulse with an erroneous clock count. With "N"=100, such fluctuations or variations in the perceived amplitude are controlled to less than 1% to achieve reliable measurements. If "N" is increased, the fluctuation control is tightened or the transmission bandwidth increased or both. Any variations in the clock periods are also controlled to this order of magnitude or better.

If the tags are moving relative to each other, range calculation errors can result due to Doppler shift and to actual range changes. Velocities of less than 15 fps (feet per second) produce only insignificant Doppler shifts in the baseline method which uses a measurement interval of milliseconds. Errors due to velocity are measurable above 15 fps and become a concern above 500 fps, where they are addressed using an alternate method as described below.

(b) Alternate Methods

Because the baseline method depends on the originator sending pulses at a uniform rate and energy consumption requirements dictate a limited measurement duration, there is a maximum range at which the baseline method can function. Beyond that range, the range measurements have a range ambiguity. A range ambiguity results when the originator does not wait for a first pulse to return before sending a second pulse. In such a case, the originator cannot determine whether a returning pulse corresponds to the first pulse sent or the second pulse sent. With the delays of the transponder and originator being quite large compared to the delay associated with the range, the transponder and originator delays can readily be set so that they are consistent with the short ranges expected in an asset management application. Other applications of the baseline method require resolution of range ambiguities.

Figure 40:
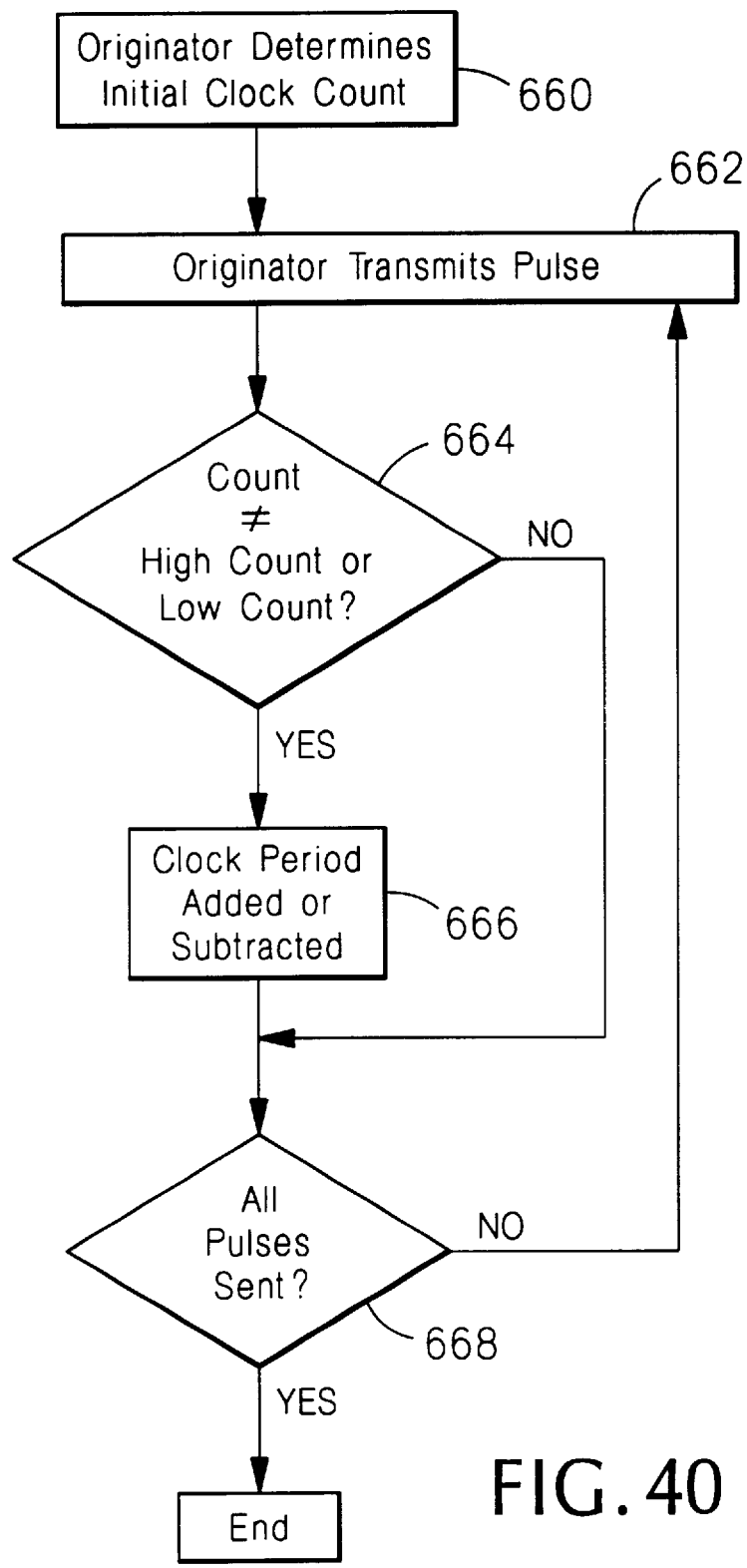
FIG. 40 is a flowchart for a process performed by the tags in FIG. 34.

One variation of the baseline method that avoids the range ambiguities is illustrated in FIG. 40. In this variation, the originator transmits a pulse and determines an initial clock count for return of the pulse (step 660), establishing a reference. Because a clock count always corresponds to one of two possible time periods, for example, "td" or "td+ts" in the discussion above, the initial clock count is either a low count value, for example, corresponding to "td," or a high count value, for example, corresponding to td+ts. The originator then transmits another pulse and determines another count (step 662). If the count does not equal the high count or the low count (step 664), the interval between pulse transmissions is incremented (for a count lower than the low count) or decremented (for a count higher than the high count) by one originator clock period (step 666). These increments and decrements are made continuously, adapting the range measurement to longer ranges and retaining the one-clock-period difference between the originator and transponder clocks. As long as the originator keeps track of when each pulse is transmitted, range ambiguities are avoided, because the originator can distinguish among returning pulses by calculating when to expect each pulse's return.

As discussed above, the baseline method sets the clock frequencies such that the originator clock has one more or one less clock period during the entire measurement period. For the approximate magnitudes discussed above, this setting results in clock frequencies which are different by about 50 ppm. Alternate clock choices are used effectively to increase resolution. The primary requirements are (1) that the difference in the clocks' periods causes aliasing, and (2) that the clocks uniformly sample the measurement window, that is, the "ts" window, during the measurement interval. To ensure aliasing, the number of clock periods used, "m," is chosen such that "m" does not share any multiplicative factors with "N" in the measurement interval. Thus the relationship between "ts" and "tt" becomes:

$$ts = tt \frac{((N)(spulses) - m)}{((N)(spulses))} \quad (22)$$

where "N" and "m" share no common factors. The lack of common factors can be ensured by making "N" a prime number such as 101.

When velocity is a potential concern, as discussed above, two range measurements are made back to back. By dividing the difference of the two measured ranges by the time interval between the two measurements, the instantaneous velocity, including direction, is computed and used to correct the range measurement. If the transponder is moving closer to the originator, the range decreases during the measurement period. A correction equal to the magnitude of the range decrease, (velocity)(N)(spulses)(ts), is added to the range calculated. Conversely, if the range is increasing, the correction is subtracted.

As a result of limits due to the secondary errors discussed above, the duration of the measurement interval cannot be arbitrarily large in the baseline method. This is addressed by yet another variation of the baseline method. Referring again to FIG. 35, time as represented therein proceeds from left to right and the right end of each horizontal timeline represents an earlier time than the left end of the next horizontal timeline below. If a second round of measurements were to be initiated "spulses" clock periods after the last pulse of the previous round, the results would repeat exactly, except for slight perturbations due to clock frequency errors. However, if the second measurement round is initiated (n)(spulses)/2 clock periods later 3516 (where "n" is a positive odd integer), the effect is to shift all of the transponder detections in the "ts" window by d/2. This d/2 shift for an n-odd multiple of a half "spulses" period follows from the fact that the increase in ambiguity "x" for a full "spulses" period 3518 is "d." The sawtooth error profile shifts by (c)(d)/2 for the same reason.

After the two range measurements are averaged, the error profile of the result is still a sawtooth, but the error profile's period and amplitude are only half of the period and amplitude of each individual error profile. With reference to FIG. 38, halving of the period and amplitude occurs because the second round of measurements doubles the number of nominal range points. The doubling occurs because averaging the first and second rounds effectively adds a nominal range point 3710 halfway between each set of nominal range points 3702, 3708 of the first round. For example, an actual range 3712 which corresponds to a particular first round nominal range point 3702 and a different second round nominal range point 3710 is given by the average to correspond to an in-between point 3704. The in-between point 3704 is a more accurate estimate of the actual range 3712 than was the first-round measurement 3702. Thus, resolution is enhanced by averaging the first-round measurement and the second-round measurement.

In the full alternate method of this averaging technique, this process is repeated with four or more measurement rounds. The number of rounds is divisible evenly into "spulses." In effect, this method is a binary search on the error space of the range measurement, reducing the ambiguity and maximum error for each measurement made. The reductions occur for the same reasons given above with respect to FIG. 38, namely, that additional measurements, spaced properly, effectively add additional nominal range points, thus providing an enhanced resolution.

In another variation, a binary search is undertaken in another fashion. In the baseline method, the delay "d" is a constant. However, in this variation, the delay d is varied to produce a binary search of the range space after identification of the measurement in which a clock count transition from a lower value to a higher value occurs. For example, referring to FIG. 35, such a transition occurs in measurement 8, because in measurement 8 the count changes from "td" (measurements 1–7) to "td+ts" (measurements 8–10). The process of halving the range error is continued in order to home in on the actual transition time and, in turn, the actual range. The successive delay in the measurements is determined by d=(tt−ts)(spulses). This delay is increased by increasing pulse transmission intervals "spulses" or by increasing the difference between the two clock periods.

Because all tags can operate at two frequencies, corresponding to clock periods "ts" and "tt" as described above, an alternative strategy which accomplishes the same homing-in result involves reversing the frequencies of the two tags as needed. With this strategy, described in detail below, if a timing difference of "−d" is needed, the originator tag commands the transponder tag to adopt the frequency corresponding to clock period "ts." At the same time, the originating tag makes the determination to set its frequency to correspond to clock period "tt."

Figure 41:
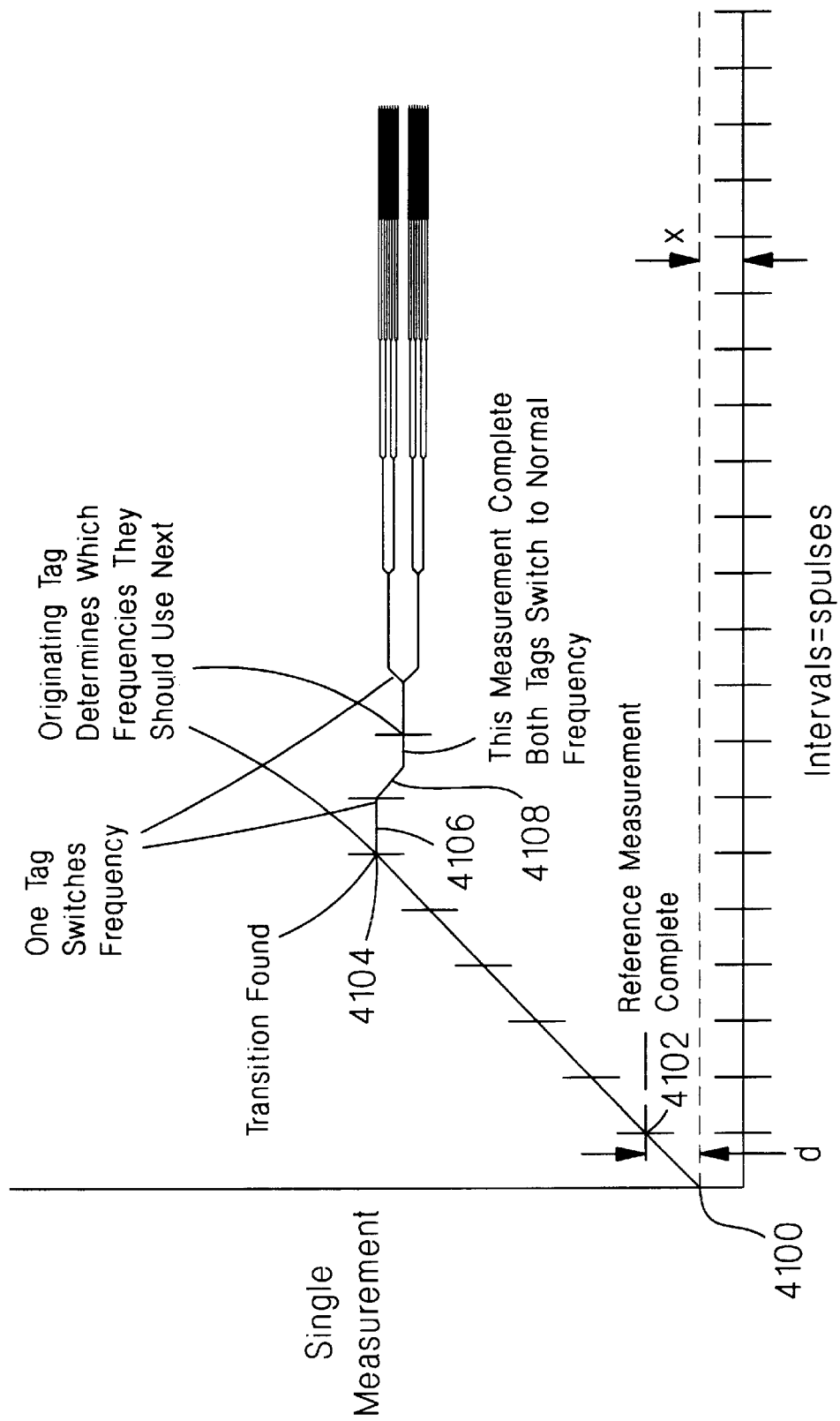
FIG. 41 is a graph of measurement results in the tags of FIG. 34.
Figure 42:
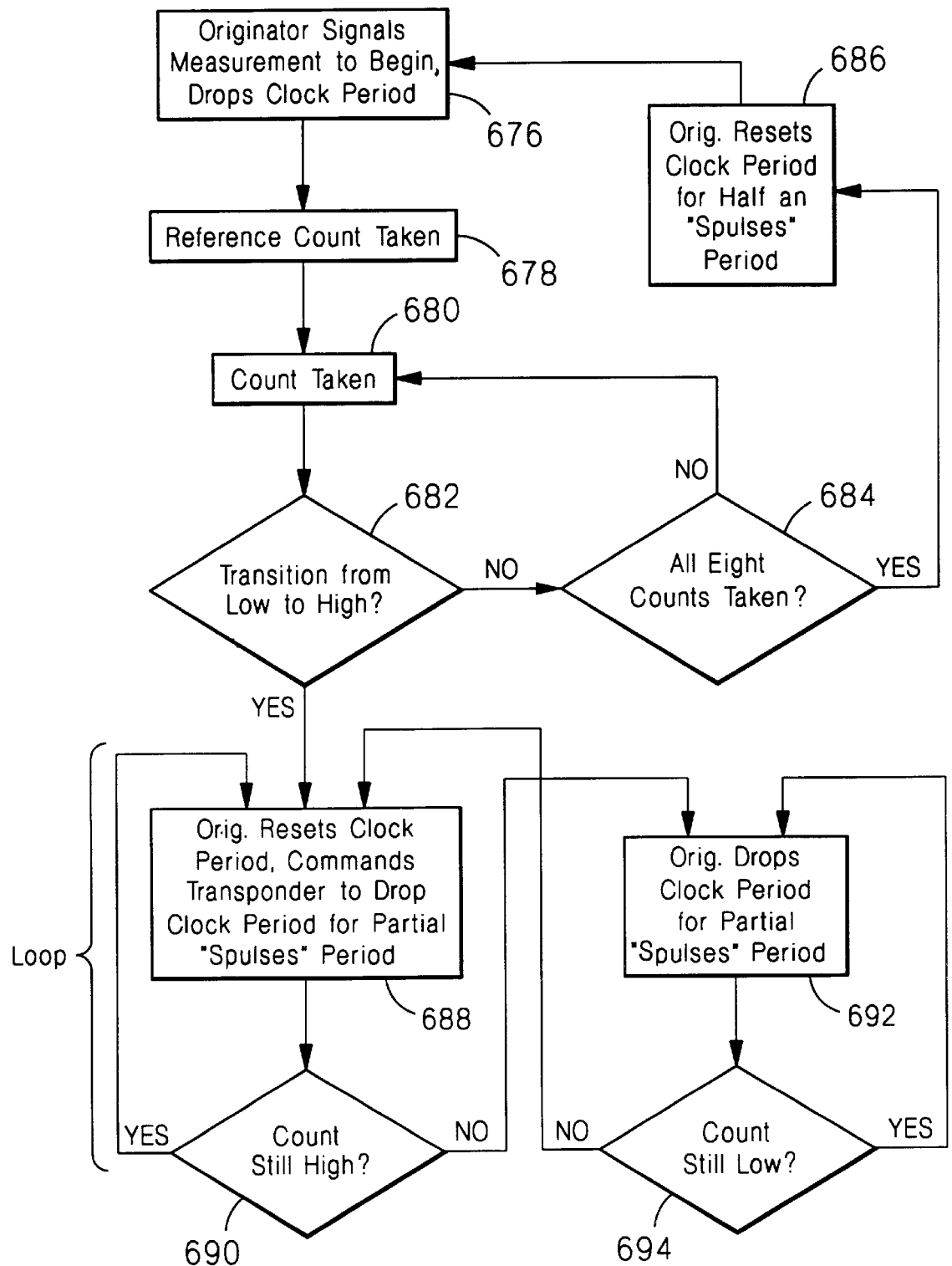
FIG. 42 is a flowchart for a process performed by the tags in FIG. 34.

This alternate method is now described in detail in an example which uses "N"=8 (FIGS. 41 and 42). At rest, the originator and the transponder use the same clock period "tt." Before the time 4100 when the first measurement is taken, the originator signals the transponder that a measurement is about to begin, then drops its clock period to "ts" and sends a pulse (step 676). To establish a reference clock count, the originator counts clock periods, which also reflect the transponder's delay "tdelay," until the pulse is returned 4102 (step 678). At this point, the originator starts to perform measurements at intervals corresponding to "spulses" (step 680). Measurements are performed until the first to occur of:

(1) A transition from an initial "low" count to a subsequent "high" count is identified 4104 (step 682). As described below, the originator tag determines how to change the delays to focus on the identified period and commands the transponder tag accordingly.

(2) All eight measurements have been taken and the counts are all the same, meaning that there has been no transition from the low count to a high count (step 684). In that event, the originator resets its clock period for an amount of time corresponding to spulses/2 (step 686) and the preceding sequence is repeated.

When the counts change from "low" to "high" as shown for the sixth measurement 4104 in FIG. 41, the measurement method has detected that the range delay is such that an accumulation of 5 delays "d" is sufficient to "push" the return of the pulse into the "high" clock count period. Thus measurement 6 of FIG. 41 is similar to measurement 8 of FIG. 35. At this measurement, the measurement method checks, as follows, to determine more precisely the accumulation that is sufficient to have the same effect. Clearly, an accumulation of (4)(d) is insufficient because the fifth measurement did not produce the "high" count.

To test the effect of an accumulated delay of only (4.5)(d), the measurement method subtracts (0.5)(d) from the accumulated delay by switching clock periods in the following way. The originator stays in step with the transponder by raising its clock period to "tt" for one "spulses" period 4106 and then commands the transponder to lower its clock period to "ts" for half a "spulses" period 4108 (step 688). Because the originator and the transponder have different clock periods for only half an "spulses" period, only (0.5)(d) is subtracted from the accumulated delay. Another measurement and clock count are acquired and tested (step 690).

At this point, a clock count which remains high indicates that an accumulated delay of (4.5)(d) is sufficient to push the return into the high clock count period. In that case, an accumulated delay of (4.25)(d) is similarly tested, by lowering the transponder's clock period to "ts" for a quarter of an "spulses" period (step 688). On the other hand, a clock count which drops to the low count during the test of an accumulated delay of (4.5)(d) indicates that a measurement corresponding to an accumulated delay of (4.75)(d) should be taken (step 692) and tested (step 694). In this loop (steps 688, 690, 692, and 694), successively smaller portions of delay "d" are used to determine, to a successively higher resolution, how much accumulated delay is sufficient to effect a count transition. The range delay follows directly from subtracting "tdelay" and the accumulated delay from the low count.

These steps thus, as described, implement a binary search. (Other search patterns could be used.) A range delay determined at this resolution still has the biases mentioned for the baseline method. And in a manner similar to that used in the baseline method, these biases can be taken into account as the measured range delay is multiplied by the speed of light to produce the range.

Finally, the same techniques of using two clocks also work using a single dual-clock tag with a clockless passive or active second tag or reference. In a basic version of this single dual-clock tag variation, with reference to FIG. 43, one clock, having a period "tt," is used solely to cause the pulse to be transmitted 4200. The other clock, having a period "ts," begins clocking the pulse when it is transmitted 4202 and then acts as the measure of time (in clock periods) to determine when it is received 4204. The number of "ts" receipt clocks in the interval between pulse transmission and detection of receipt of the returning pulse is the basis of the range measurement.

Figure 43:
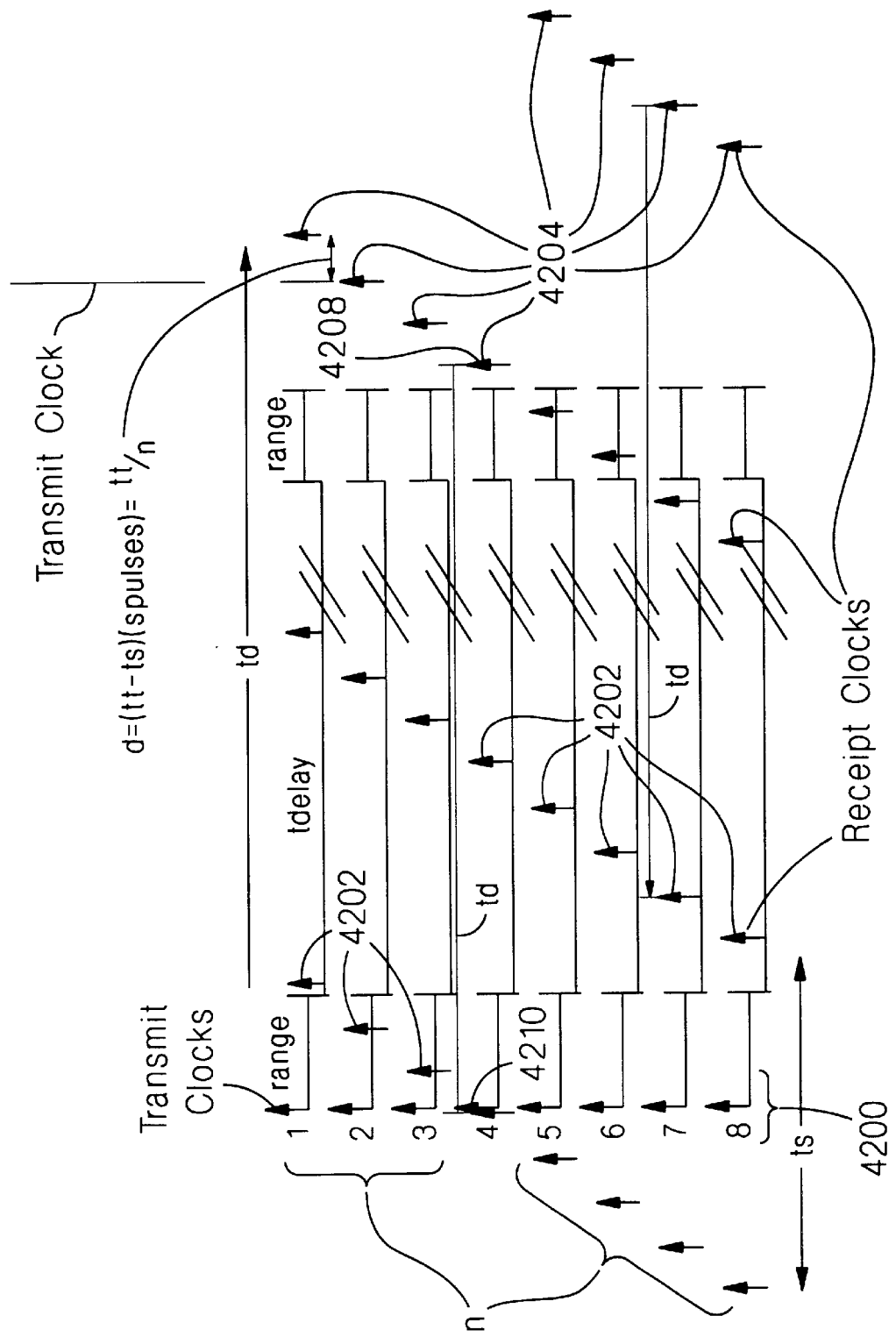
FIG. 43 is a graph of signals in the tags of FIG. 34.

In this instance, "td" is a multiple of "ts" such that, as shown for transmission 4 in FIG. 43, "td" is an accurate measurement of the round-trip time when there are no leading delays, which corresponds to the time (td–ts) in transmission 1 in the baseline method illustrated in FIG. 35. Thus, for transmission 4 here (in FIG. 42), the average range delay is simply calculated as half of (td–tdelay). That the round trip is measured as "td" in transmission 4 is indicated by the fact that the return 4208 of the pulse is detected within two (ignoring the hash marks in this illustration) receipt clocks of the pulse's transmission 4210. Transmissions 5–8, on the other hand, produce round-trip times of (td+ts), because there are three such receipt clocks between detection of transmission and detection of return. Thus, similar to the calculation of the range in the baseline method, every round-trip time of (td+ts) adds (ts/N) in the calculation of the range delay. As stated in general form, when "N" measurements have occurred and in "n" of the "N" measurements, the round-trip time corresponds to (td+ts), the measurement is given as $$\text{range}_{aver} = \frac{c\left(td - t\text{delay} + \frac{(n)(ts)}{N}\right)}{2} \quad (23)$$

The primary error of this basic dual-clock tag variation has a maximum magnitude of (c)(d)/2, which is the same as that of the baseline method. This is true because $$=c\left(\frac{(ts)(\text{Totalclockcount})}{2N}\right) \quad (24)$$

both the early clock (detecting pulse transmission) and the late clock (detecting receipt) have an initial ambiguity similar to the initial ambiguity "x" of the baseline method (FIG. 35). Thus each of these initial ambiguities has a maximum magnitude of "d" with respect to the transmit clock. Each maximum magnitude "d" is then halved and multiplied by the speed of light "c" in the range calculation to produce a range calculation error having a maximum magnitude of (c)(d)/2. The sum of these two range calculation errors has a minimum value of zero and a maximum value of (c)(d), which correspond to a minimum possible actual range and a maximum possible actual range. Therefore, the primary error is (c)(d)/2, because the average range, which is calculated according to the equation above and which is the average of the minimum possible actual range and the maximum possible actual range, is always within (c)(d)/2 of the actual range.

The range calculation provides for an instance where the clockless second tag or reference adds a delay "tdelay." If the reference is a simple reflector, "tdelay" is set to zero. The binary search methods described above apply to this variation as well.

In further variations of the methods described above, each "pulse" described herein is actually a sophisticated symbol. The symbol is a complex waveform which is, for example, a combination of pulses or a spread-spectrum signal. A different combination of pulses or combination of frequencies is used for each symbol, which amounts to a unique signature for each symbol. A system using symbols with unique signatures overcomes some range ambiguity problems, because each unique signature is used for making an identification of a returning signal. In addition, use of the symbol provides for finer grain time detection and overcomes hardware-based secondary errors such as threshold noise.

(c) Energy Consumption

With the parameters specified above, the originator transmits during the measurement interval about 0.1% of the time. Both the originator and the transponder are left on for the entire measurement interval. If a measurement is made once per second on average, energy consumption is about 0.2–0.3% of full-time on-energy consumption.

However, after the first measurement interval is completed and the range is determined to a low resolution, both tags know at what time the next pulse transmission or reception is to occur. Therefore, alternatively, the tags program themselves to "power-up" at that time, reducing energy consumption by a factor of about 100.

B. The verify range subfunction

Figure 44:
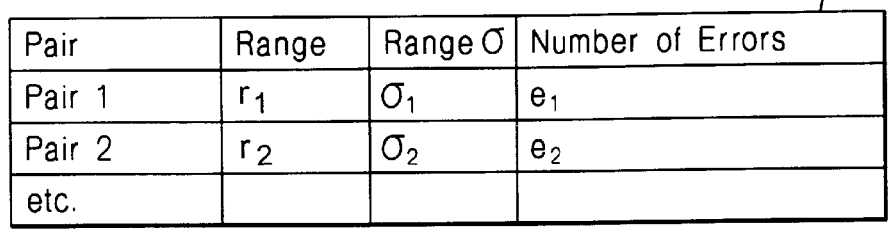
FIG. 44 is a schematic representation of a list stored in a memory of the asset tag of FIG. 1.

Referring to FIG. 44, the verify range subfunction determines whether each range received from the intertag distance subfunction is in error, and creates a list 800 of ranges associated with an error. List 800 stores the identification of the pair of tags associated with the range, the value of the range, the estimated error in the range ($\sigma$) as provided by the intertag distance subfunction, and the number of errors associated with the range.

Figure 45:
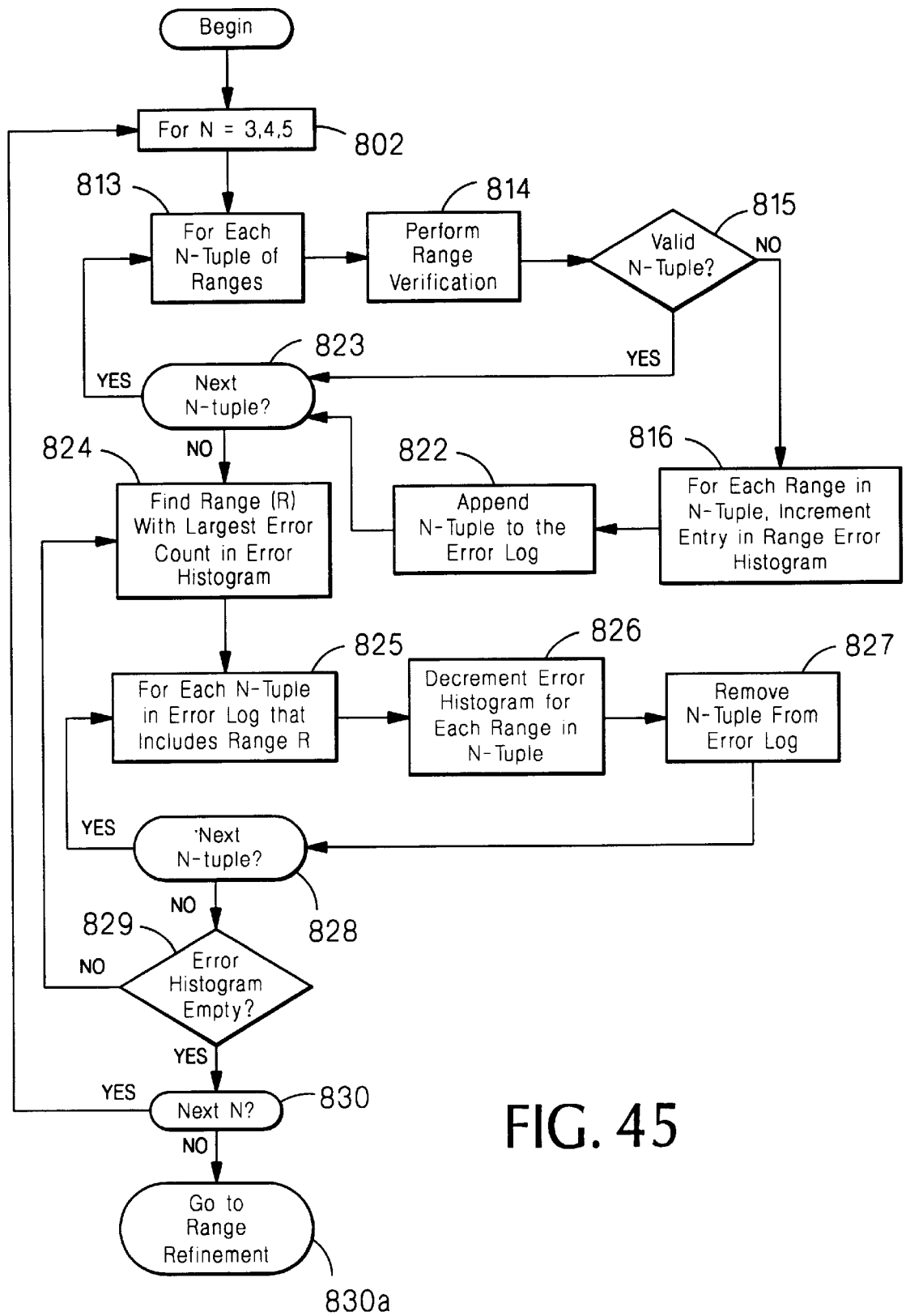
FIG. 45 is a flowchart for software performed by the processor of the asset tag in FIG. 1.
Figure 46:
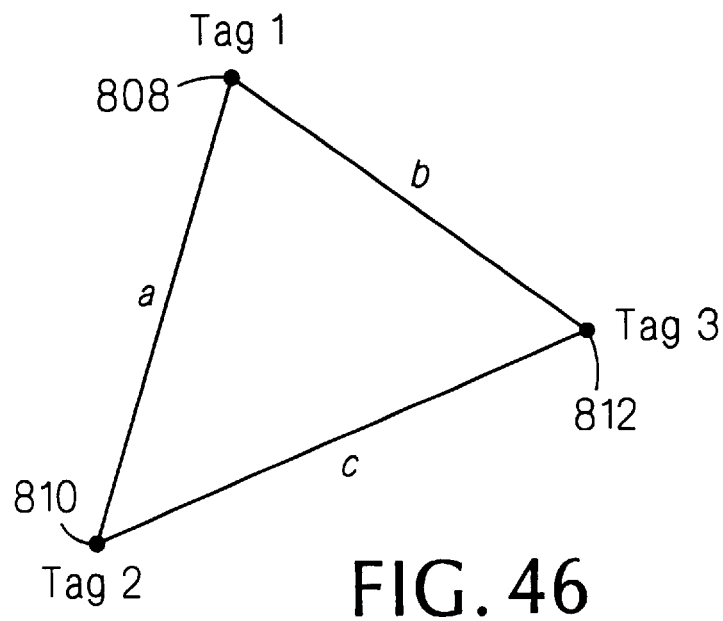
FIG. 46 is a schematic representation of group of three asset tags in the system of FIG. 1.

Referring to FIGS. 45 and 46, the subfunction begins by setting N equal to 3, and selects a group of N tags 808, 810, 812 (step 802). The subfunction tests whether the ranges a, b and c between the three tags form a triangle (steps 813, 814, 815), that is, whether within expected measurement error, the sum of two ranges (a+b) exceeds the third side (c) or the magnitude of the difference (a−b) exceeds c. This condition is expressed as follows:

$$|a-b|-2\sigma_\epsilon \leq c \leq a+b+2\sigma_\epsilon \quad (25)$$

where $\sigma_\epsilon$ is the standard deviation of an error metric, defined by $\epsilon_1$ and $\epsilon_2$, as follows:

$$\epsilon_1 = c - |a + b| \quad (26)$$

$$\epsilon_2 = c - |a - b|$$

$$\sigma_\epsilon^2 \equiv \sigma_{\epsilon_1}^2 = \sigma_{\epsilon_2}^2 = \sigma_a^2 + \sigma_b^2 + \sigma_c^2$$

where $\sigma_a$, $\sigma_b$ and $\sigma_c$ are the measurement errors of a, b and c, respectively. $\epsilon_1$ takes on values that are less than or equal to zero, and $\epsilon_2$ takes on values that are not less than zero, when $\sigma_a$, $\sigma_b$ and $\sigma_c$ are negligible. Other definitions of the error metric are possible; the definition provided in Equation (25) makes optimal use of the error in the ranges a, b and c.

Equation (26) assumes the variability in the values of a, b and c, due to measurement error is accurately modelled by a Gaussian probability distribution, centered at the measured value of a,b and c that is being tested, and with a standard deviation $\sigma_a$, $\sigma_b$, $\sigma_c$ which are all statistically independent of one another. Equation (27) is derived by bounding $\epsilon$ by its standard deviation (although the multiplier does not necessarily have to be two):

$$\epsilon_1 \geq -2\sigma_\epsilon$$

$$\epsilon_2 \leq 2\sigma_\epsilon \quad (27)$$

Figure 47:
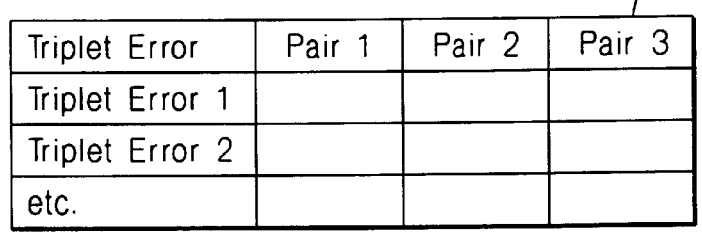
FIG. 47 is a schematic representation of a list stored by an asset tag in FIG. 1.

An error is detected when c does not fall within the bound given in Equation (25). When this occurs, the subfunction increments the number of errors for ranges a, b and c in list 800 (step 816). Referring to FIG. 47, the subfunction also creates an error log 820, and appends an entry to the log for each triplet that gets flagged as an error in list 820 (step 822). These entries include all the ranges associated with a particular error.

The subfunction then selects a next group of three tags (step 823), and returns to step 813. The subfunction continues the process until each triplet of tags in the network has been analyzed. If no error is detected in step 815, the subfunction proceeds to step 823 and analyzes another group of three tags.

After all N-tuples have been checked, the subfunction finds the range R with the highest number of error flags in list 800 (step 824). For each triplet in the log 820 that includes the range R (step 825), the subfunction decrements the number of errors in list 800 for each range in the triplet (step 826). The subfunction then removes the triplet from the log 820 (step 827) and chooses a next group of three tags that includes the two tags forming the range R (step 828).

After the subfunction has checked every triplet in the log that includes range R, the subfunction checks whether any errors remain in list 820 (step 829). If errors remain, the subfunction returns to step 824 and repeats the process. If no errors remain, the subfunction sets N=4 (step 830) and returns to step 802.

Figure 48:
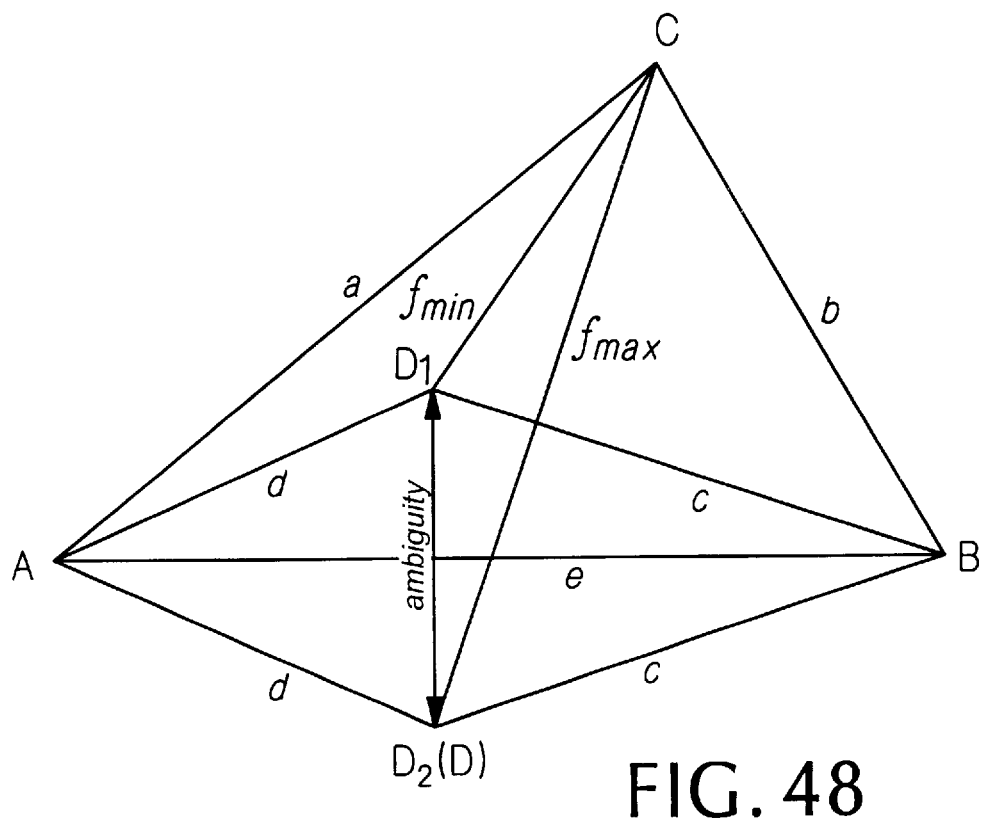
FIG. 48 is a schematic representation of 4 tags in the system of FIG. 1.

As shown in FIG. 48, the subfunction next selects a group of four tags (A, B, C and D), and retrieves the ranges (a,b,c,d,e,f) between each of the six pairs of tags (step 813). Steps 814 and 815 involve the following analysis.

The range verification subfunction models the tags as forming two triangles (ABC) and (ABD) with a common side (AB). The subfunction chooses the longest range (e) as the common side (AB). For a given set of ranges, there is an ambiguity in the location of D. The possible locations of tag D are indicated by $D_1$ and $D_2$. The distance between C and $D_1$ is labelled $f_{min}$; the distance between C and $D_2$ is labelled $f_{max}$.

The subfunction calculates $f_{min}$ and $f_{max}$ from the ranges a, b, c, d and e. The equations necessary for this calculation are given in Appendix I. The subfunction then checks whether the four tags form a valid tetrahedron by verifying whether the range f is bounded as follows:

$$f_{min} - 2\sqrt{\sigma_{f_{min}}^2 + \sigma_f^2} < f < f_{max} + 2\sqrt{\sigma_{f_{max}}^2 + \sigma_f^2} \quad (28)$$

where $\sigma_f$ is the error in f, $\sigma_{fmin}$ and $\sigma_{fmax}$ are Gaussian approximations for the variances of $f_{min}$ and $f_{max}$ respectively (steps 814–815). Equation (28) is derived by bounding f such that it does not vary from its mean by more than two standard deviations. In other embodiments, f is bounded by a different number of standard deviations.

Equation (28) also assumes that each range measurement (a,b,c,d,e,f) has a Gaussian profile, and the ranges are uncorrelated with one another. A Gaussian approximation for $f_{min}$ and $f_{max}$ is derived by linearizing the expression relating $f_{min}$ and $f_{max}$ to the other ten ranges (a,b,c,d,e), as shown in Appendix I below.

Figure 49:
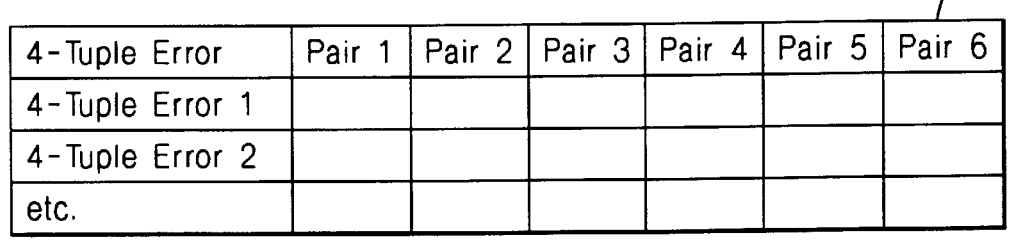
FIGS. 49 and 50 are schematic representations of lists stored by an asset tag in FIG. 1.

Referring to FIG. 49, if f does not fall in the bound given by Equation (28), the subfunction increments the number of errors in the stores associated with the ranges a through f in list 800, and creates an error log 820' analogous to error log 820. The subfunction appends an error flag to each range in the group of four tags in log 820'. The subfunction then performs the remaining steps in FIG. 45 using list 800 and log 820'.

When the subfunction has removed all the errors from list 800 (step 829), the subfunction sets N to 5 (step 830) and returns to step 802. The subfunction then selects a grouping of five tags and retrieves the group of ten ranges (a,b,c,d,e, f,g,h,i,j) between each pair of tags in the grouping (step 813). Steps 814 and 815 involve the following.

The subfunction models the five tags as two tetrahedrons sharing a common triangle. The subfunction chooses the triangle with the largest area as the common triangle.

Assuming the other nine ranges are correct, j is geometrically constrained to have one of two values ($j_1$ or $j_2$). When at least one of the ranges is in error, j is bounded by:

$$\left\{ |j - j_1| \leq 2\sqrt{\sigma_{j_1}^2 + \sigma_j^2} \right\} \cap \left\{ |j - j_2| \leq 2\sqrt{\sigma_{j_2}^2 + \sigma_j^2} \right\} \quad (29)$$

where $\sigma_j$ is the measurement error in j, and $\sigma_{j_1}$ and $\sigma_{j_2}$ are the standard deviations of $j_i$ and $j_2$ when $j_1$ and $j_2$ are approximated by Gaussian functions. Equation (29) is derived by bounding j such that it does not vary from its mean by more than two standard deviations. In other embodiments, j is bounded by a different number of standard deviations. Equations for deriving $j_{min}$ and $j_{max}$ and the variances are given in Appendix II.

Figure 50:
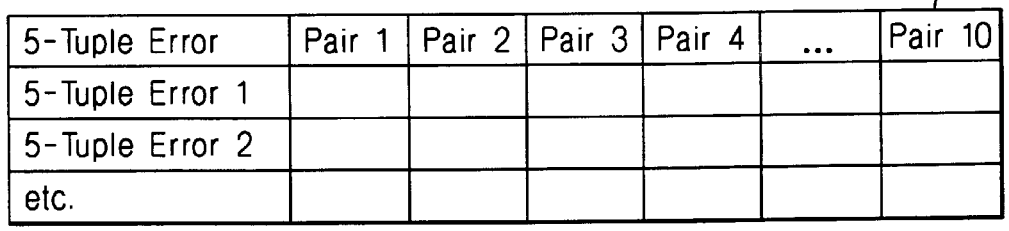

The subfunction verifies whether j falls within the bounds described by Equation (29) (steps 814, 815). Referring to FIG. 50, if the condition is not satisfied, the subfunction increments the error in the stores associated with a through j in list 800, and creates an error log 820" which is analogous to error logs 820, 820'. The subfunction appends an error flag to the log for the pairs of tags in the grouping of five tags, and repeats the remaining steps in FIG. 45.

When the process returns to step 830 this time, the tag proceeds to the refine range subfunction step 830a, described below.

C. The refine range subfunction

The refine range subfunction estimates a more accurate value for each range. Even valid range measurements can be improved with this technique.

The subfunction first selects a range (f) to be estimated, and finds groups of five tags that define pairs of tetrahedrons sharing the range in a common triangle. The processor calculates a value for the common range based on the nine measured ranges (a,b,c,d,e,g,h,i,j) in each group of five tags. This yields a group of estimates ($m_1$, $m_2$, . . . ,$m_N$) for the common range (assuming N tetrahedron pairs are used).

As shown in Appendix III, each estimate is linearized to $x_1$, $x_2$, . . . ,$x_N$, and modelled as a Gaussian probability function $f_1(x)$, $f_2(x)$, . . . ,$f_N(x)$ with a standard deviation equal to the measurement error of the estimate ($\sigma_1$, $\sigma_2$, . . . ,$\sigma_n$) (calculated, as is well known in the art, from the standard deviations of the measured ranges a, b, . . . , j for each tetrahedron pair) and a mean centered at the estimate itself ($m_1$,$m_2$, . . . , $m_N$).

The best estimate $x_b$ is modelled by a Gaussian probability function $f_b(x)$ with a mean equal to the estimate $x_b$ and a standard deviation $\sigma_{x_b}$. The best estimate is derived by finding $x_b$ that has a maximum likelihood, given the Gaussians $f_1(x)$, $f_2(x)$, . . . ,$f_N(x)$. This yields:

$$x_b = \frac{\sum_{i=1}^{N} \sum_{j=1}^{N} (x_i + x_j) q_{ij}}{2 \sum_{i=1}^{N} \sum_{j=1}^{N} q_{ij}} \quad (30)$$

where $q_{ij}$ is the (i,j)th element of an inverse covariance matrix of the set of estimates $x_1$, $x_2$, . . . ,$x_N$. Instructions for computing the covariance matrix are given in Appendix III.

The variance of the estimate $x_b$ is given by:

$$\sigma_{x_b}^2 = \frac{1}{\sum_{i=1}^{N} \sum_{j=1}^{N} q_{ij}} \quad (31)$$

After performing the calculation given in Equation (30) the processor assigns the best estimate $x_b$ to the range f. The processor then selects another range, and repeats the process until each range has been refined.

D. Compute locations

Once refined range measurements are obtained for each pair of tags, the compute locations subfunction sets up a coordinate system for defining the position of each tag. The coordinate system is defined by four stationary tags, as follows.

Figure 51:
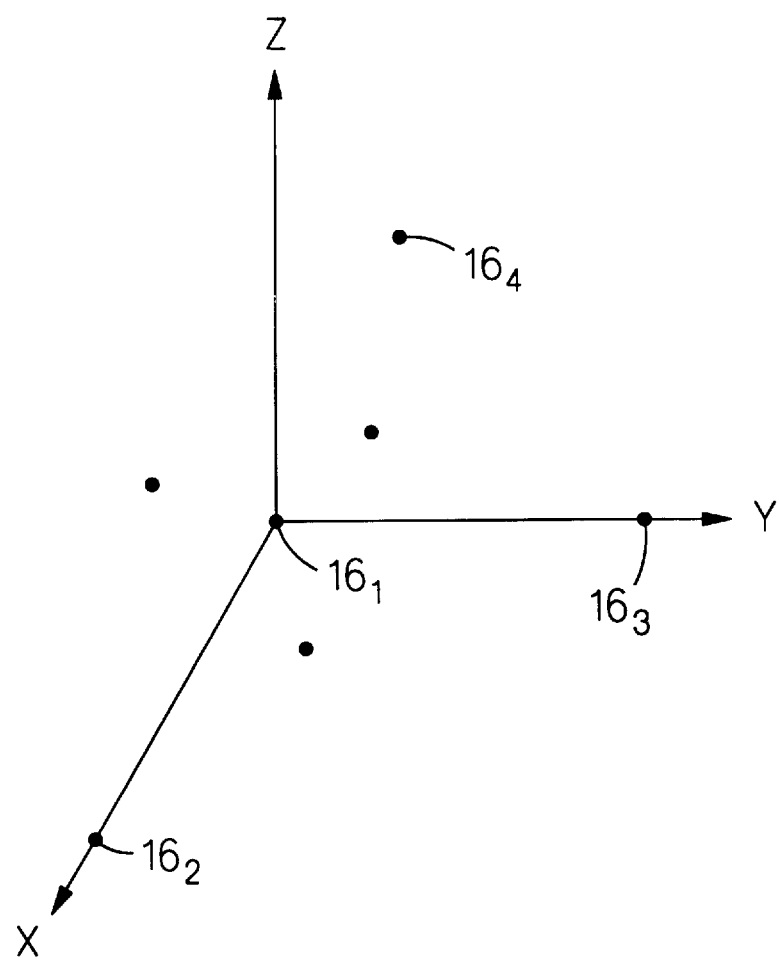
FIG. 51 is a schematic representation of a group of tags in the system of FIG. 1.
Figure 52:
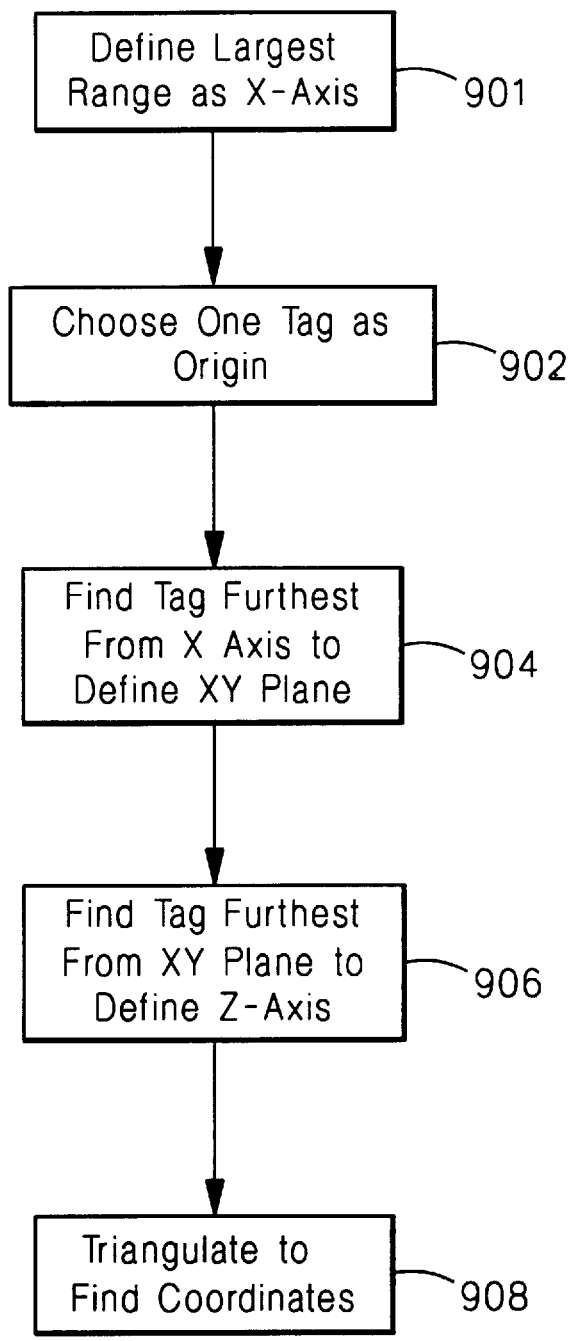
FIG. 52 is a flowchart for software performed by an asset tag in FIG. 1.

Referring to FIGS. 51 and 52, a pair of tags $16_1$, $16_2$ that are farthest apart defines the x-axis of the coordinate system (step 901). One of the tags $16_1$ is chosen as the origin, while the other tag lies on the positive x-axis (step 902). Choosing the tags furthest apart renders the coordinate system less sensitive to measurement error in the ranges between the tags. This coordinate system is transformed into an absolute coordinate system in section E below.

Next, the processor finds the tag $16_3$ that is furthest from the x-axis. This tag along with the x-axis defines the xy plane (step 904). The third tag is assigned a positive y coordinate. The known ranges between the three tags are used to define the coordinates of the third tag with respect to the origin, using conventional geometry and trigonometry.

The processor then chooses the tag $16_4$ furthest from the xy plane, and assigns a positive z value to the tag (step 906). This completes the definition of the coordinate system.

The x and y coordinates and the magnitude of the z coordinates of the remaining tags are defined by triangulation with the first three tags. The fourth tag is used to define the sign of the z coordinate (step 908).

E. Absolute Coordinate System

The arbitrary coordinate system of FIG. 51 is transformed into an absolute coordinate system, if the location of four stationary tags (which know their location) was supplied by the intertag distance subfunction. It is important that none of the tags are co-located (that is, located at the same coordinates) or coplanar.

If the locations of four stationary tags are not known, the tag checks whether the intertag distance subfunction supplied a list of moving tags. If so, the subfunction retrieves the list of moving tags. The list includes the locations of the tags and the error in the location measurement at given times, along with the distances between the tag and the moving tags at those times.

The subfunction analyzes this information along with the locations of the stationary reference tags to determine whether one of the following conditions holds for a tag. If any one of the conditions is satisfied, the tag determines its instantaneous position at each of the times relative to the reference objects with a maximum likelihood method analogous to that used by the refine range subfunction. The method employs all the information in the list to derive an estimate of the relative position of the tag and an error for the estimate.

The tag then decides whether the tag itself is moving, a reference tag is moving, or both. If the tag itself is moving, the tag determines its instantaneous position, and velocity using the relative position information. If the tag is stationary, the tag converts its relative position to an absolute position.

The first condition is that the reference tags must be moving in three dimensional space relative to the tag.

If the tag and reference tags are coplanar but not co-linear, the reference tags must be moving in two dimensions relative to the tag. If the tag and reference tags are co-linear, the reference tags must be moving in one dimension relative to the tag.

As additional reference positions and errors are accumulated by the intertag distance subfunction, the tag refines its position estimate using the same method. In addition, as tag locations are identified and changed, this information is passed to the determine topology subfunction.

XI. Detailed description of network formation unit

A. Determine topology subfunction

The determine topology function designates a set of neighbors for each tag by means of Delaunay triangulation, described in detail in "Spatial Tessellations: Concepts and Applications of Voronoi Diagrams," A. Okabe et al, the contents of which are incorporated herein, in its entirety, by reference.

Figure 53:
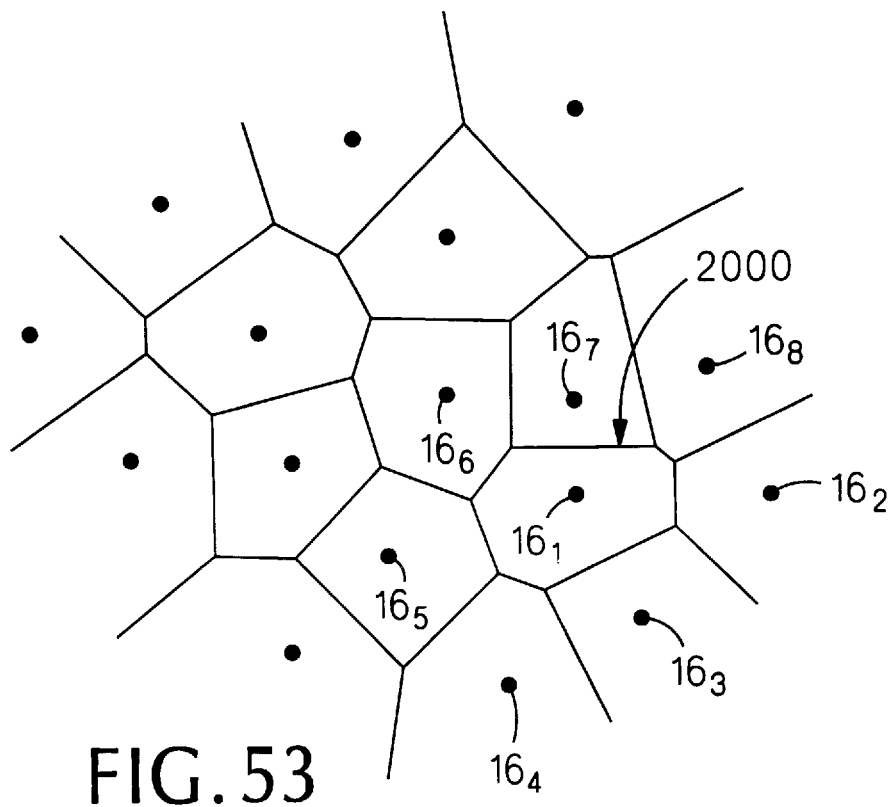
FIGS. 53 and 54 are schematic representations of a group of tags in the system of FIG. 1.

Referring to FIG. 53, the neighbors of a tag $16_1$ are found by first locating the set of points that are closer (in Euclidean distance) to tag $16_1$ than to any other tag. Each set of points is bounded by an "ordinary Voronoi polygon" 2000. The neighbors of each tag include the tags in polygons adjacent to polygon 2000. Thus, the neighbors of tag $16_1$ consist of tags $16_2, \ldots, 16_8$.

Figure 54:
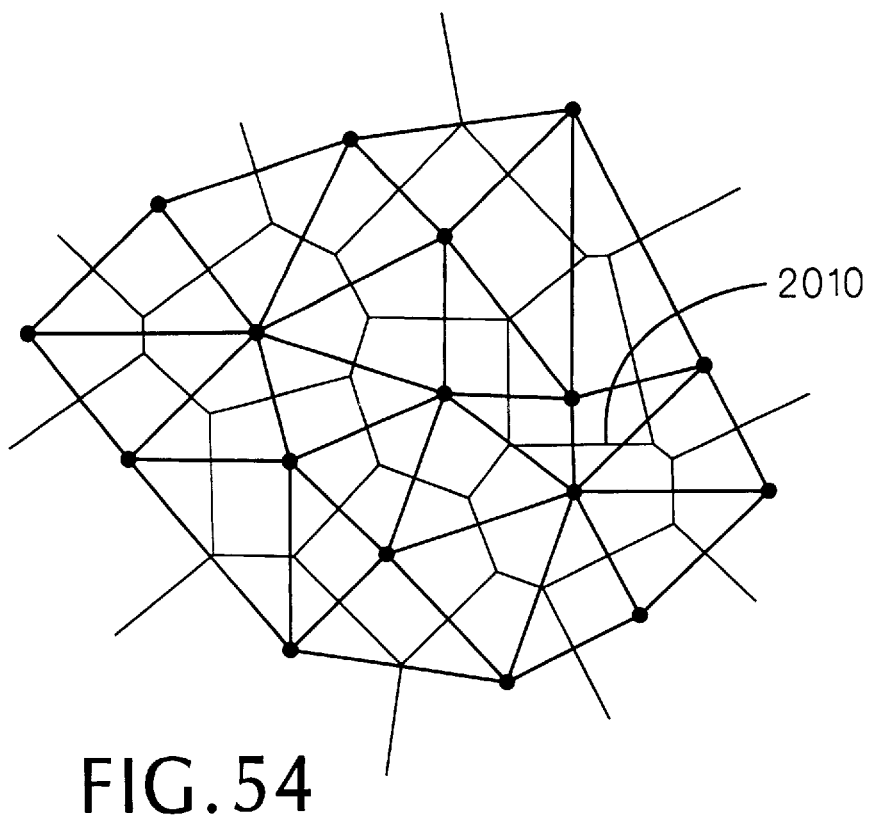

Referring to FIG. 54, a preliminary communication link 2010 is defined between a tag and each neighboring tag. The set of links between tags forms a Delaunay triangulation, and defines the topology of the set of tags.

The Delaunay triangulation is defined incrementally by causing each tag to find its neighbors. If the tags are all activated at the same time, the netmaster (the tag with the highest ID number) finds its neighbors first, by using the algorithm described below. After the netmaster has completed the algorithm, it selects the tag having the second highest ID number, and commands the tag to perform the algorithm to find its neighbors. The netmaster continues selecting tags in decreasing order of ID number until all tags have been selected.

When a new tag is added to a network, it communicates with other tags to determine whether the tags have already performed the process described above, that is, whether a Delaunay triangulation for the tags has been determined. If it has, links must be added to the triangulation to connect the new tag to its neighbors. This is accomplished by having the new tag perform the algorithm described below. If no Delaunay triangulation exists, the new tag waits until ordered by the netmaster to perform the algorithm.

The new tag (or the tag designated by the netmaster) finds and maintains a list of its neighbors by performing the following algorithm. Each step of the algorithm is executed by the determine topology subfunction in the new tag.

The new tag begins by receiving its own coordinates and then seeks information locating other tags in its vicinity from the compute locations subfunction. The determine topology subfunction ignores the z coordinates in the location information and thus finds the topology of the tags using a two-dimensional projection of their locations.

The determine topology subfunction next selects a random tag from the coordinate information which it defines as the "current tag" (current(n)) where n is the index of the iteration and queries the current tag regarding its neighbors. In other embodiments, the tag may communicate with a sentinel (defined in Section IX.C(c), above ) that causes the tag to choose the sentinel as the current tag. Any other tag may be chosen as the current tag.

Figure 55:
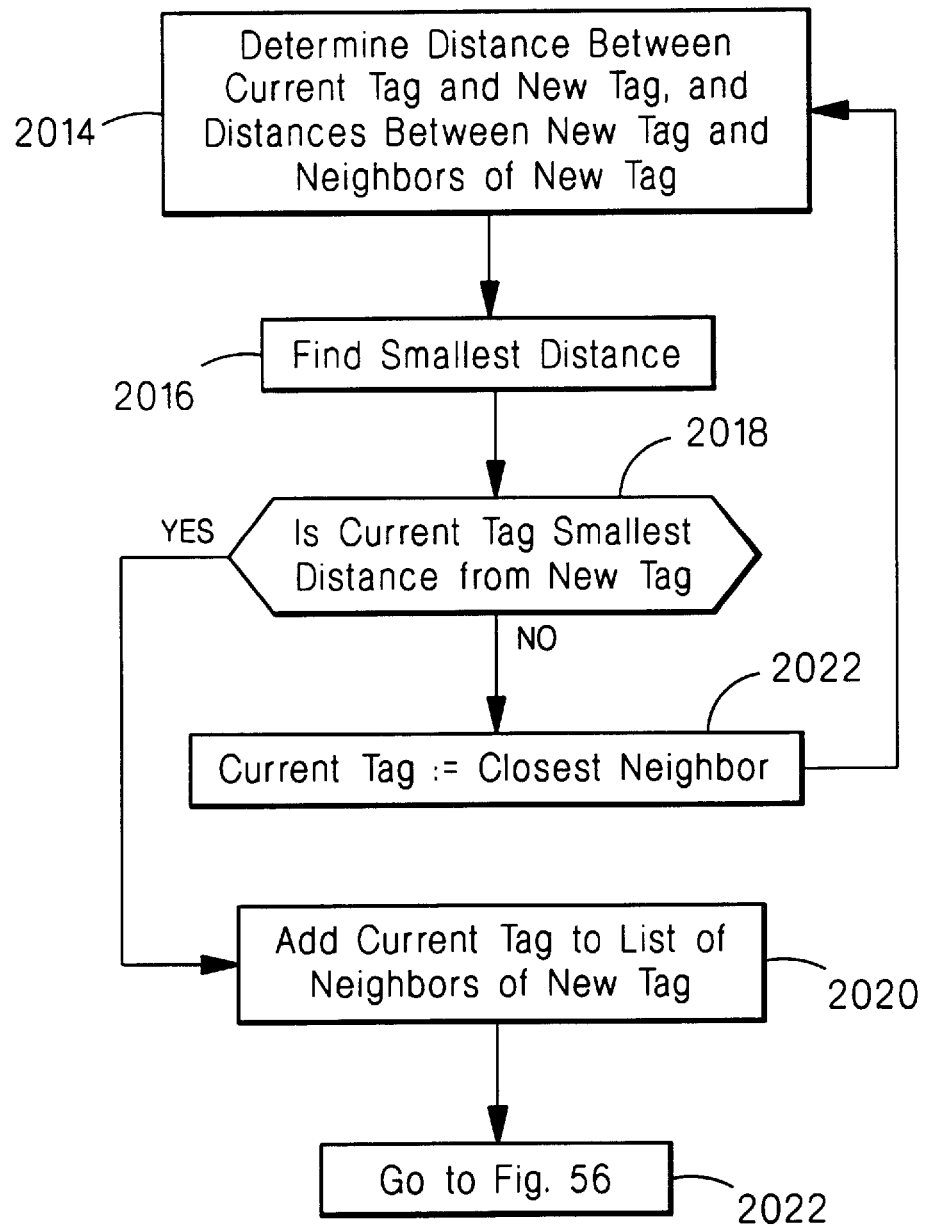
FIGS. 55 and 56 are flowcharts for software performed by an asset tag in FIG. 1.
Figure 56:
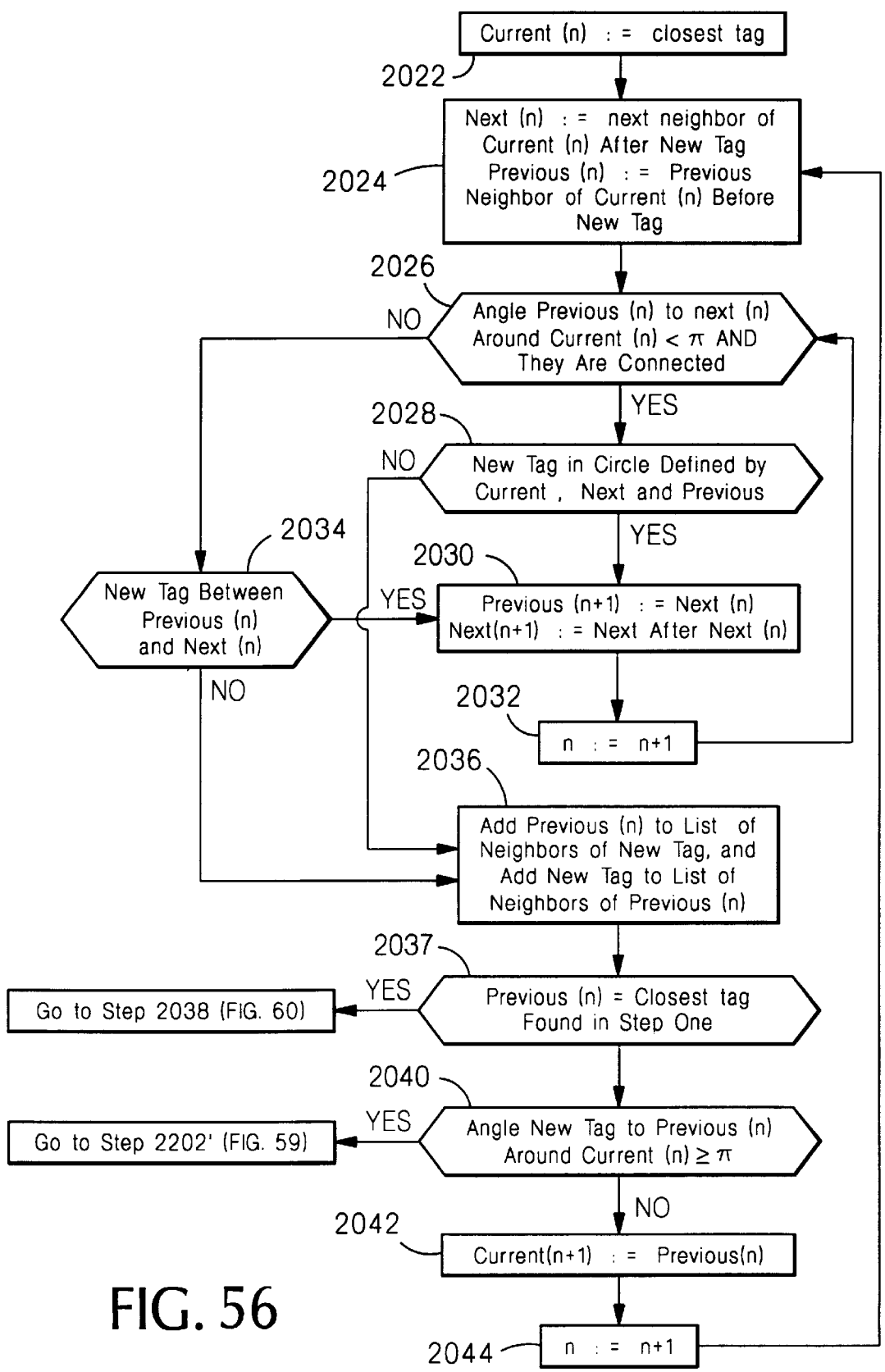

Referring to FIG. 55, the new tag calculates its distance from the current tag and its distance from each neighbor of the current tag, using the coordinate information (step 2014). The new tag analyzes the distances to determine whether the new tag is closest to the current tag (steps 2016, 2018). If so, the new tag stores the identification number of the current tag in its list of neighbors (step 2020) and proceeds to step 2022 in FIG. 56. If not, the new tag chooses the neighbor of the current tag that is nearest the new tag as the current tag (step 2022) and returns to step 2014.

When the new tag arrives at step 2022, the current tag has been defined as either the last current tag or the neighbor of the last current tag that is closest to the new tag. In step 2024 (FIG. 56), the new tag defines two of the neighbors of the current tag as the "next tag" and the "previous tag."

Figure 57:
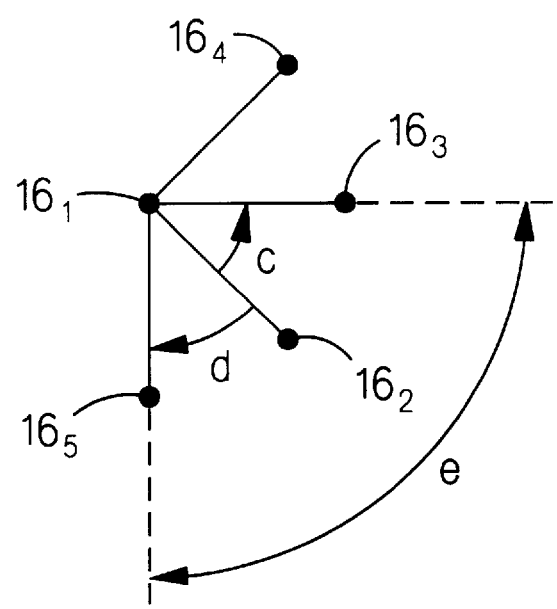
FIGS. 57 and 58 are schematic representations of a group of tags in the system of FIG. 1.

The next tag of a particular tag A is defined relative to a second tag B. The next tag is the neighbor of tag A which forms the smallest positive angle c with respect to tag B, with the tag A being placed at the vertex of the angle. For example, as shown in FIG. 57, tag A is the current tag $16_1$ and the tag B is the new tag $16_2$. If the neighbors of the current tag include tags $16_3$, $16_4$ and $16_5$, then the next tag of the current tag relative to the new tag of the current tag is tag $16_3$. Similarly, the next tag relative to tag $16_3$ is tag $16_4$.

The previous tag of a current tag relative to a second tag is defined as follows. The previous tag is the neighbor of the current tag which forms the smallest negative angle d with respect to the second tag, with current tag placed at the vertex of the angle. In the example shown, the previous tag for the current tag $16_1$ with respect to the new tag $16_2$ is the tag $16_4$. Similarly, tag $16_3$ is the previous tag for the current tag relative to tag $16_4$.

The new tag defines the next tag (next(n)) and the previous tag (previous(n)) of the current tag relative to the new tag (step 2024). The new tag then checks whether the angle between the previous tag and the next tag (with the current tag at the vertex of the angle) is less than 180 degrees (step 2026). For example, in FIG. 57, the new tag checks whether the angle d is less than 180 degrees. In the same step, the new tag verifies that the previous and next tags are neighbors of one another (that is, they are connected in the Delaunay triangulation). The new tag accomplishes this by querying the previous tag and the next tag regarding their neighbors.

Figure 58:
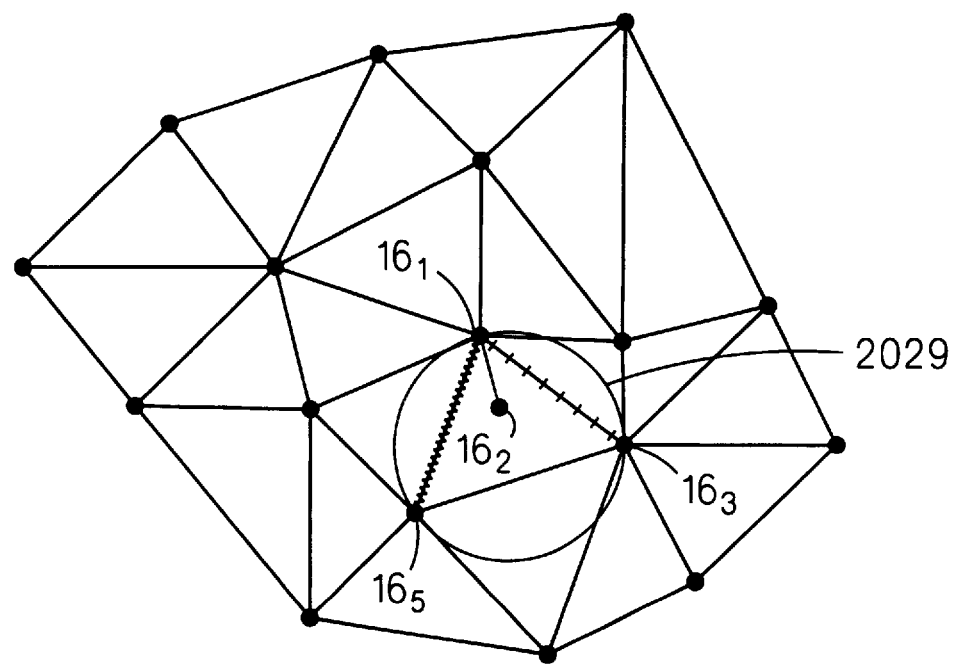

If both conditions of step 2026 are satisfied, the new tag checks whether the new tag is located inside a circle circumscribing the current, next and previous tags (step 2028). For example, as shown in FIG. 58, circle 2029 circumscribes tags $16_1$, $16_3$, $16_4$ and contains the new tag $16_2$. If the condition of step 2028 is satisfied, a new previous tag (previous (n+1)) is defined as the next tag (next (n)), and a new next tag (next (n+1)) is defined as the tag having the smallest positive angle with respect to the next tag (next (n)). The new tag then increments the value of the iteration (n=n+1) and returns to step 2026.

If the condition in step 2026 is not satisfied, the new tag checks whether the new tag is between the previous tag and the next tag with respect to the current tag (step 2034). This means that the previous and next tags are previous and next tags relative to the new tag. For example, in FIG. 57, the new tag $16_2$ is located between the previous tag $16_5$ and the next tag $16_3$.

If the condition in step 2034 is satisfied, the new tag adds the previous tag to its list of neighbors, and informs the previous tag (steps 2028–2032). The previous tag then adds the new tag to its list of neighbors (step 2036). Similarly, if the condition in step 2028 is not satisfied, the new tag proceeds to step 2036.

After step 2036, the new tag checks whether the previous tag is identical to the closest tag found in step 2018 (step 2037). If so, the algorithm skips to step 2038 (FIG. 60). If not, the new tag checks whether the angle of the new tag to the previous tag (with the current tag at the vertex of the angle) is greater than or equal to 180 degrees (step 2040). For example, in FIG. 57, the new tag compares the angle d to 180 degrees. If the condition is not satisfied, the current tag (current(n+1)) is redefined as the previous tag (previous (n)) (step 2042), the index n of the iteration is incremented by one (step 2044), and the new tag goes to step 2024. If the condition in step 2040 is satisfied, the algorithm proceeds to step 2022' (FIG. 59).

Figure 59:
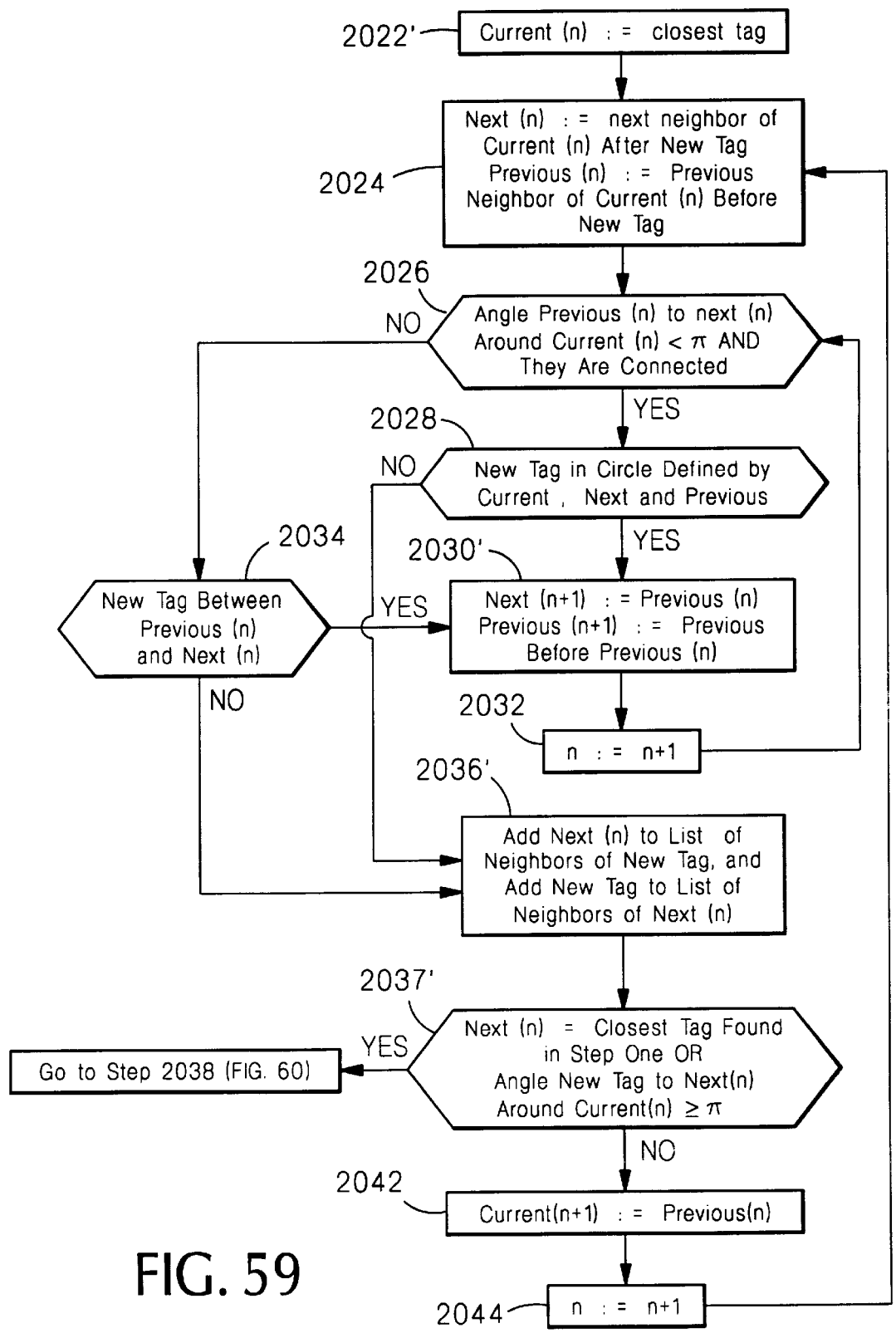
FIGS. 59 and 60 are flowcharts for software performed by an asset tag in FIG. 1.
Figure 60:
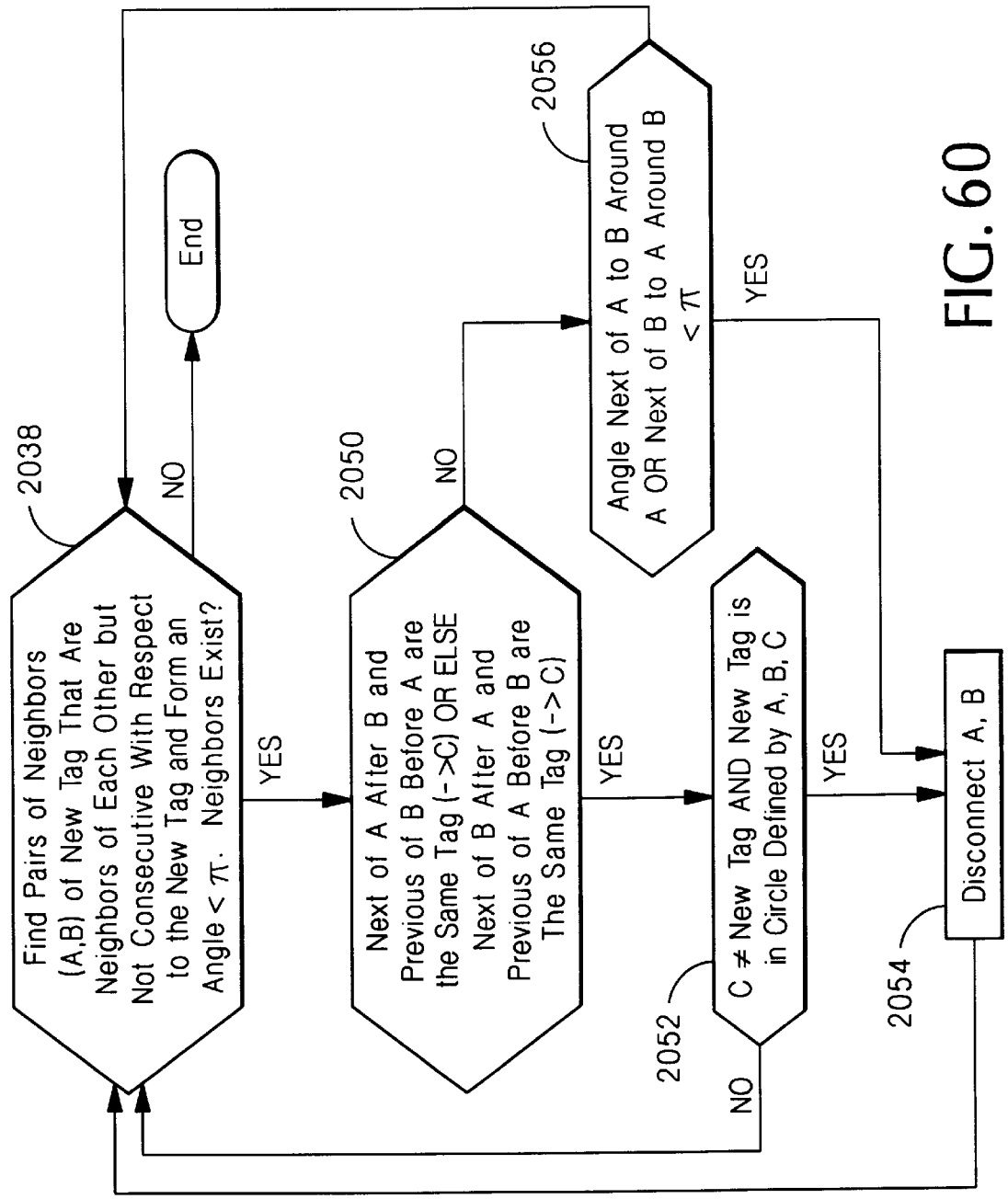

Referring to FIG. 59, in step 2022', the algorithm begins analyzing the previous and next tags in an opposite order. Step 2022' is identical to step 2022 in FIG. 56. The algorithm next repeats steps 2024 to 2044, with the following changes. In step 2030' (which replaces step 2030), a new next tag (next (n+1)) is defined as the previous tag (previous(n)). A new previous tag (previous(n+1)) is defined as the tag forming the smallest negative angle (with the current tag at the vertex of the angle) relative to the previous tag (previous (n)).

In step 2036' (which replaces step 2036), the next tag (next (n)) is added to the list of neighbors of the new tag. The new tag then informs the next tag, which adds the new tag to its list of neighbors. Steps 2037 and 2040 are replaced with step 2037', in which the new tag checks whether the next tag is the closest tag, or the angle between the new tag and the next tag (with the current tag at the vertex of the angle) is greater than or equal to 180 degrees. If the condition is not satisfied, the algorithm proceeds to step 2042. If the condition is satisfied, the algorithm proceeds to step 2038 (FIG. 60).

Figure 61:
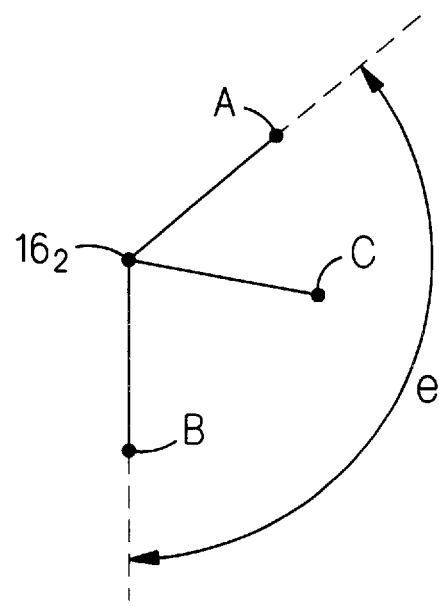
FIG. 61 is a schematic representations of a group of tags in the system of FIG. 1.

Referring to FIG. 60, in step 2038, the new tag finds a pair of its neighbors (A, B) that are neighbors of each other, but are not consecutive with respect to the new tag. This means that tag A is not the neighbor of the new tag that forms the smallest positive angle with tag B, with the new tag placed at the vertex of the angle. Similarly, tag A is not the neighbor of the new tag that forms the smallest negative angle with tag B, with the new tag placed at the vertex of the angle. FIG. 61 shows a situation where the condition is satisfied, with tags A, B and C as neighbors of new tag $16_2$.

In step 2038, the new tag also checks that tags A and B form an angle smaller than 180 degrees (with the new tag placed at the vertex of the angle). In the example shown in FIG. 61, the new tag compares angle e to 180 degrees. The algorithm checks every possible pair of neighbors, and if no pair of neighbors satisfy the conditions in step 2038, the algorithm ends. For each pair satisfying the conditions of step 2038, the new tag checks whether one of the following two conditions are satisfied: (1) the next neighbor of tag A relative to tag B, and the previous neighbor of tag B relative to tag A are the same tag (tag C), and (2) the next neighbor of tag B relative to tag A and the previous neighbor of tag A relative to tag B are the same tag (tag C) (step 2050). If either condition is satisfied, the new tag checks whether tag C is not the new tag and the new tag is included in a circle circumscribing tags A, B and C (step 2052). If the condition is satisfied, the tag disconnects tags A and B, that is, the new tag informs tags A and B that they are not neighbors of one another, and tags A and B modify their lists of neighbors accordingly (step 2054). The new tag then returns to step 2038.

If the condition in step 2052 is not satisfied, the algorithm returns to step 2038. If the condition in step 2050 is not satisfied, the new tag checks whether the angle of the next tag of tag A relative to tag B (with the vertex of the angle at tag A) or whether the angle of the next tag of tag B relative to tag A (with tag B at the vertex of the angle) is less than 180 degrees (step 2056). If so, the new tag proceeds to step 2054; if not, the algorithm returns to step 2038.

When a tag is removed or deleted, the netmaster directs updates of the topology by having the following algorithm performed by the neighbors of the removed tag. Each step of the algorithm is performed by the determine topology subfunction in the netmaster.

Figure 62:
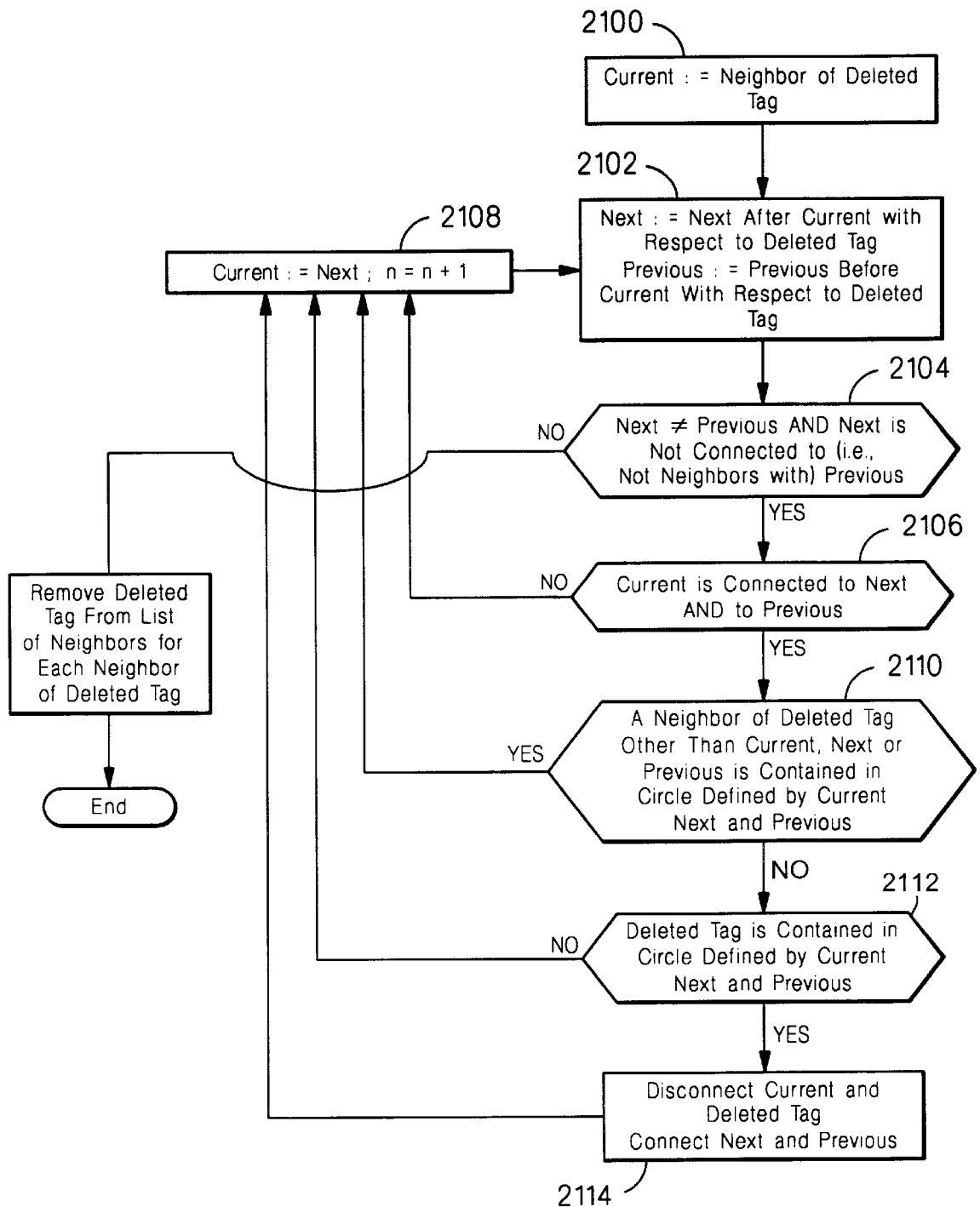
FIG. 62 is a flowchart for software performed by an asset tag in FIG. 1.

Referring to FIG. 62, the netmaster identifies a current tag as a neighbor of the removed tag (step 2100) and directs it to execute the following. The next tag (next(n)) is defined as the neighbor of the removed tag that is the next tag relative to the current tag with respect to the deleted tag. The previous tag (previous(n)) is defined as the neighbor of the removed tag that is the previous tag relative to the current tag with respect to the deleted tag (step 2102).

The tag checks whether the next tag is the same as the previous tag and whether the previous and next tags are neighbors of one another (step 2104). If either or both conditions are satisfied, the algorithm causes each neighbor of the deleted tag to remove the deleted from its list of neighbors. The deleted tag is thus disconnected from all its neighbors, and the process ends.

If the conditions of step 2104 are not satisfied, the netmaster checks whether the current tag is connected to the next and the previous tags, that is, the current, previous, and next tags are neighbors of one another (step 2106). If not, the tag defines a new current tag (current(n+1)) as the next tag (next(n)), increments the index n of the iteration (step 2108) and returns to step 2102. The removed tag completes the process by removing all the neighbors from its list.

If the condition in step 2106 is satisfied, the tag checks whether a neighbor of the deleted tag other than the current, next or previous tags is contained in a circle circumscribing the next, current and previous tags (step 2110). If the condition is satisfied, the algorithm returns to step 2108. If not, the tag checks whether the deleted tag is contained in the circle (step 2112). If the condition is not satisfied, the algorithm returns to step 2108. If the condition is satisfied, the deleted tag is removed from the list of neighbors of the current tag, and the next and previous tags are listed as neighbors of one another (step 2114). The algorithm then returns to step 2108.

When a tag is moved from one location to another, the tags update the topology by performing the algorithm illustrated in FIG. 62, in which the moved tag is defined as the deleted tag. The moved tag then finds its neighbors in its new location by performing the algorithm illustrated in FIGS. 55, 56, 59 and 60.

B. Propagate messages

The propagate messages subfunction 564 (FIG. 25) defines a set of relay points for efficient communications between tags, and defines a hierarchy of networks.

Each network within a level of the hierarchy is defined by the physical constraints of the system. For example, in one type of system, the assets include items placed in a container. Each container is in turn stored on a pallet carried by a vehicle. An asset tag is attached to each item, pallet, container and vehicle in the system. The set of tags on the items within a container neighbor one another, and automatically form a network. Because the tag on the container is likely to be within the communication range of only a few tags on the items, the tag on the container is generally not included in the network. Similarly, the tags on the packages, pallets, containers and vehicles form networks among themselves. Each network defines one level of the hierarchy.

A tag in each level chooses a sentinel or gateway tag for communication with a tag in an adjacent level of the hierarchy. For example, the gateway tag on the container communicates with a tag on the pallet. A tag on an item may thus communicate with the tag on the pallet through the gateway in the container. Each tag is thus able to communicate with any network in the hierarchy, without requiring a long range communication capability.

In some embodiments, tags may communicate with one another directly by bypassing an intermediate level in the hierarchy. For example, a device may query a tag on an asset in a container directly, without accessing the gateway tag on the container.

In addition, each level in the hierarchy is not required to form a network, but may consist of tags communicating independently with the next level of the hierarchy.

In one important application, the hierarchy described above is implemented on a ship transporting containers storing items. The container creates a bill of lading for the items in the container and communicates the bill to a device on the ship. The device then relays the bill to the outside world with cellular telephone, satellite relay or RF links. Alternatively, the container is loaded on a pallet that communicates with the device.

XII. Specific Applications

A. Hazardous waste transportation (a) System design

Figure 63:
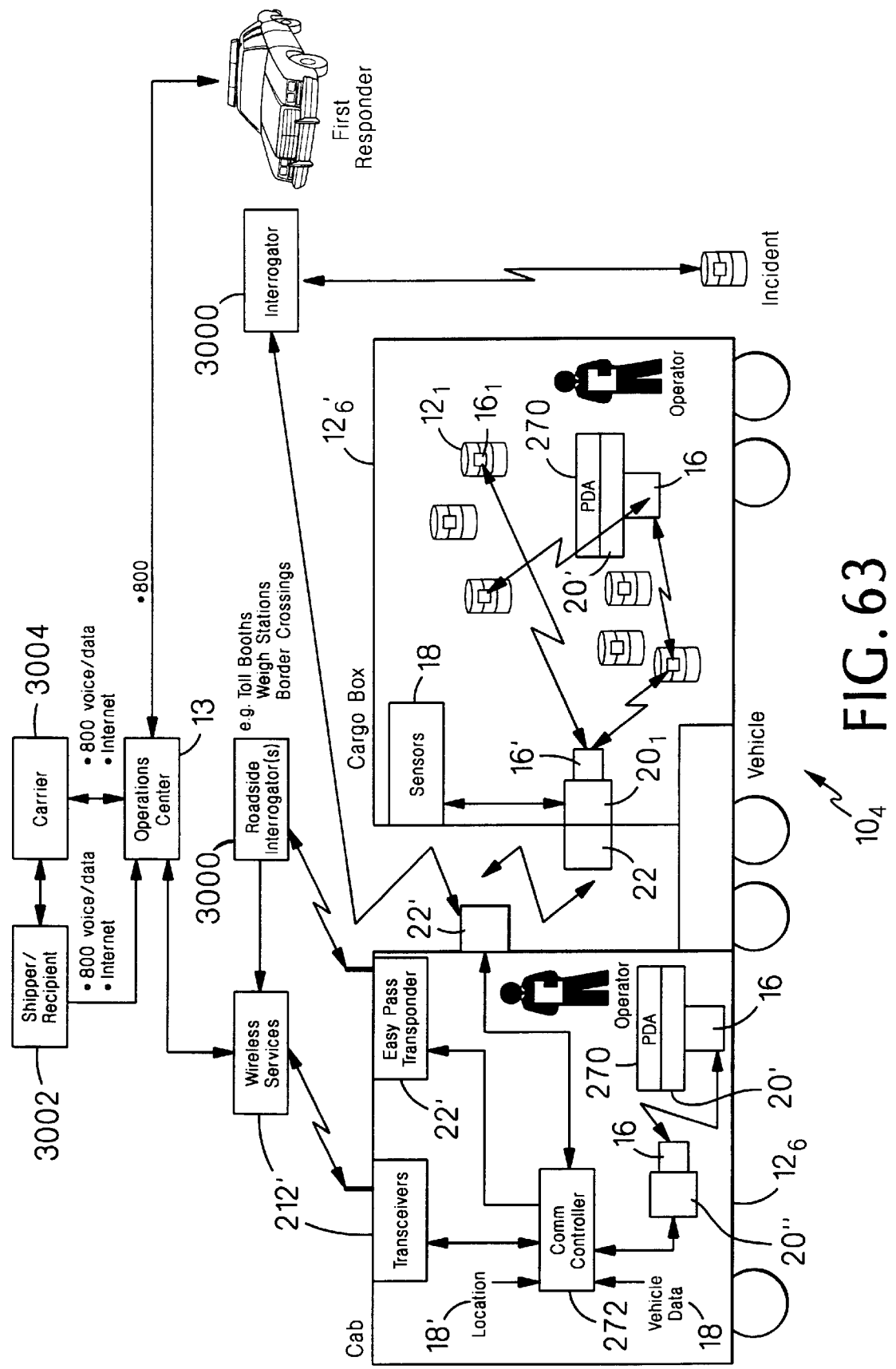
FIGS. 63 and 64 are schematic representations of the application of FIG. 6.
Figure 64:
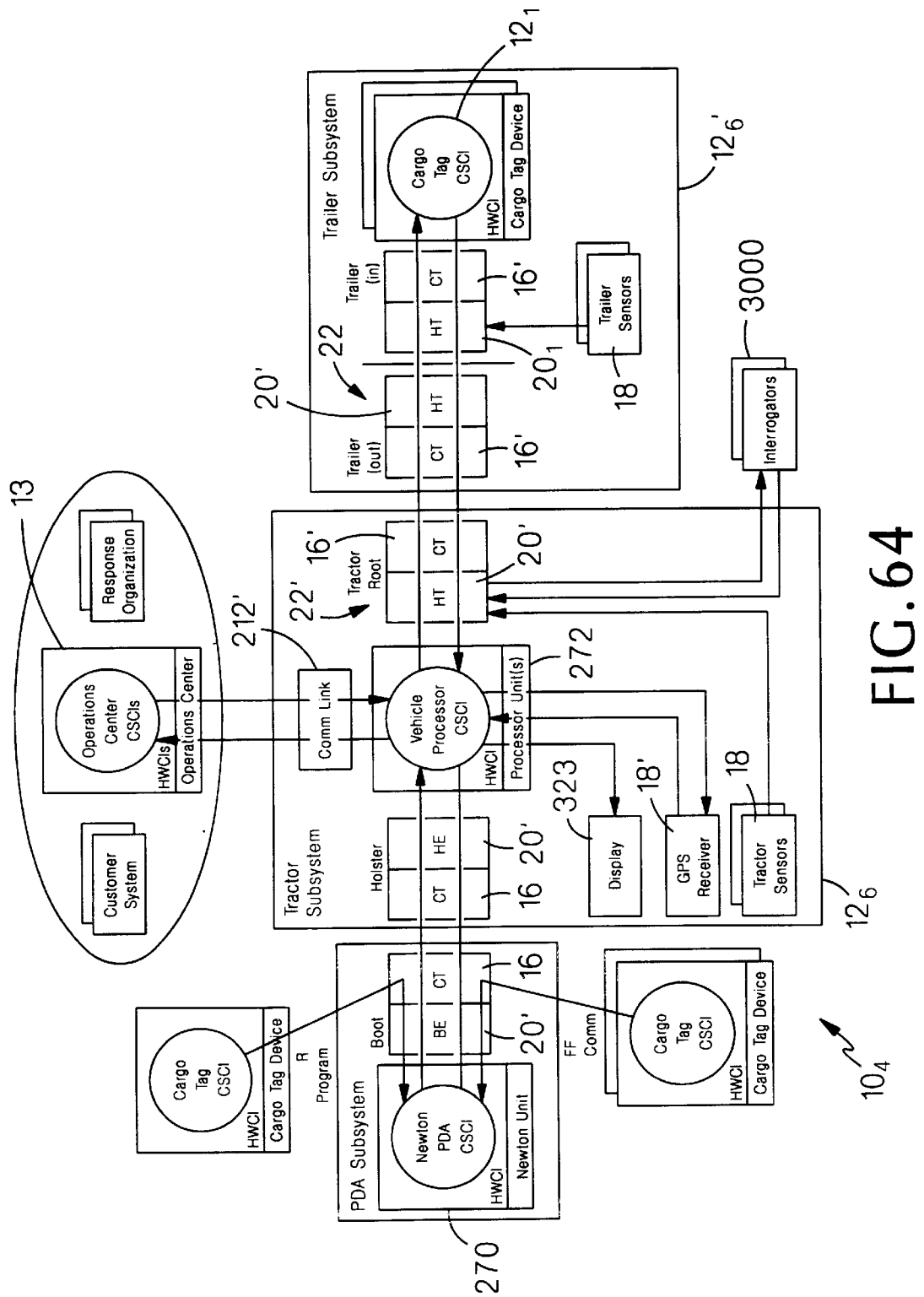

Referring to FIGS. 6, 63 and 64, one application $10_4$ of the system monitors trucks $12_6$ transporting containers $12_1$ of hazardous materials in a trailer $12_6'$. An asset tag $16_1$ is attached to each container. Alternatively, the containers are arranged on pallets that are each provided with an asset tag, or a group of pallets may be provided with a single tag.

The trailer also includes one or more sensors 18, for example, a temperature sensor and a door sensor. A helper tag $20_1$ attached to an asset tag 16' is placed on the inside of the trailer, and is in communication with the sensors and the tags on the container. The helper tag and asset tag form a gateway for communication outside the trailer.

An interrogate and respond module 22 is placed on the outside of the trailer, and is coupled to the helper tag $20_1$ on the inside of the trailer through a hole in the trailer wall. Both the helper tag in the interrogate and respond module and the helper tag on the inside of the trailer are battery powered. In an alternative embodiment, these tags are powered by the trailer.

The tractor $12_6$ of the truck is equipped with an interrogate and respond module 22' and a monitoring device, which includes a PDA 270 connected to a communications controller 272 by a boot 20', asset tag 16 and holster 20", as shown in FIG. 20 above. The PDA has a special panic button. The communications controller has a cellular link 212' to an operations center 13. The communications controller in the tractor is powered by the vehicle, and provides power to the interrogate and respond module 22' on the tractor. A GPS sensor 18' and other sensors 18 (such as a temperature sensor) are also mounted in the tractor.

The interrogate and respond module 22' on the tractor receives messages from the controller over an RS 232 serial link, and converts the messages to RF signals which are relayed to the interrogate and respond module 22 on the outside of the trailer. Both modules 22, 22' are queried by interrogators 3000, which include police radar guns or similar devices typically installed at weigh stations, toll booths and border crossings.

Figure 65:
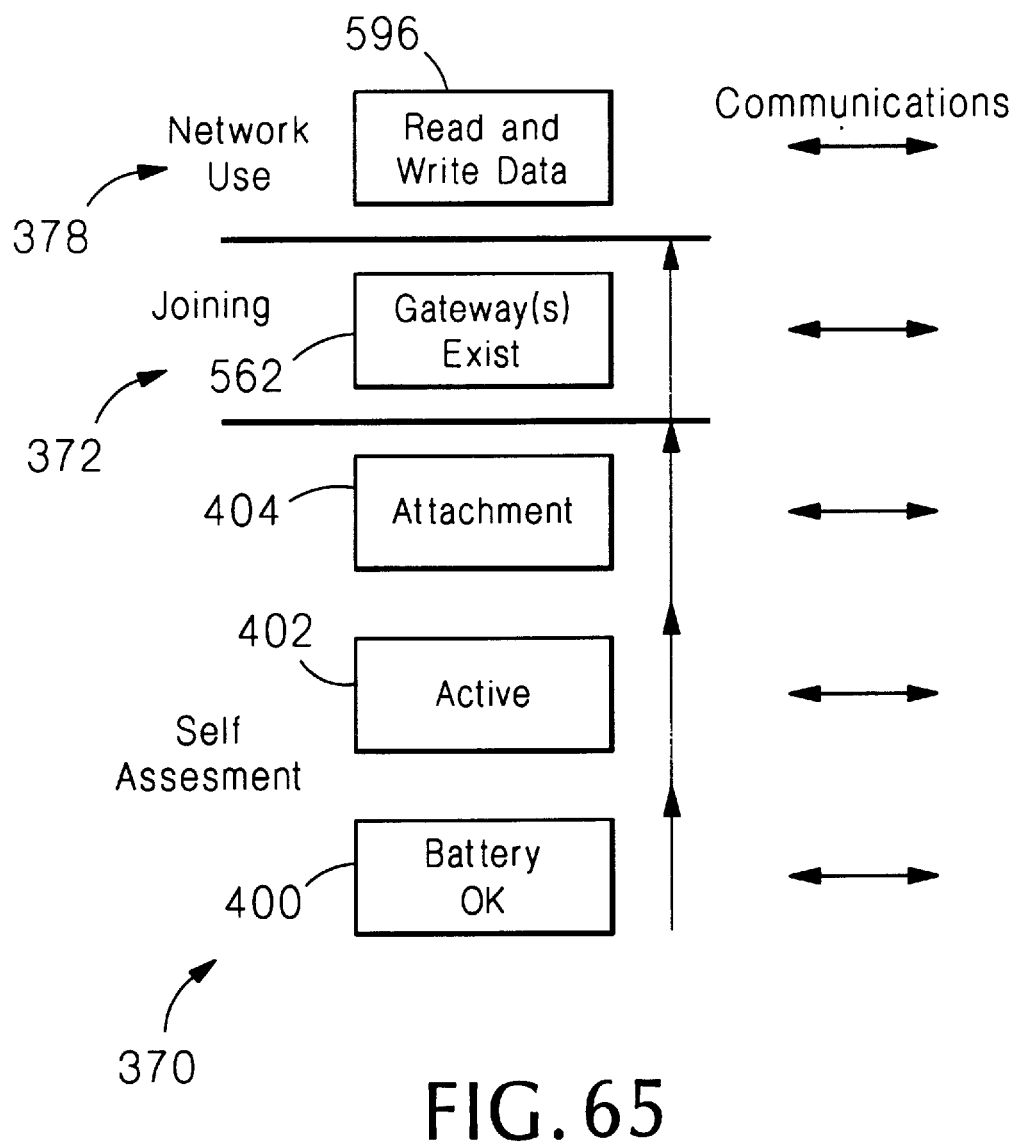
FIG. 65 is a schematic representation of functions performed by the asset tags in FIG. 63.

Referring to FIG. 65, the microprocessor software of each asset tag in this application is a simplified version of the microprocessor software described above. The microprocessor includes only a self-assessment unit 370, a joining unit 372, and a network use unit 378. The self assessment unit includes the battery 400, active 402 and attachment 404 subfunctions. The joining function includes a simplified sentinel subfunction 562 that checks only for gateways and seeks only the PDA (but not other asset tags). The network use function includes only the read and write data subfunction 596.

The asset tags $16_1$ on the containers can be, typically, 30 mm×30 mm×15 mm, and contain enough battery power to last two years. The asset tag on the inside of the trailer can be about a 30 mm cube, while the asset tag in module 22 can be about 30 mm×90 mm×20 mm. An asset tag including the GPS sensor can be about 30 mm×90 mm×30 mm in size.

(b) System operation

The tag on the inner trailer is powered on at all times, or, alternatively, it monitors its communication circuitry for messages before fully powering on. Upon receipt of a message, the tag checks whether the message is destined for itself or another component, in the manner described above. If the message is for itself, the tag responds to all the commands listed in Section V. The tag ignores and passes on all messages addressed solely to other tag ID's.

The helper tag on the inner trailer, when in an operations mode, sends a data retrieval message to the sensors in the trailer. The helper tags in the interrogate and respond modules 22, 22' perform the same functions as the helper tag in the inner trailer, but do not respond to a command changing the time T during which the synchronization code is broadcast. This is because the helper tags communicate only with one another and the PDA. Because the helper tags in the modules and the PDA are powered on at all times, they will immediately receive the synchronization code when broadcast by a helper tag. The helper tags therefore do not need to broadcast the synchronization code over time T, which is designed to allow a sleeping receiver enough time to wake up and receive the code.

Modules 22 and 22' and asset tags $16_1$ on the containers $12_1$ can communicate with modules on other vehicles. If an asset tag detects it has been detached, the tag relays the information to a module on its own vehicle or to the module on another vehicle if its own module is disabled.

In a typical scenario, a buyer contacts a shipper 3002 (FIG. 63) and requests certain virgin materials. The shipper communicates information regarding the buyer to the operations center 13. The center in turn supplies the information to a carrier 3004 who transports the materials to the buyer.

Alternatively, the shipper locates a buyer for its waste materials. The shipper then contacts the center in order to locate a carrier for transporting its waste materials to the buyer.

In each of these scenarios, the shipper identifies to the operations center the materials to be shipped, their location and their destination. The shipper may also specify transhipment points, along with dates and times for pickup and delivery at each point. The operations center 13 then organizes a route for one or more carriers based on this information, and relays the routes to the carriers' vehicles. Alternatively, the shipper may request that the system relay the shipper's information to a carrier which organizes its own route. A shipper or buyer may contact the operations center to obtain the route for the materials, or to subsequently modify or delete his order.

Before shipment, the vehicle driver picks up the containers of materials and attaches an asset tag to each container of materials. The user employs the PDA in the monitoring device to store the name of the shipper, the recipient and a description of the contents of the container on the tag, to activate the tag and to load data into the tag. Each person who takes possession of the container also enters a signature on the PDA that is loaded onto the asset tag. This fulfills the shipper's legal requirement of obtaining the signature of each person who takes possession of the hazardous waste.

The operations center communicates route information to the PDA, as well as a password for the driver who will take possession of the materials. When the driver receives the materials and the PDA, the driver first enters his password into the PDA. After the PDA verifies the password, it displays the route information to the driver.

Alternatively, the PDA does not store the password and route information. The operations center instead verifies this password and the route for the materials is communicated back to the driver. Subsequent drivers repeat this process.

At each stop and periodically between stops, the PDA 270 communicates with each tag in the trailer and verifies that no containers are missing. The PDA also checks for extraneous tags. If discrepancies are found, the PDA notifies the monitoring device. If the user does not employ the device to notify the PDA that action will be taken, the PDA notifies the operations center of the discrepancy and the location of the vehicle. The center then takes action according to a prearranged plan developed with the carrier.

At the carrier's option, the PDA may access the modules to report the status of the assets (regardless of whether there is a discrepancy) periodically, randomly, at every stop, at particular locations, or after a fixed time from a stop.

The PDA is loaded with route information that includes a series of expected times of arrival at specific locations and a tolerance for error. The PDA monitors the location of the vehicle through the GPS sensor and compares it to the plan. When a discrepancy beyond the tolerance for error is detected, the PDA reports the discrepancy to the center. The center responds to the discrepancy according to a prearranged plan with the carrier.

The operations center notifies PDA 270 of any changes in the route due to a request from the shipper, weather or traffic problems, or vehicle breakdowns.

At any time during the shipment, the shipper, buyer or a carrier may query the center regarding the location of the materials. The center verifies the requestor's legitimacy, and determines which vehicle is transporting the materials. The center then queries the PDA for its location and asks the PDA to verify that the materials are on board. Alternatively, if the PDA has not reported any discrepancies with its planned route, the center deduces the location of the materials from the route.

When the materials reach their destination, the driver uses the PDA in the monitoring device to upload the signatures stored in each tag and to delete the signatures from the tag memory. He then deactivates each tag and removes it from the container. The device automatically relays the signatures to module 272, which in turn communicates them to the operations center. The center then supplies the signatures to the shipper.

Modules 22 and 22' may be interrogated at any time with a police speed measuring radar. The modules broadcast the contents of the vehicle with synthesized voice on a police radio channel. The voice communication is followed by a data stream that may be monitored on special equipment.

If an incident occurs during shipment, the vehicle driver presses the panic button in the PDA and confirms by pressing it again. The PDA automatically forwards an emergency message along with the location of the vehicle to the operations center. The operations center contacts a first responder suitable for the location and materials, an appropriate police organization and the carrier. The center informs the responder and the police of the location of the vehicle, the types and quantities of materials being carried and telephone numbers of the carrier. Alternatively, only the carrier will be notified so that he may contact the vehicle driver and make appropriate arrangement with responders.

If the operator is incapacitated and cannot touch the panic button, policemen may interrogate the modules on the vehicle to determine its contents. The police may then take appropriate action. In addition, the tags on the containers may be individually queried with a monitoring device.

(c) Other embodiments

Other relationships between shipper, buyers and carriers are easily accommodated by the system. For example, several carriers may be coordinated to transport the materials from the shipper to the buyer.

In other embodiments, various components of the system described above are omitted. For example, if a centralized service is not required, the operations center is omitted. In this scenario, all communications take place through a distributed system of monitoring devices.

If the center is included, the client communication, inventory, scheduling and accounting software described above may be omitted. In addition, the Internet link, uninterruptable power supply, generator, and redundant backups may be removed from the center.

In other embodiments, a client is provided with a computer 14 (FIG. 1) for communicating with the operations center. The computer has inventory software for processing inventory information relayed by the center.

In some embodiments, the sensors in the tractor and the holster and boot in the communications controller are omitted. In addition, the communications controller communicates with an asset tag on the outer trailer using an asset tag on the tractor, but without using an intervening interrogate respond module. The interrogate and respond module is thus replaced with a simple asset tag. The tag receives RF communication from the container tags, and relays the communications to the communications controller.

In other embodiments, the attachment function and the active subfunction are omitted from the container tag processors. In addition, the full network formation and location functions may be added.

B. Warehousing (a) Structure

Referring to FIG. 3, another application $10_1$ of the system monitors equipment stored in a warehouse. In addition to use in a regular warehouse environment, the system is useful for monitoring valuable objects in homes and museums, and for managing and locating objects in distributed locations, for example, in a hospital.

Warehouse personnel attach an asset tag to each item in the warehouse, either at the entrance to the warehouse, at the origin of the item, or at some intermediate point. The asset tags contain the full range of functions described in connection with FIG. 23.

Fork lift trucks and other conveyances in the warehouse are each equipped with a helper tag connected to both an asset tag and a GPS sensor. The helper tag is powered by the battery on the conveyance, and provide this power to the external power port on the asset tag. The helper tag has an RS 232 port connected to the GPS sensor.

Pseudosatellites (also called "pseudolites") located in the warehouse communicate with the GPS sensors and may communicate with GPS satellites outside the warehouse. One or more gateway tags $16_9$ are disposed in the warehouse.

An inventory control computer 14 in communication with the gateway maintains a list of assets in the warehouse. Warehouse personnel employ monitoring devices 15 for communicating with the asset tags, the gateway tags and GPS sensors.

The warehouse application does not include an operations center. All information is collected by warehouse personnel using monitoring devices, and is downloaded onto the local inventory computer. As a result, the monitoring devices do not include the communications controller described above, but still employs a boot and an attached asset tag. The PDAs in the monitoring devices are recharged using a standard recharging cradle.

(b) Operation

The system is assembled by causing the pseudolites to monitor GPS signals from the GPS satellite outside the warehouse. The pseudolites determine their own location based on the GPS signals, and communicate their location to the GPS sensor in the warehouse.

The sensors on the conveyances monitor the GPS signals from the pseudolites when in the warehouse, and monitor the GPS signals from the satellite directly when outside the warehouse. The helper tag communicates with the sensor over the RS-232 port, and converts the location information to an unmodulated IR signal. The helper tag communicates the signal over its IR transmitter to the asset tag. The asset tag stores the location information.

Warehouse personnel add an asset to the system by choosing an asset tag for the asset and placing the tag in the programming port of a monitoring device. The PDA in the device contains a list of assets to be tagged, each matched to an identification number and a set of data. The data includes the contents of the asset, the shipper, a list of waypoints and a destination. If the asset is not being shipped, the destination is designated "inventory."

The user chooses the number associated with the asset to be tagged, and causes the PDA to load the identification number and set of data onto the tag. The PDA then reads the data stored on the tag, and verifies that it matches the information downloaded. If the information stored on the tag is erroneous, the PDA repeats the download operation. If the information is correct, the PDA activates the tag and indicates to the user that the tag should be detached from the programming port and attached to the object.

If the particular asset is not listed on the PDA, the user enters the ID of the asset tag in the PDA and causes it to be communicated by the tags on the networks to the gateway tag. The gateway tag in turn communicates the ID to the computer 14 which retrieves the appropriate information. The information is routed back to the PDA through the gateway and the asset tags.

If a computer is unavailable, the user determines the assets contents from its package labeling, and enters the information directly into the PDA.

Once activated, the tag begins performing the functions described above. The location function of the tag interrogates the helper tag on the nearest conveyance for its location. The helper tag retrieves the information from the attached asset tag, and informs the tag of the location.

The tag then measures its distance from the equipment tag, in the manner described above. The tag repeats this measurement several times, and checks whether the distance has changed beyond a set error tolerance. If it has, the tag determines that it is not moving with the conveyance. If the distance has not changed, the tag continues to interrogate the equipment tag until it has enough measurements to accurately measure its distance from the conveyance.

The tag repeats this process for every conveyance in its vicinity, and uses the measured ranges and the location of the conveyances to determine the asset's location.

Once the tag knows its own location, it can determine the location of other tags, monitoring devices and gateways in the warehouse by determining its relative distance from these items.

The network formation unit in the tag periodically interrogates other asset tags, monitoring devices, gateways and GPS sensors. The tag measures its distance from the other tags and forms an optimal network with the tags, as described above. The tags also define relay points between asset tags, gateways and monitoring devices, and define sentinels for communication with other networks.

Whenever a new tag is added to the network or removed from it, the gateway is informed. The gateway in turn notifies the inventory computer of the change. In this manner, the inventory computer is notified of all movements of the inventory. If certain movements are expected, the computer notifies the gateway which passes the information onto the asset tags. Once notified, the asset tags disregard the planned movements, and the inventory computer is notified only of unplanned movements.

The tags also perform all the self-assessment subfunctions. For example, when a tag recognizes that its battery is failing, it notifies the gateway or a monitoring device and powers down. If the tag is a sentinel or relay point, a tag designated as a netmaster chooses a replacement for the tag from the nearby tags.

Warehouse personnel receive set and pick lists from the gateway tags on their monitoring devices. The personnel uses the PDA in the device to interrogate the network and locate the items on the list. The PDA may rearrange the list to minimize the path traveled by the personnel.

The computer also notifies each tag within the network of the set and pick list. After each set or pick the tags in the network determine whether the item has been properly placed, and notifies the personnel through their PDAs of any error. These functions are omitted if the places are at the discretion of the personnel.

(c) Other embodiments

In other embodiments, tags are set up at the entrance to the warehouse or storage lot. Tags are affixed to the item (for example, motor vehicles, in particular cases) at the factory where they are produced. The tag at the entrance of the storage lot monitors the vehicles and records their departure from the lot. Once on a dealer's lot, the cars form a network. The tag at the entrance can be replaced with a gateway and long distance communication capability provided on the car itself or on a truck transporting the cars to and from the lot.

In some embodiments, the self-assessment functions of the asset tags are omitted. A client computer with inventory and communication software may be connected to the inventory computer.

C. Warehouses with Hazardous Materials

Referring to FIG. 4, an application $10_2$ for monitoring a warehouse storing hazardous materials is identical to the application $10_1$ described above, but with the addition of an interrogate and respond module 22 on an outside wall of the warehouse.

The module is connected to a serial port of inventory computer 14, and is powered by a battery with a built-in recharger connected to an external power source at 110 VAC. The module may thus function during a power outage.

Warehouse personnel periodically instruct the inventory computer to download the warehouse contents in the module. Alternatively, the computer automatically downloads the information without instruction from an operator. When a fireman interrogates the module with a police radar, the module transmits the downloaded data in synthesized voice, followed by a data steam, over the fireman's communication frequency.

Alternatively, the module is in communication with a gateway tag in the warehouse. The gateway tag in turn communicates with the tags mounted on the items. When interrogated, the module causes the gateway to communicate with the asset tags and learn their contents. The gateway then relays the information to the module.

The tags inform the gateway of their contents and location in increasing order of their ID. If the tags are fixed to containers, they communicate with tags on the assets inside the containers to ascertain their contents.

In another embodiment, the module is connected to a dedicated response computer in the warehouse. The computer is equipped with a gateway tag in communication with the asset tags.

The dedicated computer periodically queries the assets through the gateway tag for the asset contents, and verifies the information. The computer arranges the information in an order for processing, and summarizes the data. For example, if 50 drums of a particular material are located in one area of the warehouse, the computer replaces information relating the contents of each drum with a statement indicating that the fifty drums contain the same material. A higher level summary identifies only the quantity of materials in the warehouse corresponding to each hazard class.

The computer responds to an interrogation from the module with information that is divided into sets. For example, a summary of the warehouse contents forms one set of data. More detailed information concerning a particular area of the warehouse forms a subsequent set.

The module transmits one set of information to the fireman in synthesized voice, and follows it with a corresponding data stream. The module repeats this process for each set of data. The fireman may thus display each set of data on a monitor to avoid a misunderstanding.

The dedicated computer is appropriate for large warehouses with a complex system of assets, since the dedicated computer organizes a large amount of information before sending it to the module.

In another embodiment, the warehouse does not include any of the features of application $10_1$, and data concerning the contents of the warehouse is entered manually on the computer and communicated to the module.

In all the embodiments described above, the monitoring device and the tags on the conveyances (location tags) may be omitted.

D. Railroad shipping (a) System Design

Figure 66:
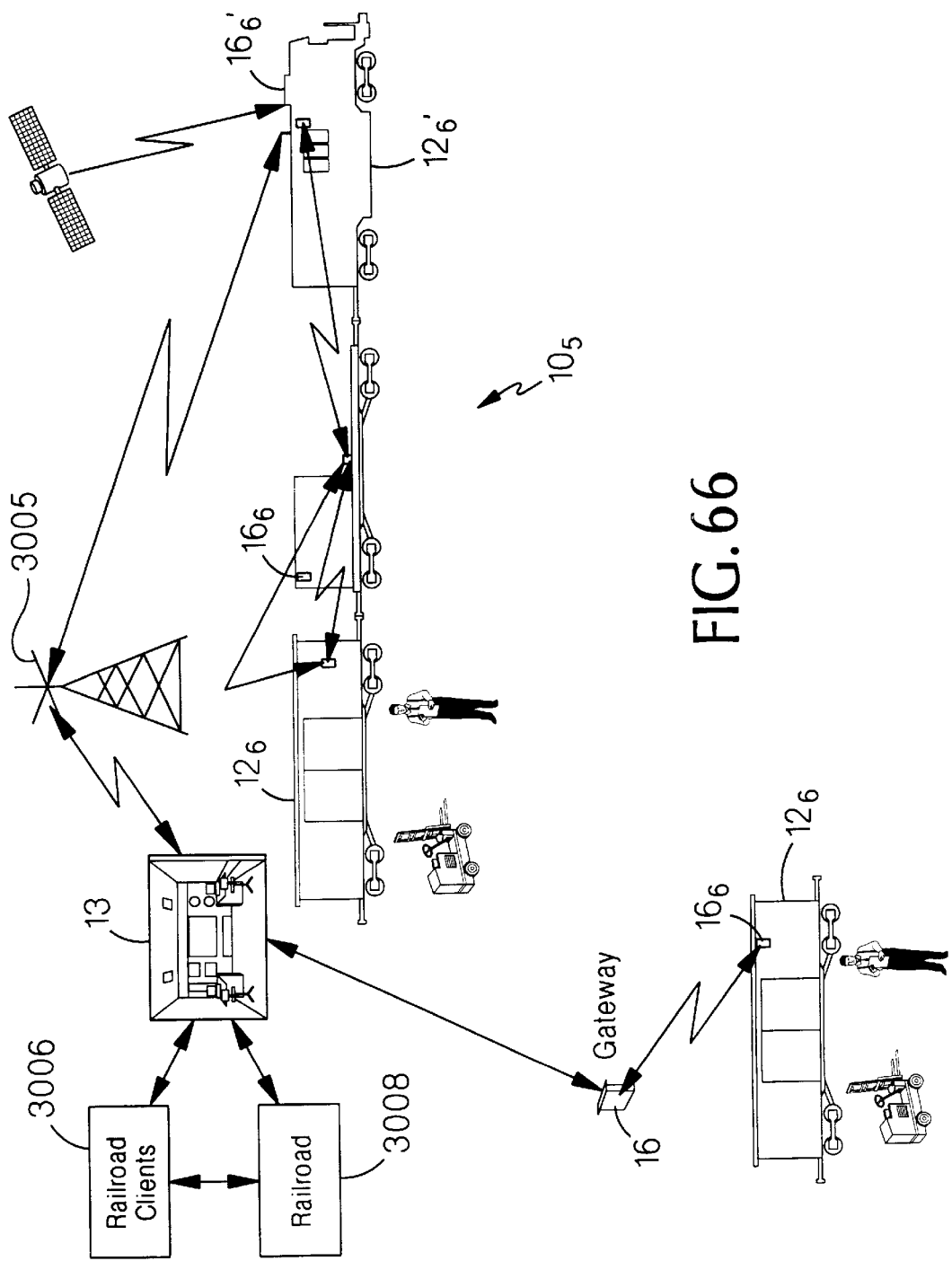
FIG. 66 is a schematic representation of the railroad application of FIG. 5.

Referring to FIGS. 5 and 66, a railroad application $10_5$ monitors both the cargo on a train and the train's rolling stock (cars and locomotives).

A locomotive $12_6$ on the train is equipped with a monitoring device 15 comprising a PDA connected to a communications controller with a boot and holster, as described above. The device is also equipped with a panic button, described above. A GPS sensor is mounted on the locomotive for communication with the controller. The locomotive also has an asset tag $16_6{}'$ connected to operations center 13 through a cellular link 3005.

Railroad personnel in a loading or unloading area are also provided with an identical monitoring device. Each PDA is recharged with a standard charging cradle.

An asset tag connected to a helper tag (together referred to as a "rolling stock tag") is placed on cars and trailers in the train. The rolling stock tags have a larger energy source than those used in the applications described above, and have a communication range spanning more than one element of rolling stock. It is therefore not necessary to supply each car with a tag. Each piece of rolling stock is also equipped with one or more of the following sensors.

Wheel bearing sensors are placed close enough to a wheel bearing on the rolling stock to measure its temperature and communicate an exceptional temperature to the locomotive tag via the rolling stock tag. Brake release sensors monitor the rolling-stock brakes and communicate a non-released brake condition to the locomotive tag via the rolling stock tag. Door sensors are mated with an asset tag and are in communication with the rolling stock tag. A reefer sensor is mated with an asset tag and monitors the fuel level, refrigeration operation and reefer temperature for the rolling stock.

Items $12_1$ in the cars have asset tags connected to helper tags which communicate with the monitoring device 15. The helper tag and asset tag perform all the functions described above.

Selected rolling stock is equipped with a module 22 to allow an operator to interrogate the stock regarding its contents from a distance. The module is mounted outside a car and is coupled to a rolling stock tag located in the car. An operator may deactivate the module through a PDA in the monitoring device.

(b) System operation

The system provides a means for efficiently searching for misrouted containers, and for providing an easily accessed compilation of the contents of the train.

During loading, an operator uses the PDA in the monitoring device to communicate with the rolling stock tag. The operator indicates to the tag which containers are being loaded onto the car. Similarly, the operator uses the PDA to relay the identity of the car to the tags on each container.

In this manner, the rolling stock tag and the asset tags are informed of one another's identities, and may begin communicating. The rolling stock tag selects a communications channel for communication with the asset tags and provides the identity of the channel to the asset tags. If excessive interference occurs on the channel, the rolling stock tag selects a new channel and informs the asset tags of the change.

After the train is loaded, the conductor notifies the operations center through the PDA of his identity. The center validates the operator's password and informs him of route information. Clients 3006 of the railroad 3008 (shippers and recipients of the cargo) interact either with the railroad directly or with the operations center.

The asset tags, tags on each piece of rolling stock and the sensors each perform the network formation subfunctions described above.

Each rolling stock tag selects a communication channel for the sensors on the rolling stock, and communicate that choice to each sensor. If the tags subsequently detect excessive interference on the channel, they select another unused channel and instruct the sensors of the change. The sensors respond to instructions regarding the channel only from the tag for the rolling stock on which the sensors are located.

The wheel bearing sensors periodically measure the temperature of the wheel bearings and communicates the temperature to a local asset tag. The tag compares the temperature to a predetermined threshold. If the threshold is exceeded, the tag forwards a message to the nearest rolling stock tag. The rolling stock tag continues to communicate this message along the rolling stock tags until it reaches the locomotive tag. The locomotive tag forwards the message to the monitoring device, which, at the option of the railroad, sends the message to the railroad through the operations center.

The brake release sensors are activated by a local asset tag when the tag receives a brake release message through the network from the locomotive tag. After a preset delay time, the sensor determines whether the brake was actually released. The delay time allows sufficient time for the compressed air and mechanical braking system to operate. If the brakes have not been released, the tag notifies the monitoring device through the network that the brake is malfunctioning.

The door sensors receive a message through the network or through a monitoring device carried by an operator loading the train. The message may indicate either that the door need not be monitored, or that the door is open or closed and should remain that way. If the door violates these instructions, the tag sends a message through the network to the monitoring device in the locomotive. At the railroad's option, the monitoring device forwards this message to the railroad.

The reefer sensors notify the monitoring device whenever a sensed value exceeds a preset threshold. The device may alert the railroad of this condition.

Each sensor also includes a test cycle, redundant sensors, or a calibration cycle that activates the sensor to determine whether it is still operational. The asset tags periodically monitor the sensors to determine whether they are still present and active.

The monitoring device on the locomotive or another device may deactivate any sensor to preserve energy. For example, the monitoring device may deactivate all the brake sensors once the train is in motion or is stopped. The tag checks the ID of each device sending a deactivate message so that it is deactivated only by a valid device. The device can subsequently reactivate any sensor.

When a rolling stock tag is isolated from other rolling stock tags, for example when the rolling stock is being unloaded or loaded, the rolling stock tag no longer functions as part of the network. Instead, an operator communicates with the tag using a PDA in a local monitoring device. If the stock is to be monitored while unattended, a gateway tag is placed in the vicinity of the rolling stock. The tag networks with the gateway tag to notify a nearby computer of any changes.

The tags perform additional functions described in the warehousing application above. For example, the tags notify the monitoring device in the locomotive through the network whenever a tag disappears. The device monitors the location of the train relative to an expected route, and notifies the center of any unacceptable deviations. Similarly the center may communicate a new route to the device in the event of weather delays, etc.

The railroad, shipper or recipient may contact the center to locate a particular asset, in a manner analogous to that described above.

In the event of an emergency, the conductor activates and confirms the panic button. The monitoring device informs the center of the emergency, which takes action in a manner analogous to that described above. Similarly, if the operator is incapacitated, a policeman can interrogate the module outside a car, or interrogate an asset directly.

(c) Other embodiments

In some embodiments, the operations center is omitted, and the railroad communicates with the train's monitoring device directly. In this scenario, all communications take place through a distributed system of monitoring devices.

If the center is included, the client communication, inventory, scheduling and accounting software described above may be omitted. In addition, the Internet link, UPS, generator, and redundant backups may be removed from the center.

In other embodiments, a client is provided with a computer for communicating with the operations center. The computer has inventory software for processing inventory information relayed by the center.

In some embodiments, the sensors in the locomotive and the holster and boot in the communications controller are omitted.

In some embodiments, the asset tags are excluded, and the system only monitors the tags indirectly through the door sensor. If the tags are included, they may function without a helper tag. In addition, the rolling stock tags are optional if the asset tags may directly communicate with asset tags in other cars.

In other embodiments, the attachment subfunction and the active subfunction in the self-assessment function are omitted from the asset tags.

E. Intermodal shipping through a port

Referring to FIG. 7, containers typically arrive at a port by train $12_6'$ or truck $12_6$. The containers are unloaded, placed on a flat truck, driven to a holding area 64 and removed from the truck. A flat truck then moves the containers to a ship 62 when it is ready for loading. The process occurs in reverse when a ship arrives at the port. A computer 14 in the management offices of the port monitor the containers and is in communication with a remote operations center (FIG. 1).

Each container is equipped with an asset tag, and the trains and trucks are equipped as described in sections XIIA and XIID above. Each ship and holding area is treated as a warehouse and equipped with pseudolites, gateways and inventory computers, as described above in Section XIIB.

If the size of the holding area or ship exceeds that of a typical warehouse, the communication range of the tags is extended by placing additional relay tags in strategic locations around the ship and holding area. Each relay tag includes an asset tag connected to a helper tag similar to the pair mounted on the trailer in the hazardous waste application, but without the interrogate and respond capability. Each helper tag is powered by a 110 VAC external power source.

Alternatively, the ship or holding area may be divided into areas and each area supplied with a gateway. The gateway is connected to the port management offices by a hard wire or long range wireless connection. Combinations of the relay tags and gateways may also be used.

If the management offices wish to monitor the containers on a ship at sea, the gateways on the ship are connected by a global communications device, such as InMarSat, in lieu of a cellular telephone connection.

Other embodiments of this application include the variations of the warehousing and transportation applications described above.

F. Bonded carriers (a) System design

Bonded carriers operate conveyances that move containers and semi-trailers between national borders or storage areas near a border. Customs officials typically require that the conveyances prevent access to their contents. Additional security is provided by requiring the conveyances to follow specific routes over a specified time frame.

Referring to FIG. 6, each container $12_1$ in the conveyance is equipped with an asset tag $16_1$ connected to a seal 20', described in connection with FIG. 15. The asset tag and seal include all the units described above except the location and network formation units.

Each container is equipped with a second asset tag and seal. The second seal does not carry a GPS sensor, and has a smaller battery.

A remote operations center communicates with the carriers and the tags. An operator is provided with a monitoring device for communicating with the tags and center. A standard charging cradle is provided for the PDA in the monitoring device. Communications between the center and the tags are encrypted with a public/private key encryption system.

(b) System operation

As described in Section V, an operator attaches each seal to a container by threading an aircraft cable through a latch on the container, and placing the ends of the cable in two quick connect ports of the seal. An optical fiber is similarly threaded through the latch, and its ends inserted in a tamper detector in the seal.

In use, the carrier contacts the operations center, identifies a conveyance and its tags and describes a scheduled route for the conveyance. The carrier also indicates the carrier personnel who should be notified in case a deviation from the route occurs.

The center contacts the seals over the cellular phone and downloads the route information provided by the carrier.

The asset tags attached to the seals on each container periodically power themselves on and attempt to communicate with one another. If a communication is successfully established, the asset tag attached to the first seal activates the GPS sensor and queries the sensor for its position and velocity, and time of day. The first seal relays this information to the second seal on the container.

The asset tag attached to each seal then compares its location to an expected location derived from the route information. The seals report any deviation to the center, and the attached asset tags reset their clocks and power down.

The operations center periodically recalculates the expected route and downloads the route to the seals. For example, if a delay is expected due to snow, the center modifies the route accordingly.

The center randomly contacts the seals over the cellular phone when the attached asset tags are powered down. When the asset tags wake up, they obtain location information from the GPS sensor and cause the seals to relay the information to the center. The information includes the position of the sensor, its velocity and the absolute time.

The center recalculates the expected route from the information obtained from the seals. This corrects for small modifications of the route that need not be communicated to the center by the seals.

The center also examines the route and calculates a likelihood that the conveyance will deviate from its expected route. The center then optimizes the power on period for the seals based on the likelihood. Tag energy is further conserved by deactivating the asset tags between trips.

If the seals are unable to establish communication for example, because of equipment failure or tampering, a seal notifies the operations center. If the asset tag attached to the first seal is functioning, it activates the GPS sensor to determine its position and velocity and the time of day, and also reports this information to the center. If only the second seal is active, it notifies the center of its last known position, velocity and time.

The seals continually transmit an IR beam through the fiber optic cable. If a seal is tampered with, that is, if the fiber is cut or damaged, the IR receiver in the tamper detector will not receive the beam through the fiber. The receiver immediately notifies the second seal on the container and calls the operations center. If the center does not confirm the call within a prespecified time, the seal notifies the second seal which attempts to make the communication.

In applications where the containers include valuable cargo, a seal and asset tag are attached to each container. A module 22 is also mounted on the outside of the conveyance and is in communication with an interrogator inside the conveyance.

When the module is activated, it verifies the existence of each tag attached to a container. If the module is unable to establish communication with a tag, it notifies the interrogator which alerts the operations center.

In other embodiments, a door sensor is mounted near the door of the conveyance. When the sensor determines that the door is improperly opened, it alerts a seal on a container. This provides an indirect monitoring of the contents of the conveyance. If the cargo is refrigerated, a temperature sensor is placed near the containers. If the sensor notes that the temperature is outside an acceptable range, it notifies a tag.

(c) Other embodiments

In some embodiments, the seals and asset tags include the location unit and network formation unit, discussed in connection with FIG. 23.

A related application includes avoiding or reducing theft in shipping and storing pipes. A tag with a tamper detectors is placed on one end of a pipe and connected by a repeater, for example, an asset tag relaying IR communications between the tags at the other end of the pipe. One end of an optical fiber is placed in one tag and run through the pipe. An opposite end of the fiber is connected to the second tag. The first tag transmits a signal through the fiber to the second tag. The second tag relays the signal as a repeater, which sends the signal to the first tag. When either tag detects an absence of a signal at its receiver, it notifies a gateway tag.

G. Clandestine Tracking

Referring to FIG. 9, application $10_9$ attaches a tag 16' to an asset such that the tag is difficult to detect. This is accomplished by for example, mounting the tag behind the package labelling for the asset. Smaller tags are particularly useful in this application; as described above, the tag size is reduced to 2 cm in diameter and ¼ cm in thickness when a lower life battery is employed.

Without a monitoring device, a smuggler of the asset will be unable to electronically detect the presence of the tag. By contrast, once the asset is loaded onto a conveyance with a gateway tag, the gateway will detect the tag and report the presence of the asset to a monitoring device or operations center. Similarly, personnel will be able to activate the gateway when in the gateway's range to detect the presence of the asset.

If the asset is being carried in the open, or if a door to the conveyance is opened, the tag can be detected by tags on other conveyances in the area, or by the monitoring devices of nearby personnel. A charging cradle is provided for these monitoring devices.

The tags perform the seek others subfunction, but other network formation and location functions are optional. Self-assessment functions are also optional, but the read and write subfunction is required.

This application is particularly useful for tracking controlled substances and other illegal materials.

Other embodiments are within the following claims.

Appendix I: Calculation of f in tetrahedron

Figure 67:
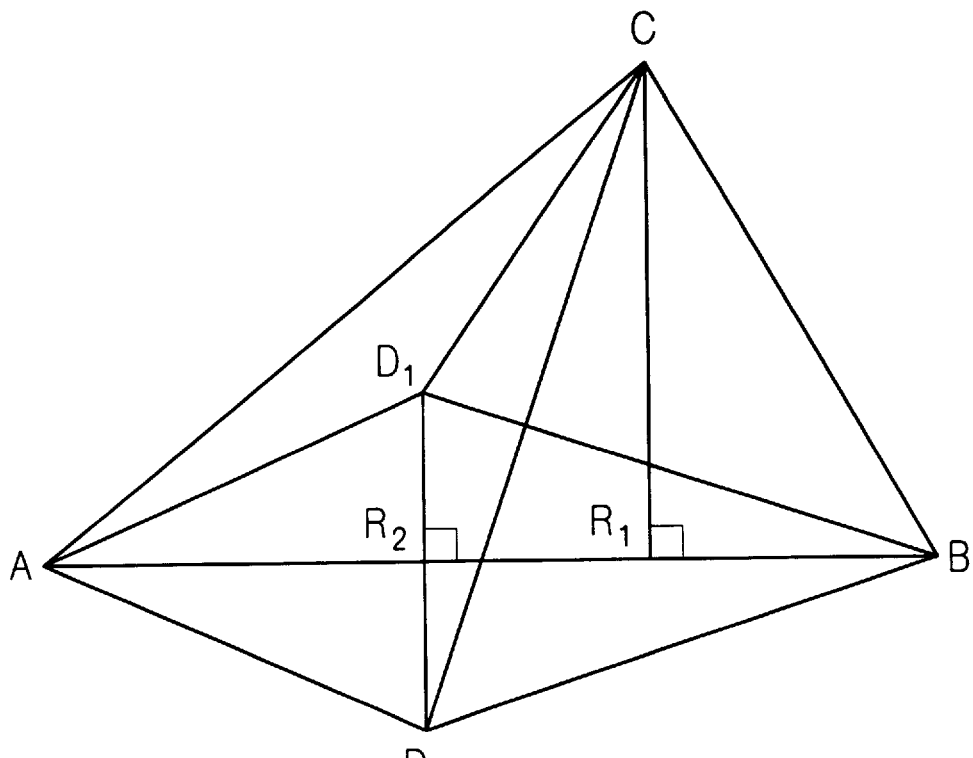
FIGS. 67 and 68 are schematic representations of groups of tags in the system of FIG. 1.

Referring to FIG. 67, in the planar tetrahedron defined by tags A,B,C,D, the distances between tags A, B and C are known. $D_1$ is a location for the fourth tag D that minimizes the range between C and D ($CD_1$ or $f_{min}$), and $D_2$ is a location for tag D that maximizes the distance between C and D ($CD_2$ or $f_{max}$)

The equations that follow define $f_{min}$ and $f_{max}$ in terms of the ranges between tags A, B and C. Table I defines the notation used in the equations.

TABLE I

| | |
|---|---|
| $\overline{AB}$ | The length of segment AB. |
| $\overline{\overline{AB}}$ | The length of segment AB, with a sign factor (i.e. it can be negative) |
| ∠BAC | The angle defined by segments AB and AC at point A. |
| ΔBAC | The triangle defined by A, B and C. |
| ∠ΔABC, ΔABD | The angle between triangles ABC and ABD. |

$$\overline{\overline{AR_2}} = \frac{\overline{BD}^2 - \overline{AB}^2 - \overline{AD}^2}{2\overline{AB}}$$

$$\overline{DR_2} = \sqrt{\overline{AD}^2 - \overline{AR_2}^2}$$

$$\overline{\overline{AR_1}} = \frac{\overline{BC}^2 - \overline{AB}^2 - \overline{AC}^2}{2\overline{AB}}$$

$$\overline{CR_1} = \sqrt{\overline{AC}^2 - \overline{AR_1}^2}$$

$$x = \overline{\overline{AR_1}} - \overline{\overline{AR_2}}$$

$$y_{min} = \overline{DR_2} - \overline{CR_1}$$

TABLE I-continued $$y_{max} = \overline{DR_2} + \overline{CR_1}$$

$$\overline{CD_1} = \sqrt{x^2 + y_{min}^2}$$

$$\overline{CD_2} = \sqrt{x^2 + y_{min}^2}$$

$$\overline{CD_2} \leq \overline{CD} \leq \overline{CD_2}$$

Appendix II: Calculation of $j_1$ and $j_2$ in five tag group

Figure 68:
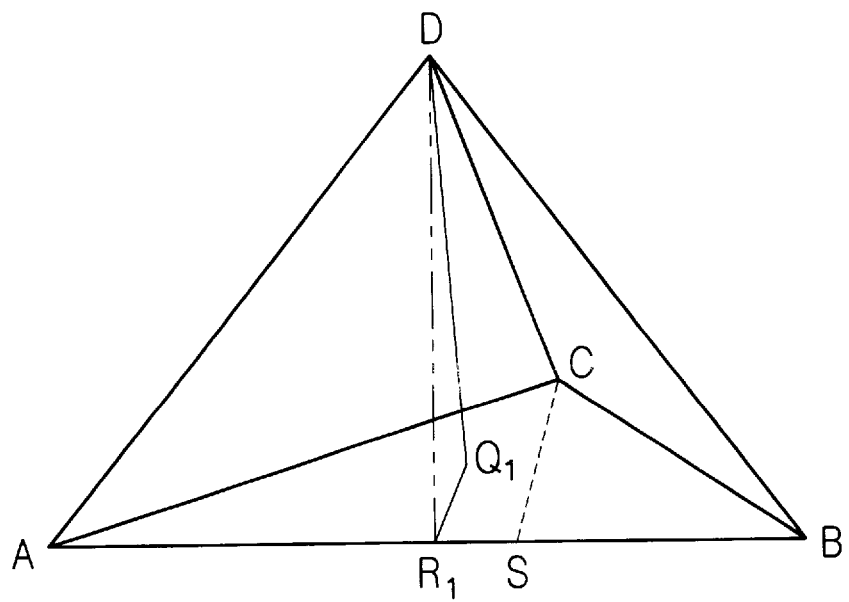

Referring to FIG. 68, tags A, B, C and D define a tetrahedron. Tag E (not shown) defines a second tetrahedron that shares triangle ABC with the first tetrahedron.

The altitude $DQ_1$ is perpendicular to triangle ABC, and point $Q_1$ lies on the triangle ABC. $Q_1R_1$ is perpendicular to AB. $DR_1$ is the altitude of triangle ABD and CS is the altitude of triangle ABC. Points $Q_2$ and $R_2$ are placed analogously to $Q_1$ and $R_1$ in the second tetrahedron.

The following equations define the relationships between each side of the triangle. The final equation defines two solutions for the range DE ($j_1$ and $j_2$). This equation can be manipulated to derive an expression for each remaining side in terms of the nine other sides.

Table I defines the notation used in the equations.

$DR_1 \perp AB$    $ER_2 \perp AB$
$CS \perp AB$    $Q_3R_2 \perp AB$
$Q_1R_1 \perp AB$    $EQ \perp \Delta ABC$ $DQ \perp \Delta ABC$ $$\cos(\angle BAE) = \frac{\overline{BE}_1 - \overline{AB}^2 - \overline{AE}^2}{2\overline{AE}\,\overline{AB}}$$

$$\cos(\angle BAD) = \frac{\overline{BD}^2 - \overline{AB}^2 - \overline{AD}^2}{2\overline{AD}\,\overline{AB}}$$

$$\overline{\overline{AS}} = \overline{AC}\cos(\angle BAC)$$

$$\cos(\angle BAC) = \frac{\overline{BC}^2 - \overline{AB}^2 - \overline{AC}^2}{2\overline{AC}\,\overline{AB}}$$

$$\overline{CS} = \overline{AC}\sin(\angle BAC) = \sqrt{\overline{AC}^2 - \overline{\overline{AS}}^2}$$

$$\overline{\overline{AS}} = \overline{AC}\cos(\angle BAC)$$

$$\overline{\overline{AR_2}} = \overline{AE}\cos(\angle BAE)$$

$$\overline{CS} = \overline{AC}\sin(\angle BAC) = +\sqrt{\overline{AC}^2 - \overline{\overline{AS}}^2}$$

$$\overline{ER_2} = \overline{AE}\sin(\angle BAE) = \sqrt{\overline{AE}^2 - \overline{\overline{AR_2}}^2}$$

$$\overline{\overline{AR_1}} = \overline{AD}\cos(\angle BAD)$$

$$\overline{R_2S} = |\overline{\overline{AS}} - \overline{\overline{AR_2}}|$$

$$a_1 = \angle \Delta ABC, \Delta ABE$$

$$\overline{DR_1} = \overline{AD}\sin(\angle BAD) = +\sqrt{\overline{AD}^2 - \overline{\overline{AR_1}}^2}$$

$$\overline{R_1S} = |\overline{\overline{AS}} - \overline{\overline{AR_1}}|$$

$$\overline{CE}^2 = \overline{R_1S}^2 + (\overline{ER_1}^2 + \overline{CS}^1 - 2\overline{ER_1}\,\overline{CS}\cos\alpha_2)$$

$$a_1 = \angle \Delta ABC, \Delta ABD$$

$$\cos\alpha_2 = \frac{\overline{R_2S}^2 + \overline{ER_2}^2 + \overline{CS}^2 - \overline{CE}^2}{2\overline{ER_1}\,\overline{CS}}$$

$$\overline{CD}^2 = \overline{R_1S}^2 + (\overline{DR_1}^2 + \overline{CS}^2 - 2\overline{DR_1}\,\overline{CS}\cos\alpha_1)$$

$$\overline{Q_2R_1} = \overline{ER_2}\cos\alpha_1$$

$$\cos\alpha_1 = \frac{\overline{R_1S}^2 + \overline{DR_1}^2 + \overline{CS}^2 - \overline{CD}^2}{2\overline{DR_1}\,\overline{CS}}$$

$$\overline{EQ_2} = \overline{ER_2}\sin\alpha_2 = \pm\sqrt{\overline{ER_2}^2 - \overline{Q_2R_2}^2}$$

-continued $\overline{Q_1R_1} = \overline{DR_1} \cos \alpha_1$ $x_2 = \overline{AR_2}$ $\overline{DQ_1} = \overline{DR_1} \sin \alpha_1 = \pm \sqrt{\overline{DR_1}^2 - \overline{Q_1R_1}^2}$ $y_2 = \overline{Q_2R_2}$ $x_1 = \overline{AR_1}$ $z_2 = \overline{EQ_2}$ $y_1 = \overline{Q_1R_1}$ $\overline{DE} = +\sqrt{(x_1 - z_1)^2 + (y_1 - y_2)^2 + (|z_1| \pm |z_2|)^2}$ $z_1 = \overline{\overline{DQ_1}}$ Appendix III: Deriving the covariance matrix For a given range (m), a particular grouping of five coplanar tags containing the range is chosen. The five tags define two tetrahedrons sharing a common side, as shown in FIG. 68.

An estimate $m_1$ for the range is derived by solving for the range from the nine other ranges (a,b,c,d,e,f,g,h,i) in that grouping, such that $$m_1 = f(a,b,c,d,e,f,g,h,i)$$

The function f(a,b,c,d,e,f,g,h,i) is derived from the Equations given in Appendix II, and depends on the location of the range m within the pair of tetrahedrons.

A similar equation provides other estimates $m_2$, $m_3$, ... using other grouping of five tags containing the range m.

As described above, the equation yields two values for $m_1$ (for example, $j_1$ and $j_2$ for side DE). The processor chooses the value closest to the range originally measured for m. Alternatively, when the range m is invalid, a value is chosen from each pair of values $m_1$, $m_2$, ..., such that the chosen values have a minimum variance.

The derivation of the variances of each estimate (and their covariances) is demonstrated from a simplified case, in which $m_1 = a$ $m_2 = f(b,c,d)$ $m_3 = f(c,d,e)$ The function f(b,c,d) and f(c,d,e) are modified to return only the desired value of the estimate. The general case, where each estimate is a function of nine ranges, and where there are a total of N estimates, can be easily derived by generalizing the following discussion.

The ranges (a,b,c,d,e) are statistically independent, and are associated with a Gaussian error (delta) with variance (sigma). Each estimate $m_1$, $m_2$, $m_3$ is linearized to create $x_1$, $x_2$, $x_3$ such that $$x_1 = a + \Delta a \tag{34}$$

$$x_2 = f(b,c,d) + \frac{\partial f(b,c,d)}{\partial b} \Delta b + \frac{\partial f(b,c,d)}{\partial d} \Delta d + \frac{\partial f(b,c,d)}{\partial c} \Delta c$$

$$x_3 = f(c,d,e) + \frac{\partial f(c,d,e)}{\partial c} \Delta c + \frac{\partial f(c,d,e)}{\partial d} \Delta d + \frac{\partial f(c,d,e)}{\partial e} \Delta e$$

The variances of each linearized estimate is given by:

$$\sigma_{11}^2 = \sigma_a^2 \tag{35}$$

$$\sigma_{22}^2 = \left(\frac{\partial f(b,c,d)}{\partial b}\right)^2 \sigma_b^2 + \left(\frac{\partial f(b,c,d)}{\partial c}\right)^2 \sigma_c^2 + \left(\frac{\partial f(b,c,d)}{\partial d}\right)^2 \sigma_d^2$$

-continued $$\sigma_{33}^2 = \left(\frac{\partial f(c,d,e)}{\partial c}\right)^2 \sigma_c^2 + \left(\frac{\partial f(c,d,e)}{\partial d}\right)^2 \sigma_d^2 + \left(\frac{\partial f(c,d,e)}{\partial e}\right)^2 \sigma_e^2$$

Because $m_1$ is only dependent on a and $m_2$ and $m_3$ are independent of a, the covariances between them are zero. The covariance between $x_2$ and $x_3$ is given by the expectation:

$$\sigma_{23}^2 = E[(x_2 - m_2)(x_3 - m_3)] \tag{36}$$

Equations 36 and 34 together yield:

$$\sigma_{23}^2 = \frac{\partial f(b,c,d)}{\partial c} \frac{\partial f(c,d,e)}{\partial c} \sigma_c^2 + \frac{\partial f(b,c,d)}{\partial d} \frac{\partial f(c,d,e)}{\partial d} \sigma_d^2 \tag{37}$$

The covariance matrix is thus given by:

$$\Sigma = \begin{vmatrix} \sigma_{11}^2 & 0 & 0 \\ 0 & \sigma_{22}^2 & \sigma_{23}^2 \\ 0 & \sigma_{23}^2 & \sigma_{33}^2 \end{vmatrix} \tag{38}$$

The inverse Q of the covariance matrix is defined by the matrix $(q_{ij})$.

For Q to exist, it is essential that the covariance matrix be nonsingular. This is guaranteed by selecting groups of five tags (5-tuples) that contain the range (m), such that each selected group includes a range absent from the previously selected groups.

Figure 69:
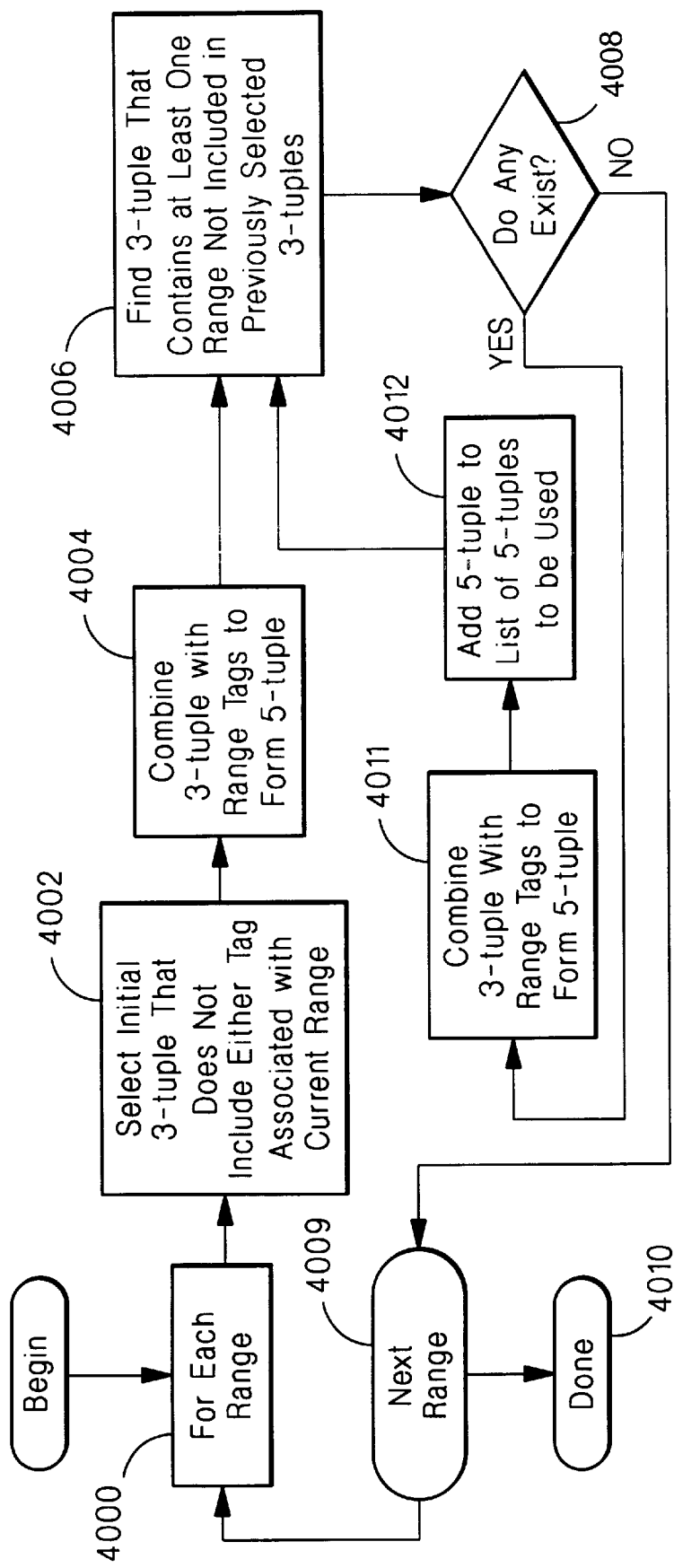
FIG. 69 is a flowchart for software performed by an asset tag of FIG. 1.

Referring to FIG. 69, the subfunction selects the 5-tuples by first defining the range (m) being refined (step 4000). The subfunction selects an arbitrary set of three tags (a 3-tuple) that does not include either tag associated with the range m (step 4002), and combines the 3-tuple with the tags defining the range m to form a 5-tuple (step 4004).

The subfunction next finds a 3-tuple that contains at least one range not included in any previously selected 3-tuple (step 4006). If no such 3-tuple exists (step 4008), the subfunction ends, and calculates Q for the set of 5-tuples selected up to that step. If no 5-tuples have been selected, the subfunction does not refine the range m. The subfunction then returns to step 4000, and selects another range to be refined (step 4009). When all the ranges have been refined, the process ends (step 4010).

If an appropriate 3-tuple exists at step 4008, the subfunction combines the latest selected 3-tuple with the tags defining the range m (step 4011) to form a new 5-tuple. The subfunction then adds the latest 5-tuple constructed by the subfunction to a list of 5-tuples to be used in calculating Q (step 4012) and returns to step 4006.

After a range m has been refined by the subfunction, it is not used in subsequent range refinements. This is because the equations given above are derived by assuming that the ranges are statistically uncorrelated. Once the ranges are refined, they become correlated with other ranges, and employing them would therefore be inconsistent with this assumption. The refined ranges are used for the first time by the compute locations subfunction 506 (FIG. 25).

What is claimed is:

1. A system for use in monitoring and affecting actions on behalf of a group of objects, comprising:
   a first electronic tag attached to an object in the group, comprising:
      circuitry for communicating with a second tag, the circuitry communicating at least information pertaining to an object in the group, and
      a memory connected to the circuitry and capable of storing the information, and
   a second electronic tag attached to an object in the group, comprising
      circuitry for communicating the information with the first tag,
      a memory connected to the circuitry in the second tag and capable of storing the information.

2. The system of claim 1 wherein the information comprises an identity of a tag in the set capable of long range communication.

3. The system of claim 1, wherein the memory in each tag stores a unique identification for the tag.

4. The system of claim 1, wherein the information includes a change in an identity of a tag in the set.

5. The system of claim 4 further comprising a user-operated device for communicating with the circuitry in the first tag, the first tag further comprising a controller connected to the memory and the circuitry, a program in the memory of the first tag configuring the controller to enable the circuitry in the first tag to notify the device of the change.

6. The system of claim 1 wherein the first tag further comprises an internal time clock.

7. The system of claim 6 further comprising a time sensor communicating a time to the circuitry in the second tag, the first tag comprising a controller connected to the memory and the circuitry, the memory in the first tag comprising a program causing the controller in the first tag to execute a function when the controller reads the memory, the function causing the controller to
   enable the circuitry to communicate with the second tag to obtain the time, and
   set the clock using the time.

8. The system of claim 6 further comprising a sensor communicating location information to the first tag, the first tag further comprising a controller connected to the memory and the circuitry, wherein the memory in the first tag comprises a program configuring the controller in the first tag to perform a function when the controller reads the memory, the function causing the controller to
   employ the circuitry in the first tag to query the second tag regarding a transportation route for the object attached to the first tag and
   employ the circuitry in the first tag to query the sensor regarding the location.

9. The system of claim 8 wherein the program configures the controller to operate in a specific and predetermined manner to perform the functions of:
   querying the clock regarding a present time,
   determining an expected position of the object at the present time based on the route,
   determining an actual position of the object based on the location, and
   determining whether the actual position deviates from the expected position by an amount greater than a selected threshold.

10. The system of claim 9 further comprising a user-operated device for communicating with the first tag, wherein the program configures the controller to operate in a specific and predetermined manner to perform the function of notifying the device of a deviation by causing the circuitry to communicate with the device.

11. The system of claim 10 wherein the device comprises
    a processor,
    device communication circuitry connected to the processor, and
    a device memory coupled to the processor and comprising a program configuring the processor to perform a function when the processor reads the device memory, the function causing the processor to determine a new route for the object attached to the first tag based on the deviation, and causes the processor to employ the device communication circuitry to communicate the new route to the first tag.

12. The system of claim 11 wherein the device memory causes the processor to operate in a specific and predetermined manner to perform the function of employing the device communication circuitry to receive communications indicating a change in the route from at least one of the following: a second device, a tag and a system operator.

13. The system of claim 1 wherein the first electronic tag further comprises a controller connected to the memory and the circuitry in the first tag, the second electronic tag further comprising a controller connected to the memory and the circuitry in the second tag.

14. The system of claim 13, wherein the first tag further comprises a power source coupled to the controller in the first tag and supplying power to the circuitry in the first tag, the memory in the first tag comprising a program causing the controller to perform a function when the controller reads the memory, the function causing the controller to adjust the power supplied to the controller to a minimal level which allows communication between the circuitry in the first tag and the circuitry in the second tag.

15. The system of claim 13 wherein the information comprises a distance of the first tag from the second tag at a number of different times, and absolute locations of the second tag at each of the times, the program in the memory of the first tag causing the controller in the first tag to determine the absolute position of the first tag from the information.

16. The system of claim 13 wherein the first tag further comprises
    a power source connected to the controller, and
    a timer connected to the power source and the controller, the memory in the first tag comprising a program configuring the controller in the first tag to execute a function when the controller reads the memory, the function causing the controller to load a time period in the timer, the timer causing power from the power source to be removed from the controller and restored after the time period elapses.

17. The system of claim 13 wherein the memory in the first tag includes a program configuring the controller in th e first tag to execute a function when the controller reads the memory, the function causing the controller to code the information with an encryption code before enabling the circuitry to communicate the information to the second tag.

18. The system of claim 13 wherein the first tag further comprises a detector connected to the controller in the first tag, the detector notifying the controller when the first tag is detached from the object.

19. The system of claim 18 further comprising a user-operated device in communication with the first tag, the memory in the first tag comprising a program configuring the controller in the first tag to perform a function when the controller reads the memory, the function causing the controller to enable the circuitry in the first tag to notify the device in response to notification from the detector that the first tag is detached from the object.

20. The system of claim 13, further comprising a set of tags neighboring the first tag and including the second tag, wherein the memory in the first tag comprises a program configuring the controller to perform a function when the controller reads the memory in the first tag, the function causing the controller to identify the set of tags by enabling the circuitry in the first tag to establish communications with each tag in the set.

21. The system of claim 20 wherein the information comprises an identification of a tag belonging to a different set, the program in the memory of the first tag causing the controller in the first tag to merge the first-mentioned set with the different set when a number of tags in the first-mentioned set falls below a threshold.

22. The system of claim 20 wherein the memory in the first tag causes the controller in the first tag to perform the function of dividing the set of tags into subsets when a number of tags in the set increases above a threshold.

23. The system of claim 22 wherein the memory in the first tag stores an identification code for the first tag, the program causing the controller in the first tag to perform the functions of
truncating the code, and
employing the circuitry in the first tag to communicate the truncated code to a second tag within a subset.

24. The system of claim 22, wherein the information communicated between tags comprises a distance between a pair of tags in the set, the program memory in the first tag causing the controller in the first tag to
enable the circuitry in the first tag to communicate with the tags in the set to obtain the distance between each pair of tags in the set, and
determine relative locations of each tag in the set based on the distances.

25. The system of claim 24 wherein program further comprises a function causing the controller in the first tag to select a particular tag in the set for communicating outside the set based on the locations.

26. The system of claim 25 wherein the function further causes the controller in the first tag to select a tag located on a periphery of the set of tags as the particular tag.

27. The system of claim 22, wherein the program in the memory of the first tag causes the controller in the first tag to select a tag in the set as a relay tag, the circuitry in the relay tag being designated to route messages between a pair of tags in the set.

28. The system of claim 27 wherein the program in the memory of the first tag causes the first tag to designate a plurality of relay tags in the set, the controller in the first tag designating a minimal number of relay tags that enables communications between each pair of tags in the set.

29. The system of claim 27 wherein program in the memory of the first tag causes the controller in the first tag to perform a Delaunay triangulation to determine a topology of the tags in the set and to select the relay tag based on the topology.

30. The system of claim 4 wherein the information includes a distance of the first tag from three different tags in the set and the absolute locations of the three different tags, the program in the memory of the first tag causing the controller in the first tag to determine the absolute position of the first tag from the information.

31. The system of claim 30 wherein the program in the memory of the first tag causes the controller to perform the functions of:
causing the circuitry to communicate information with each tag in the set,
analyzing the information from the circuitry to determine the presence of a new tag in the set,
causing the circuitry to communicate with the new tag to obtain a distance between the first tag and the new tag and a location of the new tag, and
refining the absolute position of the first tag based on the location of the new tag and the distance between the first tag and the new tag.

32. The system of claim 30 wherein a program in the memory of the first tag causes the controller in the first tag to minimize an error in the absolute position of the first tag.

33. The system of claim 30 further comprising a location sensor disposed near one of the three different tags, the sensor communicating a location of the sensor to the circuitry in the one tag.

34. An electronic tag, comprising
a mechanism for attaching the tag to an asset,
circuitry for communicating with a second tag, the circuitry communicating at least information pertaining to said asset, and
a memory connected to the circuitry and storing the information.

35. The electronic tag of claim 34, further comprising a controller connected to the memory and the circuitry.

36. The tag of claim 35 further comprising a detector connected to the controller, the detector providing a detection signal indicating whether the tag is detached from the asset.

37. The tag of claim 35 further comprising
a power source providing power to the controller, and
a detector connected to the controller and the power source, the detector providing a detection signal indicating whether the power source has deteriorated beyond a threshold level to the controller.

38. The tag of claim 35 wherein the tag further comprises a timer coupled to the controller and a power source supplying power to the controller, the power source increasing the power processor provided to the controller after the timer supplies an activating signal to the power source.

39. The tag of claim 35 further comprising detector connected to the controller, the detector providing a detection signal to the controller indicating whether the tag has been tampered with.

40. The tag of claim 39 wherein the detector comprises
a transmitter,
a receiver, and
an optical fiber connecting an output of the transmitter to an input of the receiver, the transmitter forwarding a signal over the optical fiber to the input of the receiver, the receiver notifying the controller when the signal does not arrive at the input of the receiver.

41. A method for monitoring an object in a moving vehicle, comprising the steps of
attaching an electronic tag to the object, the electronic tag being configured to communicate with an electronic device associated with the moving vehicle, using the electronic device as a relay point to communicate with the electronic tag while the object is being moved by the moving vehicle, and detecting the presence of the object during said communicating step.

42. The method of claim 41 further comprising the step of determining a location of the object by establishing communications between the tag and a sensor storing location information.

43. The method of claim 41 further comprising the step of storing a unique identification for the object on the tag.

44. The method of claim 41 further comprising the step of storing a description of the object on the tag.

45. The method of claim 41 further comprising the step of storing the object's shipper and destination on the tag.

46. The method of claim 45, further comprising the steps of forwarding the signatures of the tag to the device when the object to which the tag is attached reaches the end of its monitoring period, and deleting the signatures from the tag memory.

47. The method of claim 41 further comprising the step of storing a signature of each possessor of the object on the tag.

48. The method of claim 47 further comprising the steps of forwarding the signatures of the tag to the device when the tag reaches the limit of its memory capacity, and deleting the signatures from the tag memory.

49. The method of claim 41 further comprising the steps of disposing the object in a container attached to an electronic tag, and establishing communication between the tag on the object and the tag on the container.

50. The method of claim 49 further comprising the step of communicating with the device from the tag on the object through the tag on the container.

51. The method of claim 49 further comprising the steps of disposing the container in a second container attached to an electronic tag, and establishing communication between the tag on the first container and the tag on the second container.

52. The method of claim 41 further comprising the step of reporting the absence of the object to a user when the device cannot communicate with the tag.

53. The method of claim 52 further comprising the steps of reporting the absence of communication to a computer accessible to the user.

54. The method of claim 52 further comprising the step of reporting the absence of any object to the user periodically.

55. The method of claim 52 further comprising the step of reporting the absence of the object to at least one of the following: an owner of the object and a possessor of the object.

56. The method of claim 41 further comprising the steps of comparing the location of the object to a planned route, and reporting a discrepancy between the location and the planned route to the user.

57. The method of claim 56 wherein said reporting step further comprises the step of reporting the discrepancy to the user using a computer.

58. The method of claim 56 further comprising the step of determining a new route for the object.

59. The method of claim 56 further comprising the steps of determining a new route for the object by the user, and notifying the device of the new route.

60. The method of claim 50 further comprising the step of determining a new route for the object using a computer.

* * * * *